(12) United States Patent
Xia et al.

(10) Patent No.: US 11,683,215 B2
(45) Date of Patent: Jun. 20, 2023

(54) SYSTEM AND METHOD FOR COMMUNICATIONS BEAM RECOVERY

(71) Applicant: Futurewei Technologies, Inc., Plano, TX (US)

(72) Inventors: Pengfei Xia, San Diego, CA (US); Bin Liu, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 119 days.

(21) Appl. No.: 16/820,283

(22) Filed: Mar. 16, 2020

(65) Prior Publication Data
US 2020/0220772 A1    Jul. 9, 2020

Related U.S. Application Data

(63) Continuation of application No. 15/890,925, filed on Feb. 7, 2018, now Pat. No. 10,931,514.
(Continued)

(51) Int. Cl.
*H04L 41/0654* (2022.01)
*H04L 5/00* (2006.01)
(Continued)

(52) U.S. Cl.
CPC ....... *H04L 41/0654* (2013.01); *H04B 7/0695* (2013.01); *H04B 7/088* (2013.01);
(Continued)

(58) Field of Classification Search
CPC .............................. H04B 7/0695; H04B 7/088
See application file for complete search history.

(56) References Cited

U.S. PATENT DOCUMENTS

2011/0045837 A1   2/2011   Kim et al.
2012/0113816 A1   5/2012   Bhattad et al.
(Continued)

FOREIGN PATENT DOCUMENTS

CN    103053196 A    4/2013
CN    104854949 A    8/2015
(Continued)

OTHER PUBLICATIONS

"WF on Beam Failure Recovery," 3GPP TSG RAN WG1 Meeting #88b, R1-1706633, Agenda Item 8.1.2.2, Spokane, WA, Apr. 3-7, 2017, 6 pages.
(Continued)

*Primary Examiner* — Ross Varndell
(74) *Attorney, Agent, or Firm* — Slater Matsil, LLP

(57) ABSTRACT

A method for operating an access node includes generating a configuration message including information specifying a set of reference signals of a first reference signal type and a set of reference signals of a second reference signal type used to identify a new beam, and information specifying random access channel resources allocated for transmitting preamble sequences, wherein each random access channel resource is associated with a reference signal of the first reference signal type, sending, to one or more user equipments (UEs), the configuration message, receiving, from a UE, a preamble sequence on one of the random access channel resources, and determining an identity of the UE in accordance with the preamble sequence and the one of the random access channel resources.

28 Claims, 18 Drawing Sheets

Related U.S. Application Data

(60) Provisional application No. 62/581,314, filed on Nov. 3, 2017, provisional application No. 62/544,420, filed on Aug. 11, 2017, provisional application No. 62/521,110, filed on Jun. 16, 2017, provisional application No. 62/479,965, filed on Mar. 31, 2017.

(51) Int. Cl.

| | | |
|---|---|---|
| *H04B 7/08* | (2006.01) | |
| *H04B 7/06* | (2006.01) | |
| *H04W 16/28* | (2009.01) | |
| *H04W 72/04* | (2009.01) | |
| *H04W 74/08* | (2009.01) | |
| *H04W 72/14* | (2009.01) | |
| *H04W 74/00* | (2009.01) | |
| *H04W 76/27* | (2018.01) | |
| *H04W 88/02* | (2009.01) | |
| *H04W 72/0453* | (2023.01) | |
| *H04W 72/044* | (2023.01) | |

(52) U.S. Cl.
CPC .......... *H04L 5/0023* (2013.01); *H04L 5/0048* (2013.01); *H04L 5/0091* (2013.01); *H04W 16/28* (2013.01); *H04W 72/042* (2013.01); *H04W 72/046* (2013.01); *H04W 72/0453* (2013.01); *H04W 72/14* (2013.01); *H04W 74/006* (2013.01); *H04W 74/0833* (2013.01); *H04W 76/27* (2018.02); *H04W 88/02* (2013.01)

(56) References Cited

U.S. PATENT DOCUMENTS

| | | |
|---|---|---|
| 2013/0258964 A1 | 10/2013 | Nam et al. |
| 2013/0301542 A1 | 11/2013 | Krishnamurthy et al. |
| 2014/0126490 A1 | 5/2014 | Chen et al. |
| 2016/0212643 A1 | 7/2016 | Park et al. |
| 2017/0026962 A1 | 1/2017 | Liu et al. |
| 2017/0048826 A1 | 2/2017 | Kishiyama |
| 2017/0331577 A1 | 11/2017 | Parkvall et al. |
| 2018/0083680 A1 | 3/2018 | Guo et al. |
| 2018/0115940 A1 | 4/2018 | Abedini et al. |
| 2018/0192383 A1 | 7/2018 | Nam et al. |
| 2018/0242327 A1 | 8/2018 | Frenne et al. |
| 2018/0262313 A1 | 9/2018 | Nam et al. |
| 2018/0278467 A1 | 9/2018 | John Wilson et al. |
| 2018/0302889 A1* | 10/2018 | Guo .................. H04B 7/088 |
| 2018/0367374 A1 | 12/2018 | Liu et al. |
| 2018/0368124 A1 | 12/2018 | Liu et al. |
| 2019/0104549 A1 | 4/2019 | Deng et al. |
| 2019/0141617 A1 | 5/2019 | Abedini et al. |

FOREIGN PATENT DOCUMENTS

| | | |
|---|---|---|
| CN | 106256114 A | 12/2016 |
| CN | 106256144 A | 12/2016 |
| CN | 106538016 A | 3/2017 |
| KR | 20160075996 A | 6/2016 |
| RU | 2014143812 A | 5/2016 |
| RU | 2619772 C2 | 5/2017 |
| WO | 2008058149 A2 | 5/2008 |
| WO | 2011005163 A1 | 1/2011 |
| WO | 2016153176 A1 | 9/2016 |
| WO | 2017012472 A1 | 1/2017 |
| WO | 2017030601 A1 | 2/2017 |

OTHER PUBLICATIONS

Huawei et al., "Link recovery procedure for beam failure", 3GPP TSG RAN WG1 Meeting #88b, R1-1704230, Apr. 3-7, 2017, 8 Pages, Spokane, USA.

NTT Docomo, Inc., "Further views on mechanism to recover from beam failure", 3GPP TSG RAN WG1 Meeting #88bis, R1-1705719, Apr. 3-7, 2017, 6 Pages, Spokane, USA.

Qualcomm Incorporated, "Beam recovery procedure", 3GPP TSG-RAN WG2 Meeting #97bis, R2-1703561, Apr. 3-7, 2017, 4 pages, Spokane, USA.

ZTE, et al., "Discussion on beam recovery mechanism", 3GPP TSG WG1 Meeting #88bis, R1-1704400, Apr. 3-7, 2017, 6 Pages, Spokane, USA.

\* cited by examiner

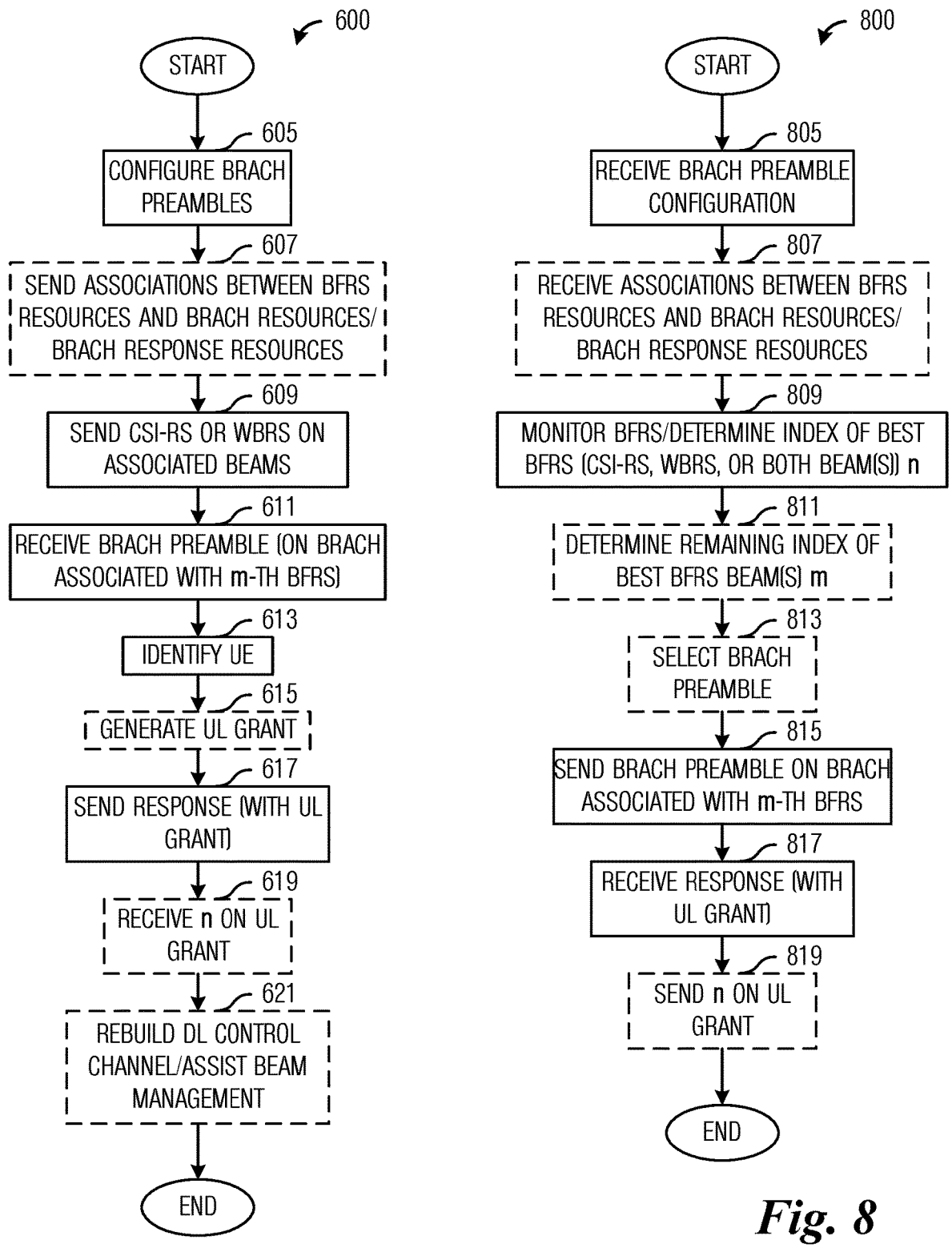

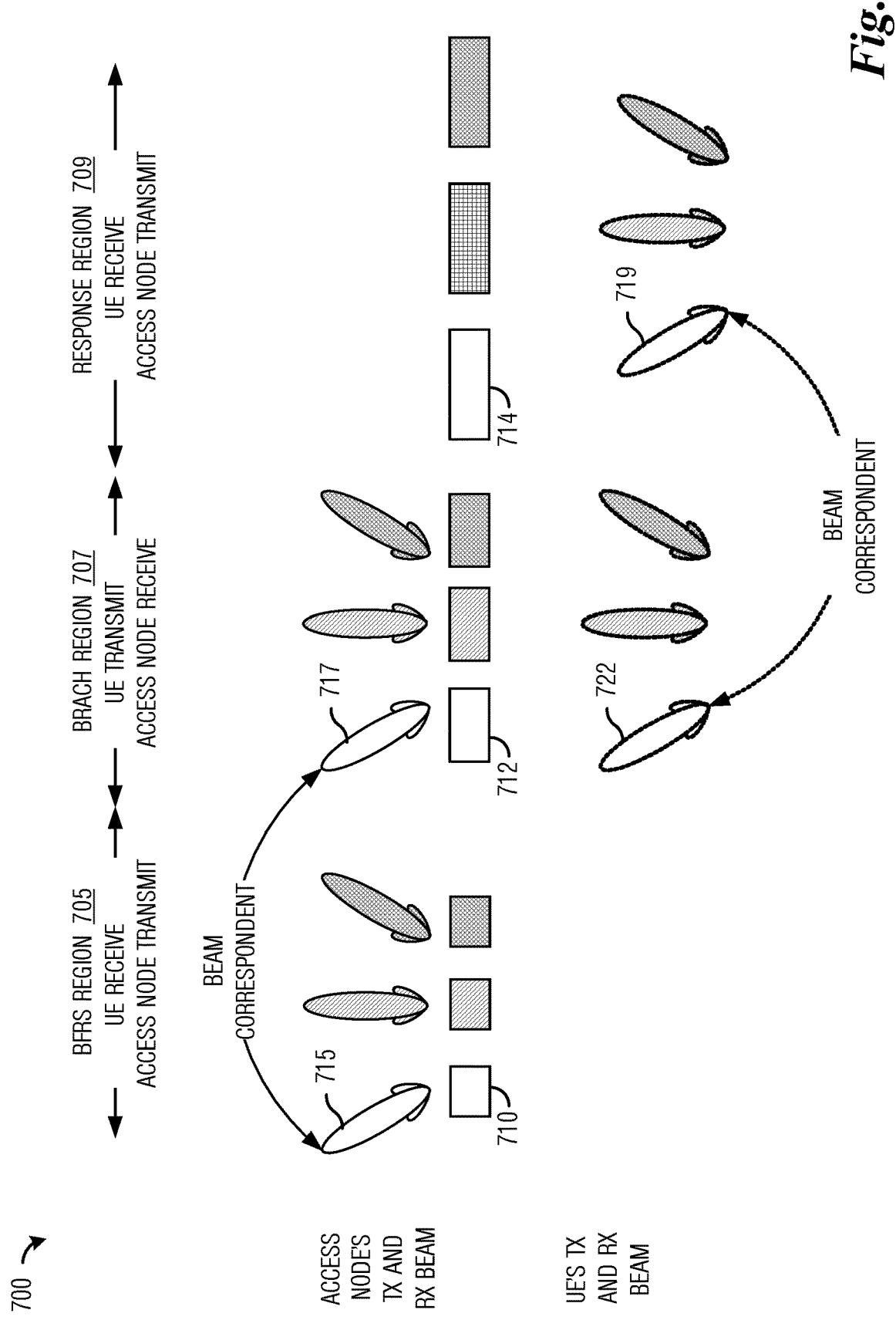

← 2000

| BRACH INDEX 2005 | TIME INDEX 2007 | SEC INDEX 2009 | BRACH FREQ. INDEX 2011 | BRACH SEQ. INDEX 2013 |
|---|---|---|---|---|
| 1 | 1 | 1 | 1 | A |
| 2 | 1 | 2 | 1 | B |
| 3 | 1 | 3 | 1 | C |
| 4 | 1 | 4 | 1 | D |
| 5 | 1 | 5 | 2 | A |
| 6 | 1 | 6 | 2 | B |
| 7 | 1 | 7 | 2 | C |
| 8 | 1 | 8 | 2 | D |
| 9 | 1 | 9 | 3 | A |
| 10 | 1 | 10 | 3 | B |
| 11 | 1 | 11 | 3 | C |
| 12 | 1 | 12 | 3 | D |
| 13 | 1 | 13 | 4 | A |
| 14 | 1 | 14 | 4 | B |
| 15 | 1 | 15 | 4 | C |
| 16 | 1 | 16 | 4 | D |
| 17 | 2 | 1 | 1 | A |
| 18 | 2 | 2 | 1 | B |
| 19 | 2 | 3 | 1 | C |
| 20 | 2 | 4 | 1 | D |
| 21 | 2 | 5 | 2 | A |
| 22 | 2 | 6 | 2 | B |
| 23 | 2 | 7 | 2 | C |
| 24 | 2 | 8 | 2 | D |
| 25 | 2 | 9 | 3 | A |
| 26 | 2 | 10 | 3 | B |
| 27 | 2 | 11 | 3 | C |
| 28 | 2 | 12 | 3 | D |
| 29 | 2 | 13 | 4 | A |
| 30 | 2 | 14 | 4 | B |
| 31 | 2 | 15 | 4 | C |
| 32 | 2 | 16 | 4 | D |
| ... | ... | ... | ... | ... |
| 64 | 4 | 16 | 4 | D |

| CSI-RS INDEX 2055 | MAPPED WBRS INDEX 2057 | SEC INDEX 2057 |
|---|---|---|
| 1 | 1 | 1 |
| 2 | 1 | 2 |
| 3 | 1 | 3 |
| 4 | 1 | 4 |
| 5 | 1 | 5 |
| 6 | 1 | 6 |
| 7 | 1 | 7 |
| 8 | 1 | 8 |
| 9 | 1 | 9 |
| 10 | 1 | 10 |
| 11 | 1 | 11 |
| 12 | 1 | 12 |
| 13 | 1 | 13 |
| 14 | 1 | 14 |
| 15 | 1 | 15 |
| 16 | 1 | 16 |
| 17 | 2 | 1 |
| 18 | 2 | 2 |
| 19 | 2 | 3 |
| 20 | 2 | 4 |
| 21 | 2 | 5 |
| 22 | 2 | 6 |
| 23 | 2 | 7 |
| 24 | 2 | 8 |
| 25 | 2 | 9 |
| 26 | 2 | 10 |
| 27 | 2 | 11 |
| 28 | 2 | 12 |
| 29 | 2 | 13 |
| 30 | 2 | 14 |
| 31 | 2 | 15 |
| 32 | 2 | 16 |
| ... | ... | ... |
| 64 | 2 | 16 |

| BFRS INDEX 2075 | BRACH INDEX 2077 |
|---|---|
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |
| 16 | 16 |
| 17 | 17 |
| 18 | 18 |
| 19 | 19 |
| 20 | 20 |
| 21 | 21 |
| 22 | 22 |
| 23 | 23 |
| 24 | 24 |
| 25 | 25 |
| 26 | 26 |
| 27 | 27 |
| 28 | 28 |
| 29 | 29 |
| 30 | 30 |
| 31 | 31 |
| 32 | 32 |
| ... | ... |
| 64 | 64 |

*Fig. 20C*

SYSTEM AND METHOD FOR COMMUNICATIONS BEAM RECOVERY

CROSS-REFERENCE TO RELATED APPLICATIONS

This application is a continuation of U.S. application Ser. No. 15/890,925, filed on Feb. 7, 2018, entitled "System and Method for Communications Beam Recovery," which claims the benefit of U.S. Provisional Application No. 62/479,965, filed on Mar. 31, 2017, entitled "Systems and Methods for Beam Recovery and Resource Allocation," U.S. Provisional Application No. 62/521,110, filed on Jun. 16, 2017, entitled "System and Method for Communications Beam Recovery," U.S. Provisional Application No. 62/544,420, filed on Aug. 11, 2017, entitled "System and Method for Communications Beam Recovery," and U.S. Provisional Application No. 62/581,314, filed on Nov. 3, 2017, entitled "System and Methods for Communications Beam Recovery," which applications are hereby incorporated herein by reference.

TECHNICAL FIELD

The present disclosure relates generally to a system and method for digital communications, and, in particular embodiments, to a system and method for communications beam recovery.

BACKGROUND

One possible deployment scenario for fifth generation (5G) New Radio (NR) system architecture uses high frequency (HF) (6 gigahertz (GHz) and above, such as millimeter wavelength (mmWave)) operating frequencies to exploit greater available bandwidth and less interference than what is available at the congested lower frequencies (below 6 GHz). However, pathloss is a significant issue in HF. Beamforming may be used to overcome the high pathloss issue in HF.

Under certain conditions, a user equipment (UE) device may detect that all existing communications beam between an evolved NodeB (eNB) and the UE are not working as expected (i.e., there is a beam failure and/or loss) and there is a need to recover from this condition.

Therefore, there is a need for mechanisms supporting communications beam recovery.

SUMMARY

Example embodiments provide a system and method for communications beam recovery.

In accordance with an example embodiment, a method for operating an access node is provided. The method includes generating, by the access node, a configuration message including information specifying a set of reference signals of a first reference signal type and a set of reference signals of a second reference signal type used to identify a new beam, and information specifying random access channel resources allocated for transmitting preamble sequences, wherein each random access channel resource is associated with a reference signal of the first reference signal type, sending, by the access node to one or more user equipments (UEs), the configuration message, receiving, by the access node from a UE, a preamble sequence on one of the random access channel resources, and determining, by the access node, an identity of the UE in accordance with the preamble sequence and the one of the random access channel resources.

Optionally, in any of the preceding embodiments, an embodiment wherein each reference signal in the first set of reference signals having a quasi-co-located (QCLed) or spatially similar relationship with a different subset of reference signals of the second set of reference signals of the second reference signal type.

Optionally, in any of the preceding embodiments, an embodiment wherein the configuration message is sent on at least one of a radio resource control (RRC) message, a medium access control (MAC) control element (CE) (MAC-CE) message, or a downlink control indicator (DCI) message.

Optionally, in any of the preceding embodiments, an embodiment wherein the set of reference signals of the first type comprises a set of synchronization signals (SSs).

Optionally, in any of the preceding embodiments, an embodiment wherein the set of reference signals of the second type comprises a set of channel state information reference signals (CSI-RSs).

Optionally, in any of the preceding embodiments, an embodiment wherein the random access channel resources comprise physical random access channel (PRACH) resources.

Optionally, in any of the preceding embodiments, an embodiment wherein each random access channel resource is also associated with a reference signal of the second reference signal type.

Optionally, in any of the preceding embodiments, an embodiment wherein the configuration message further comprises at least one of: time location information related to a first random access channel resource, frequency location information related to the first random access channel resource, preamble sequence information related to the first random access channel resource, or a first association between a first reference signal index and the first random access channel resource.

Optionally, in any of the preceding embodiments, an embodiment wherein the configuration message further comprises at least one of: time location information related to a second random access channel resource, frequency location information related to the second random access channel resource, preamble sequence information related to the second random access channel resource, or a second association between a second reference signal index and the second random access channel resource.

Optionally, in any of the preceding embodiments, an embodiment further includes determining, by the access node, an index of an identified reference signal as a first reference signal index when the preamble sequence is received on a first random access channel resource, and determining, by the access node, the index of the identified reference signal as a second reference signal index when the preamble sequence is received on a second random access channel resource.

Optionally, in any of the preceding embodiments, an embodiment further includes sending, by the access node to the UE, a beam failure recovery response on a control channel.

Optionally, in any of the preceding embodiments, an embodiment wherein the control channel comprises a physical downlink control channel (PDCCH).

Optionally, in any of the preceding embodiments, an embodiment wherein the control channel is spatially QCLed with the identified reference signal.

In accordance with an example embodiment, an access node is provided. The access node includes a memory storage comprising instructions, and one or more processors in communication with the memory storage. The one or more processors execute the instructions to generate a configuration message including information specifying a set of reference signals of a first reference signal type and a set of reference signals of a second reference signal type used to identify a candidate beam, and information specifying random access channel resources allocated for transmitting preamble sequences, wherein each random access channel resource is associated with a reference signal of the first reference signal type, send the configuration message to one or more UEs, receive, from a UE, a preamble sequence on one of the random access channel resources, and determine an identity of the UE in accordance with the preamble sequence and the one of the random access channel resources.

Optionally, in any of the preceding embodiments, an embodiment wherein the configuration message is sent on at least one of a RRC message, a MAC-CE message, or a DCI message.

Optionally, in any of the preceding embodiments, an embodiment wherein the one or more processors further execute instructions to determine an index of an identified reference signal as a first reference signal index when the preamble sequence is received on a first random access channel resource, and determine the index of the identified reference signal as a second reference signal index when the preamble sequence is received on a second random access channel resource.

Optionally, in any of the preceding embodiments, an embodiment wherein the one or more processors further execute instructions to send, to the UE, a beam failure recovery response on a control channel.

Optionally, in any of the preceding embodiments, an embodiment wherein each reference signal in the first set of reference signals having a QCLed or spatially similar relationship with a different subset of reference signals of the second set of reference signals of the second reference signal type.

In accordance with an example embodiment, a non-transitory computer-readable medium is provided. The non-transitory computer-readable medium stores programming for execution by one or more processors to generate a configuration message including information specifying a set of reference signals of a first reference signal type and a set of reference signals of a second reference signal type used to identify a candidate beam, and information specifying random access channel resources allocated for transmitting preamble sequences, wherein each random access channel resource is associated with a reference signal of the first reference signal type, send the configuration message to one or more UEs, receive, from a UE, a preamble sequence on one of the random access channel resources, and determine an identity of the UE in accordance with the preamble sequence and the one of the random access channel resources.

Optionally, in any of the preceding embodiments, an embodiment wherein the one or more processors further execute instructions to determine an index of an identified reference signal as a first reference signal index when the preamble sequence is received on a first random access channel resource, and determine the index of the identified reference signal as a second reference signal index when the preamble sequence is received on a second random access channel resource.

Optionally, in any of the preceding embodiments, an embodiment wherein the one or more processors further execute instructions to send, to the UE, a beam failure recovery response on a control channel.

In accordance with an example embodiment, a method for operating a user equipment (UE) is provided. The method includes monitoring, by the UE, a first set of reference signals of a first reference signal type transmitted by an access node, each reference signal in the first set of reference signals having a quasi-co-located (QCLed) or spatially similar relationship with a different subset of reference signals of a second set of reference signals of a second reference signal type, identifying, by the UE, a second reference signal from the second set of reference signals as a candidate beam, identifying, by the UE, a first reference signal of the first set of reference signals that is QCLed or spatially similar with the second reference signal, and transmitting, by the UE to the access node, a preamble sequence on a random access channel resource that is associated with the first reference signal of the first set of reference signals, thereby identifying the candidate beam for communications at the access node.

Optionally, in any of the preceding embodiments, an embodiment wherein the first set of reference signals comprises a set of synchronization signals (SSs), and wherein the second set of reference signals comprises a set of channel state information reference signals (CSI-RSs).

Optionally, in any of the preceding embodiments, an embodiment wherein first set of reference signals comprises cell specific reference signals.

Optionally, in any of the preceding embodiments, an embodiment wherein the second set of reference signals comprises UE specific reference signals.

Optionally, in any of the preceding embodiments, an embodiment further comprising receiving, by the UE, information about the QCLed or spatially similar relationship between the first set of reference signals and the second set of reference signals in at least one of a radio resource control (RRC) message, a medium access control (MAC) control element (CE) (MAC-CE) message, or a downlink control indicator (DCI) message.

Optionally, in any of the preceding embodiments, an embodiment wherein the random access channel resource is selected from a plurality of random channel access resources in accordance with the first reference signal.

Optionally, in any of the preceding embodiments, an embodiment wherein at least one of a time location of the random access channel resource, a frequency location of the random access channel resource, or a preamble sequence information related to the random access channel resource is selected in accordance with the first reference signal.

Optionally, in any of the preceding embodiments, an embodiment wherein the at least one of the time location of the random access channel resource, the frequency location of the random access channel resource, or the preamble sequence information related to the random access channel resource is received in at least one of a RRC message, a MAC-CE message, or a DCI message.

In accordance with an example embodiment, a method for operating an access node is provided. The method includes sending, by the access node to a UE, first information about a QCLed or spatially similar relationship between each reference signal in a first set of reference signals of a first reference signal type and a different subset of reference signals of a second set of reference signals of a second reference signal type, sending, by the access node to the UE, second information specifying a random access channel resource of a plurality of random access channel resources to use when a reference signal from the second set of reference signals is identified as a candidate beam, and receiving, by the access node from the UE, a preamble sequence on the random access channel resource, thereby identifying the candidate beam.

Optionally, in any of the preceding embodiments, an embodiment further comprising assigning, by the access node, the random access channel resource or the preamble sequence to the UE.

Optionally, in any of the preceding embodiments, an embodiment wherein the first set of reference signals of the first reference signal type comprises a set of synchronization signals (SSs), and wherein the second set of reference signals of the second reference signal type comprises a set of CSI-RSs)

Optionally, in any of the preceding embodiments, an embodiment wherein the first information is sent in at least one of a first RRC message, a first MAC-CE message, or a first DCI message, and wherein the second information is sent in at least one of a second RRC message, a second MAC-CE message, or a second DCI message.

In accordance with an example embodiment, a UE is provided. The UE includes a memory storage comprising instructions, and one or more processors in communication with the memory storage. The one or more processors execute the instructions to monitor a first set of reference signals of a first reference signal type transmitted by an access node, each reference signal in the first set of reference signals having a QCLed or spatially similar relationship with a different subset of reference signals of a second set of reference signals of a second reference signal type, identify a second reference signal from the second set of reference signals as a candidate beam, identify a first reference signal of the first set of reference signals that is QCLed or spatially similar with the second reference signal, and transmit, to the access node, a preamble sequence on a random access channel resource that is associated with the first reference signal of the first set of reference signals, thereby identifying the candidate beam for communications at the access node.

Optionally, in any of the preceding embodiments, an embodiment wherein the first set of reference signals comprises a set of SSs, and wherein the second set of reference signals comprises a set of CSI-RSs.

Optionally, in any of the preceding embodiments, an embodiment wherein the one or more processors further execute instructions to receive information about the QCLed or spatially similar relationship between the first set of reference signals and the second set of reference signals in at least one of a RRC message, a MAC-CE message, or a DCI message.

Optionally, in any of the preceding embodiments, an embodiment wherein the one or more processors further execute instructions to select the random access channel resource from a plurality of random access channel resources in accordance with the first reference signal.

Optionally, in any of the preceding embodiments, an embodiment wherein the one or more processors further execute instructions to select at least one of a time location of the random access channel resource, a frequency location of the random access channel resource, or a preamble sequence information related to the random access channel resource.

In accordance with an example embodiment, an access node is provided. The access node includes a memory storage comprising instructions, and one or more processors in communication with the memory storage. The one or more processors execute the instructions to send, to a UE, first information about a QCLed or spatially similar relationship between each reference signal in a first set of reference signals of a first reference signal type and a different subset of reference signals of a second set of reference signals of a second reference signal type, send, to the UE, second information specifying a random access channel resource of a plurality of random access channel resources to use when a reference signal from the second set of reference signals is identified as a candidate beam, and receive, from the UE, a preamble sequence on the random access channel resource, thereby identifying the candidate beam.

Optionally, in any of the preceding embodiments, an embodiment wherein the one or more processors further execute instructions to assign the random access channel resource or the preamble sequence to the UE.

Optionally, in any of the preceding embodiments, an embodiment wherein the first information is sent in at least one of a first RRC message, a first MAC-CE message, or a first DCI message, and wherein the second information is sent in at least one of a second RRC message, a second MAC-CE message, or a second DCI message.

In accordance with an example embodiment, a method for operating a UE is provided. The method includes determining, by the UE, a first identifier of a first reference signal resource associated with a first reference signal type transmitted by an access node, determining, by the UE, a second identifier of a second reference signal resource associated with a second reference signal type transmitted by the access node, sending, by the UE, a beam failure recovery request message including a sequence on a beam failure random access channel (BRACH) resource identified in accordance with at least one of the first identifier or the second identifier, and receiving, by the UE, a beam failure recovery response message.

Optionally, in any of the preceding embodiments, an embodiment wherein the method further comprises sending, by the UE, recovery information, and monitoring, by the UE, for a downlink control channel.

Optionally, in any of the preceding embodiments, an embodiment wherein the recovery information comprises the first identifier.

Optionally, in any of the preceding embodiments, an embodiment wherein the recovery information comprises at least one of the second identifier or an intra-group identifier identifying a third reference signal resource out of a group of first reference signal resources that are spatially QCL with the second reference signal resource identified by the second identifier.

Optionally, in any of the preceding embodiments, an embodiment wherein the beam failure recovery response message comprises a transmission grant, and wherein the recovery information is transmitted in accordance with the transmission grant.

Optionally, in any of the preceding embodiments, an embodiment wherein the method further comprises receiving, by the UE, a configuration of the sequence from the access node.

Optionally, in any of the preceding embodiments, an embodiment wherein the configured sequence from the access node is different for different UEs.

Optionally, in any of the preceding embodiments, an embodiment wherein the method further comprises receiving, by the UE, an association message with information about at least one of associations between one or more reference signal resources and one or more BRACH resources, associations between the one or more reference signal resources and one or more BRACH response resources, or associations between the one or more BRACH resources and the one or more BRACH response resources.

Optionally, in any of the preceding embodiments, an embodiment wherein the association message conveys information about a known relationship, in terms of time and/or frequency positions, of a first resource type relative to a second resource type.

Optionally, in any of the preceding embodiments, an embodiment wherein the BRACH resource is further identified in accordance with the association message.

Optionally, in any of the preceding embodiments, an embodiment wherein the method further comprises receiving, by the UE, first quasi co-located (QCL) information associated with a first reference signal of the first reference signal type and more than one reference signals of the second reference signal type, and/or second QCL information associated with one reference signal of the second reference signal type and more than one reference signals of the first reference signal type.

Optionally, in any of the preceding embodiments, an embodiment wherein the second identifier of the second reference signal resource associated with the second reference signal type is determined in accordance with the first QCL information and/or the second QCL information.

Optionally, in any of the preceding embodiments, an embodiment wherein the second identifier of the second reference signal resource associated with the second reference signal type is determined by monitoring second reference signal resources associated with the second reference signal type.

Optionally, in any of the preceding embodiments, an embodiment wherein the first identifier of the first reference signal resource associated with the first reference signal type is determined by monitoring first reference signal resources associated with the first reference signal type.

Optionally, in any of the preceding embodiments, an embodiment wherein a first time and/or frequency position associated with the beam failure recovery response message is determined in accordance with a second time and/or frequency position of a resource conveying the beam failure recovery request message and an association message conveying at least one of associations between one or more reference signal resources and one or more BRACH resources, or associations between one or more reference signal resources and one or more BRACH response resources.

Optionally, in any of the preceding embodiments, an embodiment wherein a third time and/or frequency position of a resource conveying the beam failure recovery request message is determined in accordance with a fourth time and/or frequency position of at least one of the first reference signal resource associated with a first reference signal type or the second reference signal resource associated with a second reference signal type.

Optionally, in any of the preceding embodiments, an embodiment wherein the first reference signal comprises a channel state information reference signal (CSI-RS) and the second reference signal comprises a wideband reference signal (WBRS).

Optionally, in any of the preceding embodiments, an embodiment wherein the WBRS comprises at least one of synchronization signals (SS), wide beam channel state information reference signals (WB CSI-RS), broad-beam channel state information reference signals (CSI-RS), SS-mimicking CSI-RS, cell-specific CSI-RS, group CSI-RS, or common CSI-RS.

Optionally, in any of the preceding embodiments, an embodiment wherein the CSI-RS comprises at least one of narrow beam CSI-RS or UE-specific CSI-RS.

Optionally, in any of the preceding embodiments, an embodiment wherein a fifth time and/or frequency position of the BRACH resource conveying the sequence is different from a sixth time and/or frequency position of a random access channel (RACH) used for initial access purposes.

Optionally, in any of the preceding embodiments, an embodiment wherein the second identifier is not explicitly transmitted by UE.

Optionally, in any of the preceding embodiments, an embodiment wherein the second identifier is determined by the access node implicitly in accordance with time and/or frequency positions of the BRACH resource conveying the sequence.

Optionally, in any of the preceding embodiments, an embodiment wherein a downlink control channel signal is spatial QCL with the first reference signal resource identified by the first identifier.

In accordance with an example embodiment, a method for operating an access node is provided. The method includes configuring, by the access node, preamble sequences on a BRACH resource to user equipments (UEs), receiving, by the access node, a beam failure recovery request message including a sequence on a beam failure random access channel (BRACH) resource, identifying, by the access node, a UE associated with the sequence, and sending, by the access node, a beam failure recovery response message including a transmission grant for the UE.

Optionally, in any of the preceding embodiments, an embodiment wherein the method further comprises receiving, by the access node, recovery information from the UE, setting up, by the access node, a control channel in accordance with the recovery information, and transmitting, by the access node, a control channel signal in accordance with a subset of the recovery information.

Optionally, in any of the preceding embodiments, an embodiment wherein the recovery information comprises a first identifier of a first reference signal resource associated with a first reference signal type transmitted by an access node, and wherein setting up the control channel comprises setting up the control channel in accordance with the first identifier.

Optionally, in any of the preceding embodiments, an embodiment wherein the recovery information comprises a second identifier of a second resource associated with a second reference signal transmitted by the access node and an intra-group identifier identifying a group of first reference signal resources associated with a first reference signal type that is spatially QCL with a second reference signal resource associated with a second reference signal type, and wherein setting up the control channel includes determining a first identifier of a first reference signal resource associated with a first reference signal type transmitted by an access node in accordance with the second identifier and the intra-group identifier, and setting up the control channel in accordance with the first identifier.

Optionally, in any of the preceding embodiments, an embodiment wherein the recovery information comprises an intra-group identifier identifying a group of first reference signal resources associated with a first reference signal type that is spatially QCL with a second reference signal resource associated with a second reference signal type, and wherein setting up the control channel includes determining a second identifier of a second resource associated with the second reference signal transmitted by the access node, determining a first identifier of a first reference signal resource associated with a first reference signal type transmitted by an access node in accordance with the second identifier and the intra-group identifier, and setting up the control channel in accordance with the first identifier.

Optionally, in any of the preceding embodiments, an embodiment wherein the beam failure recovery response message comprises a transmission grant, and wherein the recovery information is received in accordance with the transmission grant.

Optionally, in any of the preceding embodiments, an embodiment wherein the method further comprises transmitting, by the access node, one or more precoded first reference signals on one or more first reference signal resources associated with a first reference signal type, and transmitting, by the access node, one or more precoded second reference signals on one or more second reference signal resources associated with a second reference signal type.

Optionally, in any of the preceding embodiments, an embodiment wherein the method further comprises configuring, by the access node, the sequence for the UE.

Optionally, in any of the preceding embodiments, an embodiment wherein the method further comprises sending, by the access node, an association message conveying at least one of associations between one or more reference signal resources and one or more BRACH resources, associations between the one or more BRACH resources and one or more BRACH response resources, or associations between the one or more reference signal resources and the one or more BRACH response resources.

Optionally, in any of the preceding embodiments, an embodiment wherein the method further comprises sending, by the access node, quasi co-located (QCL) information between first reference signal resources associated with a first reference signal type and second reference signal resources associated with the second reference signal type.

In accordance with an example embodiment, a method for operating a user equipment (UE) is provided. The method includes determining, by the UE, a first identifier of a first reference signal resource associated with a first reference signal type transmitted by an access node, determining, by the UE, a second identifier of a second reference signal resource associated with a second reference signal type transmitted by the access node, sending, by the UE, a beam failure recovery request message including a sequence selected from one or more sequences associated with the UE, the beam failure recovery request message is sent on a beam failure random access channel (BRACH) resource identified in accordance with the second identifier, and monitoring, by the UE, for a downlink control channel.

Optionally, in any of the preceding embodiments, an embodiment wherein the method further comprises receiving, by the UE, a configuration of the plurality of sequences associated with the UE from the access node.

Optionally, in any of the preceding embodiments, an embodiment wherein the method further comprises receiving, by the UE, an association message conveying at least one of associations between one or more reference signal resources and one or more BRACH resources, associations between the one or more reference signal resources and one or more BRACH response resources, or associations between the one or more BRACH resources and the one or more BRACH response resources.

Optionally, in any of the preceding embodiments, an embodiment wherein the BRACH resource is further identified in accordance with the association message conveying associations between the one or more reference signal resources and the one or more BRACH resources.

Optionally, in any of the preceding embodiments, an embodiment wherein the method further comprises receiving, by the UE, QCL information between first reference signal resources associated with the first reference signal type and second reference signal resources associated with the second reference signal type.

Optionally, in any of the preceding embodiments, an embodiment wherein the second identifier of the second resource associated with the second reference signal is determined in accordance with the QCL information.

Optionally, in any of the preceding embodiments, an embodiment wherein the second identifier of the second resource associated with the second reference signal is determined by monitoring second resources associated with the second reference signal.

Optionally, in any of the preceding embodiments, an embodiment wherein the plurality of sequences associated with the UE comprises extended sequences, wherein each extended sequence includes a base sequence common to all extended sequences and a unique tail sequence.

Optionally, in any of the preceding embodiments, an embodiment wherein the plurality of sequences associated with the UE comprises sequences that are different from one another.

In accordance with an example embodiment, a method for operating an access node is provided. The method includes receiving, by the access node, a beam failure recovery request message including a sequence on a beam failure random access channel (BRACH) resource, identifying, by the access node, a user equipment (UE) associated with the sequence, determining, by the access node, a second identifier of a second reference signal resource associated with a second reference signal type in accordance with a position of the BRACH resource, determining, by the access node, an intra-group identifier identifying a group of first reference signal resources associated with a first reference signal type that is spatially quasi co-located (QCL) with the second reference signal resource associated with the second reference signal type, determining, by the access node, a first identifier of the first reference signal resource associated with the first reference signal type in accordance with the second identifier and the intra-group identifier, and setting up, by the access node, a control channel in accordance with the first identifier.

Optionally, in any of the preceding embodiments, an embodiment wherein the method further comprises configuring, by the access node, one or more sequences for the UE, and sending, by the access node, the plurality of sequences to the UE.

Optionally, in any of the preceding embodiments, an embodiment wherein the method further comprises transmitting, by the access node, precoded first reference signals on first reference signal resources associated with the first reference signal type, and transmitting, by the access node, precoded second reference signals on the second reference signal resources associated with the second reference signal type.

Optionally, in any of the preceding embodiments, an embodiment wherein the method further comprises sending, by the access node, an association message conveying at least one of associations between one or more reference signal resources and one or more BRACH resources, associations between the one or more reference signal resources and one or more BRACH response resources, or associations between the one or more BRACH resources and the one or more BRACH response resources.

Optionally, in any of the preceding embodiments, an embodiment wherein the method further comprises sending, by the access node, QCL information between first reference signal resources associated with a first reference signal type and second reference signal resources associated with the second reference signal type.

In accordance with an example embodiment, a method for operating a user equipment (UE) is provided. The method includes determining, by the UE, a beam index of a replacement beam in accordance with a first reference signal received from an access node, identifying, by the UE, a beam failure random access channel (BRACH) resource in accordance with the beam index and an association between beam indices and block indices, and sending, by the UE, a preamble sequence in the BRACH resource.

Optionally, in any of the preceding embodiments, an embodiment wherein the method further comprises receiving, by the UE, the association between beam indices and block indices.

Optionally, in any of the preceding embodiments, an embodiment wherein the association between beam indices and block indices is received from the access node.

Optionally, in any of the preceding embodiments, an embodiment wherein the association between beam indices and block indices is a direct association between the beam indices and the block indices.

Optionally, in any of the preceding embodiments, an embodiment wherein the association between beam indices and block indices is an indirect association between the beam indices and the block indices.

Optionally, in any of the preceding embodiments, an embodiment wherein the method further comprises selecting, by the UE, the preamble sequence from one or more preamble sequences.

In accordance with an example embodiment, a method for operating an access node is provided. The method includes receiving, by the access node from a user equipment (UE), a preamble sequence in a beam failure random access channel (BRACH) resource, determining, by the access node, a beam index of a replacement beam selected by the UE in accordance with a reference signal transmitted by the access node, wherein the beam index is determined in accordance with a block index associated with the BRACH resource and an association between beam indices and block indices, and completing, by the access node, a beam failure recovery procedure in accordance with the beam index.

Optionally, in any of the preceding embodiments, an embodiment wherein the method further comprises signaling, by the access node, the association between beam indices and block indices.

Optionally, in any of the preceding embodiments, an embodiment wherein the association between beam indices and block indices is signaled in a radio resource control (RRC) message.

Optionally, in any of the preceding embodiments, an embodiment wherein the method further comprises identifying, by the access node, an identity of the UE.

Optionally, in any of the preceding embodiments, an embodiment wherein the beam failure recovery procedure is completed in accordance with the identity of the UE.

In accordance with an example embodiment, a method for operating a user equipment (UE) is provided. The method includes selecting, by the UE, a resource for conveying a preamble to an access node from one or more resources, wherein the plurality of resources is shared with other UEs in at least one of a code sequence domain, a time domain, or a frequency domain, and sending, by the UE to the access node, a preamble associated with the UE in the selected resource.

In accordance with an example embodiment, a method for operating an access node is provided. The method includes configuring, by the access node, one or more resources for conveying preambles from user equipments (UEs), wherein the plurality of resources is shared by the UEs in at least one of a code sequence domain, a time domain, or a frequency domain, and sending, by the access node, the configuration to the UEs.

Optionally, in any of the preceding embodiments, an embodiment wherein the method further comprises receiving, by the access node from a subset of the UEs, preambles in the plurality of resources.

Practice of the foregoing embodiments enables UEs to participate and assist in beam recovery in the event of a beam loss or failure.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 6 illustrates a flow diagram of example operations occurring in an access node participating in beam recovery using a BFRS according to example embodiments described herein;

FIG. 7 illustrates a diagram highlighting an example association between resources and beams used in beam recovery according to example embodiments described herein;

FIG. 8 illustrates a flow diagram of example operations occurring in a UE participating in beam recovery using a BFRS according to example embodiments described herein;

FIGS. 20A and 20B illustrate tables of relative indices of block indices of an example BRACH block configuration and relative indices of beam indices of CSI-RS according to example embodiments described herein;

FIG. 20C illustrates a table of an example direct association between beam indices and block indices according to example embodiments described herein;

DETAILED DESCRIPTION OF ILLUSTRATIVE EMBODIMENTS

The making and using of the example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
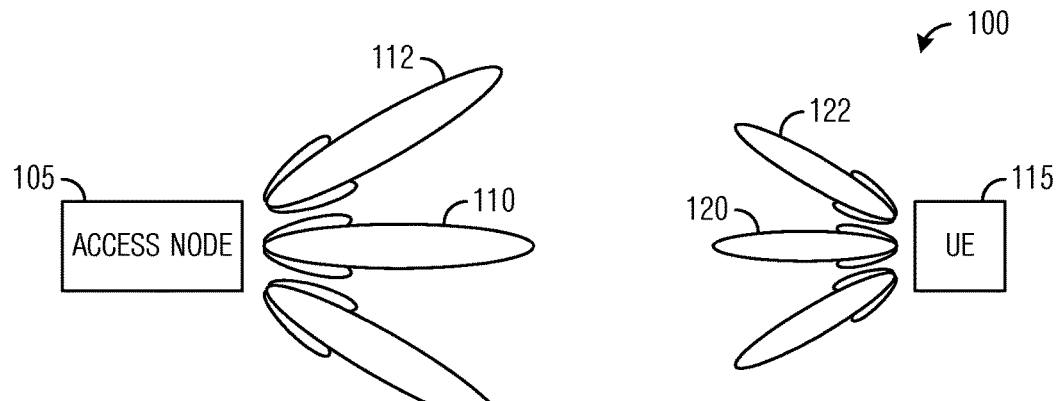
FIG. 1 illustrates an example wireless communications system according to example embodiments described herein.

FIG. 1 illustrates an example wireless communications system 100. Communications system 100 includes an access node 105 serving a user equipment (UE) 115. In a first operating mode, communications to and from UE 115 pass through access node 105. In a second operating mode, communications to and from UE 115 do not pass through access node 105, however, access node 105 typically allocates resources used by UE 115 to communicate. Access nodes may also be commonly referred to as evolved NodeBs (eNBs), base stations, NodeBs, master eNBs (MeNBs), secondary eNBs (SeNBs), next generation (NG) NodeBs (gNBs), master gNBs (MgNBs), secondary gNBs (SgNBs), remote radio heads, access points, and the like, while UEs may also be commonly referred to as mobiles, mobile stations, terminals, subscribers, users, stations, and the like.

While it is understood that communications systems may employ multiple access nodes capable of communicating with a number of UEs, only one access node and one UE are illustrated for simplicity.

As discussed previously, pathloss in communications systems operating at high frequency (HF) (6 gigahertz (GHz) and above, such as millimeter wavelength (mmWave)) operating frequencies is high, and beamforming may be used to overcome the high pathloss. As shown in FIG. 1, both access node 105 and UE 115 communicate using beamformed transmissions and receptions. As an example access node 105 communicates using one or more communications beams, including beams no and 112, while UE 115 communicates using one or more communications beams, including beams 120 and 122.

A beam may be a pre-defined set of beamforming weights in the context of codebook-based precoding or a dynamically defined set of beamforming weights in the context of non-codebook based precoding (e.g., Eigen-based beamforming (EBB)). A beam may also be a pre-defined set of phase shift preprocessors combining signals from the antenna array in the radio frequency (RF) domain. It should be appreciated that a UE may rely on codebook-based precoding to transmit uplink signals and receive downlink signals, while a TRP may rely on non-codebook based precoding to form certain radiation patterns to transmit downlink signals and/or receive uplink signals.

A variety of limitations exist that may limit the performance of a UE, the limitations include:

Electromagnetic coupling: The electric currents on the surface of the antenna of the UE induce various forms of electric magnetic coupling, which affects the characteristic impedance and antenna aperture efficiency;

Physical size: In general, the display panel and battery of a UE occupy the largest percentage of the volume of the UE, while various other devices (including sensors, cameras, speakers, etc.) also take up a significant portion of the remaining volume and are usually placed on the edges of the UE. Antennas (third generation (3G), fourth generation (4G), fifth generation (5G) new radio (NR), and so on) are also present. Power consumption, heat dissipation, and so forth, also have an impact on physical size;

Usage: The intended usage of the UE also has an impact on the performance of UE; As an example, the hand of the use may reduce the gain of the antenna array by an average of 10 dB when it completely encompasses the array; and Antenna array configuration: Multiple antenna arrays may be used; potentially requiring multiple radio frequency (RF) integrated circuits (ICs) and a single baseband (BB) IC (BBIC).

It is noted that the movement of the UE may lead to significant degradation in the signal quality. However, the movement may be detected using a variety of sensors, including:

Three dimensional (3D) gyroscopes with a root mean squared (RMS) noise on the order of 0.04 degrees per second;

3D accelerometers with a RMS noise on the order of 1 milli-g; and

Magnetometers.

If the movement of the UE is known, it may possible to quickly track the beams used by the UE.

Figure 2:
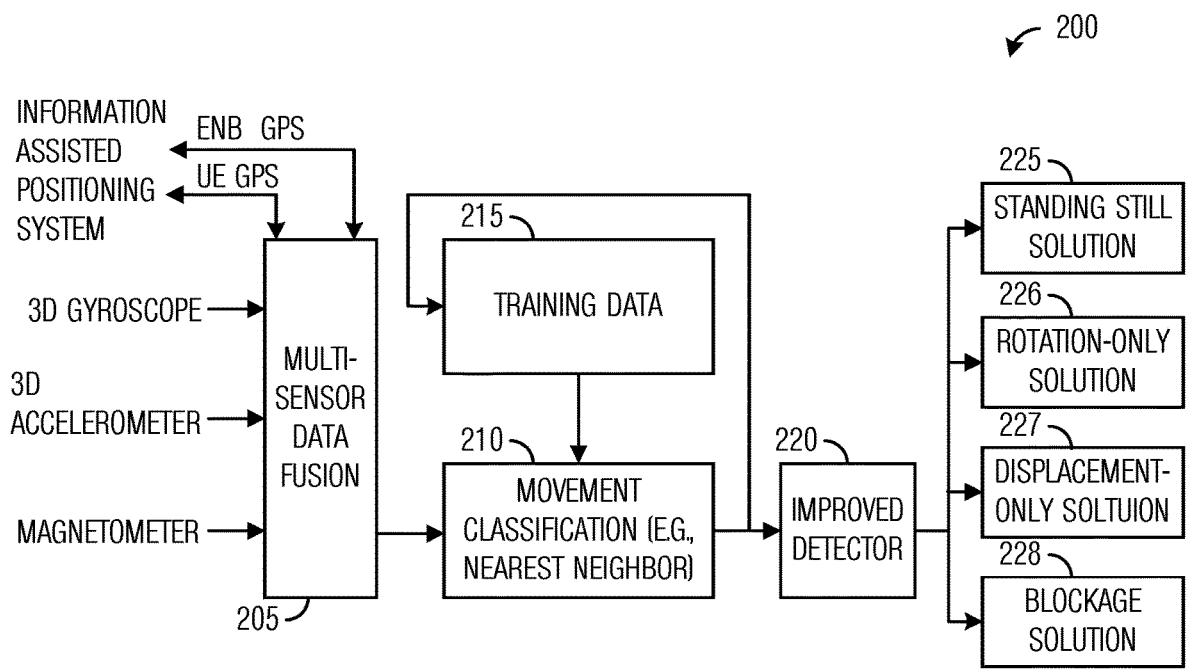
FIG. 2 illustrates an example beam tracking system according to example embodiments described herein.

FIG. 2 illustrates an example beam tracking system 200. Beam tracking system 200 may be located in a UE. Beam tracking system 200 uses data from one or more sensors (including position information from information assisted positioning systems (such as a Global Positioning System (GPS)), 3G gyroscopic information, 3D accelerometer information, magnetometer information, and so on) to perform beam tracking. A data unit 205 receives sensor data and processes the data, providing the processed data to a movement classification unit 210 that classifies the type of movement the UE is undergoing. Movement classification unit 210 also receives information from a training data unit 215 that provides information to movement classification unit 210 based on historical data to help in the classification of the movement of the UE. The classified movement is provided to a detector 220. Detector 220 may consider if the movement of the UE warrants beam tracking adjustments. Should beam tracking adjustments be warranted, beam tracking adjustment solutions are generated. Examples of solutions include a beam adjustment for a situation where the UE is standing still 225, a beam adjustment for a situation where the UE is rotating 226, a beam adjustment for a situation where the UE is experiencing a displacement 227, and a beam adjustment for a situation where the UE is blocked 228.

Resources may be allocated for beam recovery purposes. As used herein, the resources refer to time resources, frequency resources, preamble sequence resources, or a combination thereof. The beam recovery resources may be allocated when a UE establishes an active link with the access node. Each UE may be assigned one or more unique beam recovery resources. In a first example embodiment, the beam recovery resources are beam recovery random access channel (BRACH) preambles, which may be transmitted in a BRACH region. It is noted that the BRACH region may be the same or different from a physical random access channel (PRACH) region used for initial access purposes in terms of time and/or frequency locations within the entire operating band. In a second example embodiment, the beam recovery resources are sets of unique resources (i.e., each UE may be allocated multiple resources), where for each UE, each resource can be used for beam recovery purposes. As used herein, resources, regions and preambles for beam failure recovery are referred to BRACH resources, regions, and preambles. It is noted that they may also be referred to as PRACH resources, regions, and preambles for beam failure recovery purpose as well. The discussion presented here will use BRACH for simplicity.

With regard to the BRACH and PRACH, in a first example embodiment, if the two channels use different or orthogonal resources in time or frequency, the same sequence may be used in both the BRACH and the PRACH. As an illustrative example, if a UE is assigned a first sequence to transmit in the PRACH region, the UE may also use the first sequence to transmit in the BRACH region. In a second example embodiment, if the same sequence is used as the PRACH preamble and the BRACH preamble, different scrambling codes may be used. As an illustrative example, if a first UE is assigned to use the first sequence to transmit in the PRACH region, the first sequence, when scrambled by a first scrambling sequence, may be used by the first UE to transmit in the BRACH region. It is noted that the scrambling sequence for different UEs may be the same or different. It is also noted that multiple BRACH resources may exist, each occupying a different time-frequency location. In such a situation, the same sequence may be used in different BRACHs.

In a third example embodiment, the sequences used as the PRACH preamble sequence and the BRACH preamble sequence itself may be orthogonal. In a fourth example embodiment, if the BRACH and PRACH channels use the same and/or overlapping time and/or frequency resources, the PRACH preamble sequence and the BRACH preamble sequence may be orthogonal to each other. It is noted that multiple BRACH resources may exist, each occupying the same time and/or frequency position. In such a situation, multiple orthogonal preamble sequences may be used for multiple BRACH resources, each uniquely identifying a unique BRACH resource. Overall, for each UE, multiple BRACH channels may exist and each BRACH channel may be uniquely identified by the time and/or frequency location as well as the preamble sequence used by the UE to convey the beam failure event.

Figure 3:
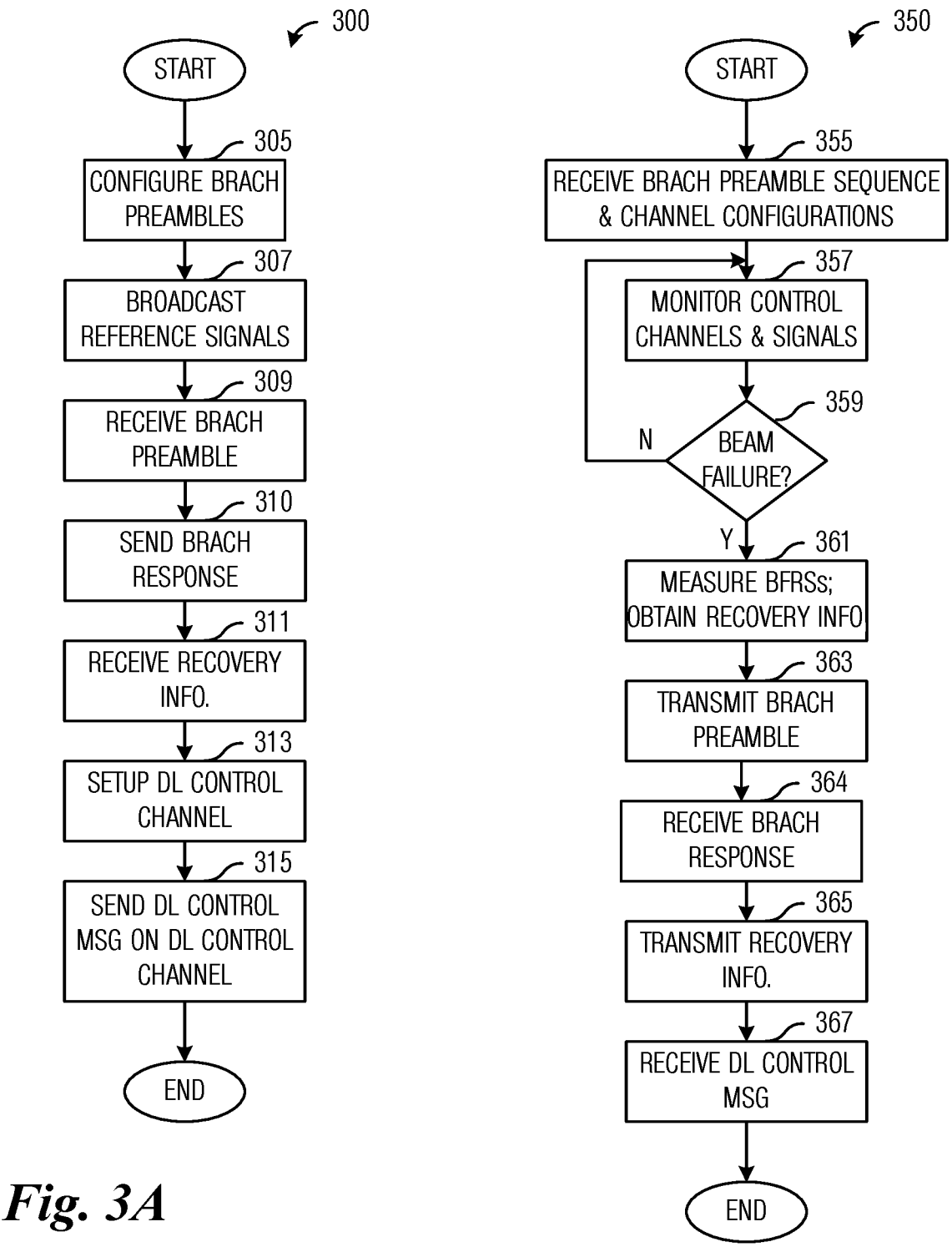
FIG. 3A illustrates a flow diagram of example operations occurring in an access node participating in a beam recovery procedure according to example embodiments described herein.
FIG. 3B illustrates a flow diagram of example operations occurring in a UE participating in a beam recovery procedure according to example embodiments described herein.

FIG. 3A illustrates a flow diagram of example operations 300 occurring in an access node participating in a beam recovery procedure. Operations 300 may be indicative of operations occurring in an access node as the access node participates in a beam recovery procedure.

Operations 300 begin with the access node configuring BRACH preamble sequences (block 305). In general the configuration may be transmitted to a UE in a radio resource configuration message, medium access control element message, downlink control indicator message, or a combination thereof. The configuration message should provide to the UE information regarding which preamble sequence to use, at which time position and frequency position to transmit the preamble, e.g., the time and frequency location of the BRACH channel, and so forth. The BRACH preamble sequences may be transmitted by the UE over the BRACH channels when needed, such as to request beam recovery. The access node may configure a unique BRACH preamble sequence for each UE. Alternatively, a single BRACH preamble sequence may be assigned to multiple UEs. Alternatively, multiple BRACH preamble sequences may be assigned to each UE. The access node also conveys the BRACH preamble sequences to the UEs. The access node sends, e.g., broadcasts, reference signals to assist the UEs in detecting beam failure as well as new beam identification (block 307). The reference signals may include beam recovery reference signals (BRRS), wide beam reference signals (WBRS) (such as synchronization signals (SS), wide beam channel state information reference signals (WB CSI-RS), broad-beam CSI-RS, SS-mimicking CSI-RS, cell-specific CSI-RS, group CSI-RS, common CSI-RS, Layer 3 mobility CSI-RS, and so on), channel state information reference signals (CSI-RS), and so on, may be transmitted by the access node so that a UE may measure to determine if a beam failure has occurred. The reference signals may also help the UE determine recovery information useful in the setting up of a replacement DL control channel, or in other words, if a new beam has been identified. In the subsequent discussion, the term beam failure reference signal (BFRS) is used to represent the above reference signals, which may include BRRSs, WBRSs, CSI-RSs, or combinations thereof. It is noted that the reference signal for beam failure determination or detection and the reference signal for new beam identification may be the same set of reference signals, or different sets of reference signals. The access node receives a BRACH preamble from a UE at a BRACH channel (block 309). The access node transmits a Beam Recovery Request Response (block 310), which may, or may not, include an UL grant for the UE to transmit further recovery information. If the UL grant for the UE to transmit further recovery information is included, the access node receives extra recovery information from the UE (block 311). The extra recovery information may include information useful in setting up a DL control channel with the UE. The access node sets up a DL control channel (block 313). The access node sends DL control messages on the DL control channel (block 315). The DL control messages may include control signaling. In an alternative embodiment, blocks 309 and 311 may be performed together, meaning that the preamble as well as the recovery information is received by the access node in a single transmission. In such a situation, blocks 310, 313, and 315 may be performed together.

FIG. 3B illustrates a flow diagram of example operations 350 occurring in a UE participating in a beam recovery procedure. Operations 35o may be indicative of operations occurring in a UE as the UE participates in a beam recovery procedure.

Operations 35o begin with the UE receiving a BRACH preamble sequence configuration as well as BRACH channel configuration from an access node (block 355). As discussed previously, the BRACH preamble sequence configuration provides information to the UE regarding which preamble to transmit in case of beam failure, while the BRACH channel configuration provides information to the UE regarding at which time and frequency position to transmit the BRACH preamble sequence. Such configuration messages may be received by the UE in a radio resource control (RRC) message, medium access control (MAC) control element (CE) (MAC-CE) message, downlink control indicator (DCI) message, or a combination thereof. The UE monitors downlink (DL) channels or signals, e.g., DL control channels, DL reference signals, synchronization signals, and so on (block 357). The UE may monitor the DL channels or signals to determine if a beam failure or loss has occurred. As an example, if the UE is unable to detect the existence of a particular resource, such as BRRS, WBRS (such as SS, WB CSI-RS, broad-beam CSI-RS, SS-mimicking CSI-RS, cell-specific CSI-RS, group CSI-RS, common CSI-RS, and so on), CSI-RS (such as narrow beam CSI-RS, UE-specific CSI-RS, Layer 3 mobility CSI-RS, and so forth), etc., the UE may determine that a beam failure has occurred. The UE performs a check to determine if beam failure has occurred (block 359). If a beam failure has not occurred, the UE returns to block 357 to continue to monitor the DL channels or signals. As an example, if the measurement made by the UE does not meet a beam failure condition, the UE determines that a beam failure has not occurred. If the measurement does meet the beam failure condition, the UE determines that a beam failure has occurred.

If a beam failure has occurred, the UE performs measurements of BFRSs and obtains recovery information (block 361). As an illustrative example, the UE measures certain reference signals, i.e., BFRS, such as BRSS, WBRS, CSI-RS, etc., to re-detect or re-synchronize with beams transmitted by the access node. The UE may determine recovery information, including DL transmit beam(s) (or associated index/indices) of the reference signals from the access node or which DL transmit beam provides sufficient quality. In other words, the UE determines with DL transmit beam has a signal quality that meets a threshold, which may be specified in a technical standard, an operator of the communications system, or determined through collaboration between the UE and the access node. Alternatively, the UE selects the DL transmit beam with the highest signal quality. The measurements may also improve time or frequency synchronization. The location in time or frequency of the reference signals may be signaled from the access node a priori and may be periodically allocated in the time and frequency domains. Such a signaling may be included in a RRC message, a MAC-CE message, a DCI message, or a combination thereof.

The UE transmits the BRACH preamble (block 363) if a beam failure has been detected and a new beam been identified. The transmission of the BRACH preamble initiates beam recovery. In a first example embodiment, the UE transmits its own preamble sequence in the BRACH region. The BRACH region may be non-orthogonal or orthogonal to the PRACH region in the time or frequency domain. In a second example embodiment, the UE transmits control or commands in a grant-free manner on resource elements (REs). The transmission of control or commands is a grant-free approach and may use REs pre-allocated to the UE. The uplink (UL) transmission may rely on time or frequency synchronization performed previously. The UE monitor DL channels for Beam Recovery Request Response that may, or may not, include an UL grant to transmit extra recovery information (block 364). If a UL grant is received, the UE transmits extra recovery information (block 365). The extra recovery information may include an index or indices of DL transmit beams or DL reference signals for new beam identification from the access node, channel quality indication(s) (such as reference signal received power (RSRP), reference signal received quality (RSRQ), received signal strength, signal to noise ratio (SNR), signal to noise plus interference ratio (SINR), received signal strength indicator (RSSI), and so on), as well as other information useful to the access node in the setting up of a DL control channel. The UE receives DL control messages on a DL control channel setup by the access node (block 367). Alternatively, blocks 363 and 365 may occur in a single transmission. In this situation, block 364 and block 367 may occur together.

In general, a UE may monitor a reference signal, such as a BFRS to determine if a beam failure condition has been met and if a new beam has been identified. As an example, a BFRS includes a set of CSI-RSs for beam management purposes. As another example, BFRS includes a set of SSs. In general, BFRS includes CSI-RSs, WBRSs, or both CSI-RSs and WBRSs. It is noted that the reference signals for beam failure determination or detection and the reference signals for new beam identification may be the same set of reference signals, or different set of reference signals. In other words, the reference signal for beam failure detection includes CSI-RSs, WBRSs, or both CSI-RSs and WBRSs, and the reference signal for new beam identification includes CSI-RSs, WBRSs, or both CSI-RSs and WBRSs.

According to an example embodiment, techniques utilizing a BFRS (for beam failure detection and new beam identification) that includes both a set of CSI-RSs and a set of WBRS are provided. It is noted that the BFRS including the reference signal for beam failure detection with both CSI-RS and WBRS, and the new reference signal for beam identification also with both CSI-RS and WBRS is one example embodiment. Other example embodiments include:

the reference signal for beam failure detection includes CSI-RS only, WBRS-only, or both; and the new reference signal for beam failure identification includes CSI-RS only, WBRS-only, or both. According to another example embodiment, techniques utilizing a beam failure RS that includes only a CSI-RS are provided. Both example embodiments use a common framework. A difference in the example embodiment exists in which a UE uses a single BRACH resource (identified using detected CSI-RS, WBRS, or a combination thereof) or multiple BRACH resources to transmit the BRACH preamble.

An example communications system as presented below is used to facilitate discussion. However, the example embodiments presented herein are operable with other communications system configurations. The example communications system includes:

Access nodes that configure the UEs with one or more unique BRACH preamble sequences within a BRACH region. A UE, for beam recovery purposes, may use one of the configured BRACH preamble sequence to send a beam recovery request on the BRACH region. Usually, the BRACH region is parameterized by at least its time and frequency location information, and the time-frequency parameters may be included in a radio resource configuration message.

Access nodes send out multiple BFRSs (including WBRSs or CSI-RSs or both) in N resources (where N is an integer number). A different precoding of the BFRS may be used in different resources. It is noted that herein the BFRS is used mainly for the function of new beam identification, but it is possible to use the BFRS for the function of beam failure detection.

Access nodes may configure B BRACH regions or resources (where B is an integer number), e.g., via a RRC message, MAC-CE message, DCI message, or a combination thereof. As an example, B=N, but it is not necessary that B=N. The N BRACH regions or resources may occur after the N BFRS resources (i.e., the resources containing the N BFRSs). The access nodes may signal a relationship or association between the N (as well as B in general) BRACH resources and the N BFRS resources. To generalize, the access node may signal a relationship or association between the N BRACH resources and the N BFRS resources. An illustrative example of the relationship or association is that the transmit precoder of the N BFRS resources and the receive combiner (also commonly referred to as a precoder at the receiver side) of the N BRACH resources have a one-to-one association, e.g., a transmit precoder of a first BFRS resource has a reciprocal beam correspondence relationship with a receive combiner of a first BRACH resource. Another illustrative example of the relationship or association is that the locations of the N BRACH resources in time-frequency can be determined from the locations of the N BFRS resources in time-frequency relative to a reference resource, or vice versa. In other words, if a first BFRS resource containing a first BFRS reference signal is identified, a first BRACH resource in a first time-frequency location should be used by the UE to transmit the beam failure recovery preamble sequence; and so on and so forth. Conversely, if a first BRACH resource in a first time-frequency location is used by the UE to transmit the beam failure recovery preamble sequence, it should explicitly or implicitly inform the access node that a first BFRS resource containing a first BFRS reference signal has been identified by the UE; and so on and so forth. Alternatively, the relationship is specified in a technical standard or by an operator of the communications system. If the relationship or association is specified in a technical standard or by an operator of the communications system, explicit signaling of such a relationship or association may not be needed.

Figure 4:
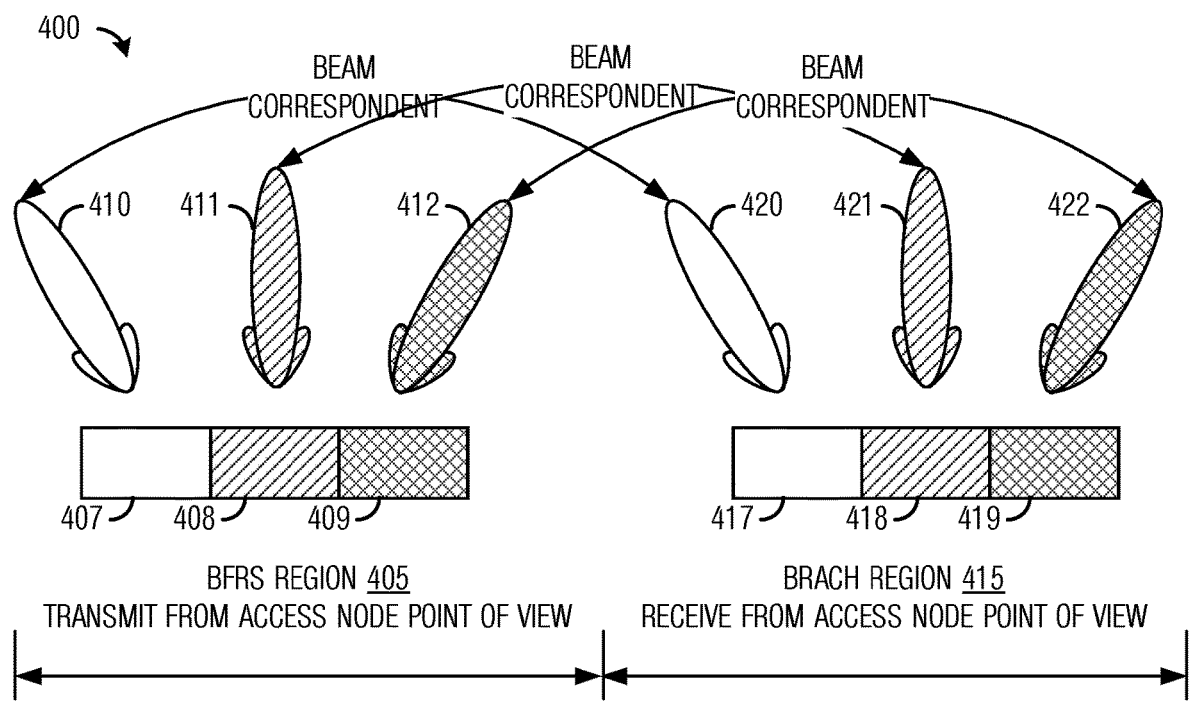
FIG. 4 illustrates a diagram highlighting an example one-to-one association between transmit precoder of WBRS resources and receive combiners of BRACH resources according to example embodiments described herein.

FIG. 4 illustrates a diagram 400 highlighting an example one-to-one association between transmit precoder of WBRS resources and receive combiners of BRACH resources. As shown in FIG. 4, a BFRS region 405 presents BFRS resources 407, 408, and 409, as well as DL transmit beams 410, 411, and 412, of an access node, while a BRACH region 415 presents BRACH resources 417, 418, and 419, as well as UL receive beams 420, 421, and 422 of the access node. It is noted that although communications beam of the access node are displayed in FIG. 4, similar beams of a UE may be shown in their place.

As shown in diagram 400, there is a one-to-one association or relation between the transmit precoders of the DL transmit beams of the access node and the receive combiners of the UL receive beams of the access node. In the particular example illustrated in FIG. 4, the one-to-one association or relation is referred to as beam correspondence (BC). In communications systems that are operating at higher frequencies, such as millimeter wavelength (mmWave) communications systems, communications devices generally have a large number of transmit or receive antennas that share a smaller number of radio frequency (RF) chains. From the perspective of a communications device, the beamformed transmit and receive beams should have the same (or substantially the same) beam pattern (in terms of peak or non-peak beam direction, peak or non-peak beam gain, peak or non-peak beam width, and so on, for example) in the spatial domain. This means that for each beamformed beam, the beam response on all directions should be the same (or substantially the same) from the point of view of the transmitter and the receiver. This is known as the beam correspondence condition, and when the beam correspondence condition is met, beam correspondence is achieved. For example, the transmit precoder of DL transmit beam 410 and the receive combiner of UL receive beam 420 have beam correspondence. Also illustrated in FIG. 4 is an association or relation of the time-frequency location of the BRACH resource and the BFRS resources. For example, if a BFRS at position 407 is identified as a recovered new beam, then BRACH resource 417 (at a certain time-frequency location) should be used by the UE to transmit the beam failure recovery preamble sequence; conversely, if a BRACH resource 417 (at a certain time-frequency location) is used by the UE to transmit the beam failure recovery preamble sequence, it should convey that a BFRS at position 407 has been identified as a recovered new beam.

Figure 5:
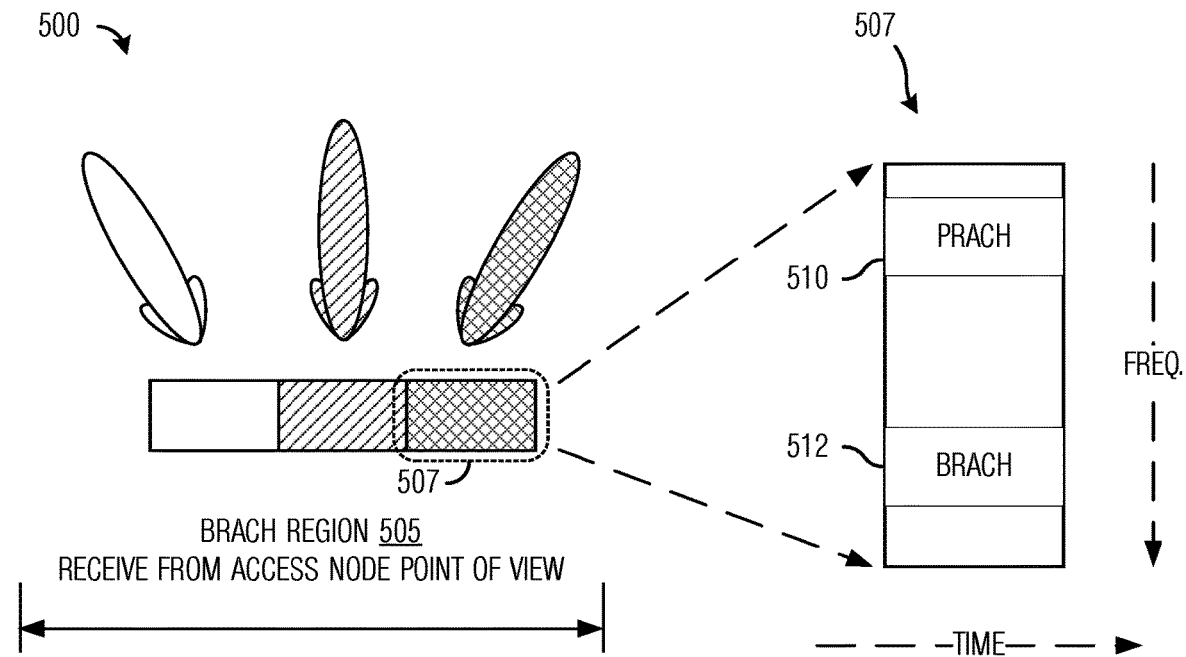
FIG. 5 illustrates a diagram providing a detailed view of an example BRACH resource according to example embodiments described herein.

FIG. 5 illustrates a diagram 500 providing a detailed view of an example BRACH resource. As shown in FIG. 5, a BRACH region 505 presents BRACH resources, such as BRACH resource 507. A BRACH resource, such as BRACH resource 507, may include time and frequency locations. As shown in diagram 500, BRACH resource 507 includes one or more time locations and one or more frequency locations. BRACH resource 507 includes first resource 510 allocated for PRACH transmissions and second resource 512 allocated for BRACH transmissions. In the above illustration, each BRACH resource, such as BRACH resource 507, includes BRACH resources (such as second resource 512), and a UE may choose one BRACH resource out of N BRACH resources, with block index n, to send a pre-allocated preamble. The block index n can convey a piece of information of log2(N)-bits from the UE to the access node. This piece of information may be used to convey from UE to access node which BFRS (out of the N BFRSs) has been identified by the UE. Typically, the access node may send a message (e.g., RRC message, MAC-CE message, DCI message, or a combination thereof) in advance to the UE to configure the association between BRACH blocks and information conveyed therein, so that both access node and UE know that sending the preamble on a first of N BRACH resources represents "00 . . . 01" meaning that a first of N BFRSs has been identified, sending the preamble on a second of N BRACH resources represents "00 . . . 10" meaning that a second of N BFRSs has been identified, . . . , and sending the preamble on an N-th of N BRACH resources represents "11 . . . 11" meaning that a Nth of N BFRSs has been identified, and so on and so forth, while each bit sequence here is log2(N)-bit long, and can represent the new identified beam index of the N BFRSs from the UE, for example. Alternatively, for each of the N BRACH resources, the BRACH resource within may be duplicated K times leading to overall K*N BRACH resources, and the UE may choose one out of K*N BRACH resources to send the pre-allocated preamble, while the block index n can convey log2(K*N) bits of information from the UE to the access node. Typically, the access node may send a message in advance to the UE, so that both access node and UE are aware of the association between BRACH blocks and information conveyed therein. As an example, the information conveyed by the BRACH block index represents a new identified beam index from the UE. The BRACH blocks may also include resources for other uses. In some example embodiments, a BRACH resource may be allocated solely for BRACH transmissions. It is noted that the channels of BRACH and PRACH may be different in terms of time and/or frequency locations.

According to an example embodiment, techniques for beam failure recovery utilizing a BFRS that includes two different sets of BFRSs, e.g., a set of first BFRSs and a set of second BFRSs, are provided. It is noted that the two sets of BFRSs may be two sub-sets of the available BFRSs. It is also possible that in certain case only one set of reference signals is needed, e.g., only the set of first BFRSs or only the set of second BFRSs, which can be thought of as the special case of the approach that uses the two sets of BFRSs. The inclusion of two different sets of BFRSs enables a UE to identify more choices of beams from an access node that are candidates for replacing the failed beam, possibly using a multilayered approach that potentially simplifies detection and decoding, as well as reduces signaling overhead. As an illustrative example, rather than scanning for a large number of narrow beamwidth beams (e.g., the CSI-RS), which may require considerable time, the UE can scan for a smaller number of wide beamwidth beams (e.g., the WBRS). Scanning for the smaller number of wide beamwidth beams reduces the scanning time required, thereby resulting in the search space for the recovered beam being significantly smaller than the search space for the narrow beamwidth beams. Once the wide beamwidth beam(s) has been identified, the UE can scan for a much smaller number of narrow beamwidth beams that may be candidate beams for replacing the failed beam.

FIG. 6 illustrates a flow diagram of example operations 600 occurring in an access node participating in beam recovery using a BFRS. Operations 600 may be indicative of operations occurring in an access node as the access node participates in beam recovery using a BFRS. The BFRS may include two different reference signals, e.g., a CSI-RS and a WBRS. The BFRS may, alternatively, include one reference signal, e.g., CSI-RS or WBRS only.

Operations 600 begin with the access node configuring BRACH preamble sequences (block 605). The access node may configure a unique BRACH preamble sequence for each UE. Alternatively, a single BRACH preamble sequence may be assigned to multiple UEs. Alternatively, multiple BRACH preamble sequences may be assigned to each UE. The access node also sends information regarding the BRACH preamble sequences to the UEs, e.g., via a RRC message, a MAC-CE message, a DCI message, or a combination thereof. The access node optionally sends relationships or associations between BFRSs and BRACH resources, as well as BRACH response resources, to the UEs (block 607). The relationships or associations between the BFRS resources and the BRACH resources (as well as the BRACH response resources) may be fixed and can assist the UE in determining which BRACH resource, at least in terms of time-frequency location, to use to transmit a BRACH preamble. In other words, a UE needs to know the time-frequency location of a first BRACH resource to transmit the preamble sequence if a first BFRS is identified as the new beam by the UE, the time-frequency location of a second BRACH resource to transmit the preamble sequence if a second BFRS is identified as the new beam; and so on and so forth. Conversely, an access node needs to know that a first BFRS has been identified as the new beam by the UE if it receives a preamble sequence at the time-frequency location of a first BRACH resource; that a second BFRS has been identified as the new beam by the UE if it receives a preamble sequence at the time-frequency location of a second BRACH resource; and so on and so forth. The association or relation can also assist the UE in determining which BRACH response resource to receive a response to the BRACH preamble. A detailed discussion of the associations between the BFRSs and BRACH resources is provided below.

The relationships or associations between BFRSs and BRACH resources, as well as BRACH response resources may be presented in data form to enable simple and efficient signaling. As an illustrative example, consider a situation where the BFRS resources are denoted: 1*a*, 1*b*, 1*c*, and so on; the BRACH resources are denoted: 2*a*, 2*b*, 2*c*, and so on; and the BRACH response resources are denoted: a, b, c, and so on. In a first illustrative example, the relationships or associations may be signaled pairs, such as:

1*a*, 2*a* to convey that resources is and 2*a* are associated or have a relationship;

1*b*, 2*b* to convey that resources 1*b* and 2*b* are associated or have a relationship;

1*c*, 2*c* to convey that resources 1*c* and 2*c* are associated or have a relationship;

1*c*, 2*b* to convey that resources 1*b* and 2*b* are associated or have a relationship 1*a*, a to convey that resources 1*a* and a are associated or have a relationship;

1*b*, b to convey that resources 1*b* and b are associated or have a relationship; and 1*b*, c to convey that resources 1*b* and c are associated or have a relationship.

The example relationships or associations may also be signaled in tabular form listing associated resources, such as:

1*a*, 2*a* to convey that resources 1*a* and 2*a* are associated or have a relationship;

1*b*, 2*b* to convey that resources 1*b* and 2*b* are associated or have a relationship;

1c, 2b, 2c to convey that resources 1b and 2b and 2c are associated or have a relationship;

1a, a to convey that resources 1a and a are associated or have a relationship; and 1b, b, c to convey that resources 1b and b and c are associated or have a relationship.

The access node sends the BFRS, including WBRSs only, CSI-RSs only, or both WBRSs and CSI-RS, for example, using DL transmit beams (block 609). In the situation where the BFRS includes only CSI-RSs or WBRSs, the access node would only send CSI-RSs or WBRSs on DL transmit beams, for example. However, if the BFRS includes both CSI-RSs and WBRSs, the access node would send both CSI-RSs and WBRSs on DL transmit beams. The access node receives a BRACH preamble from a UE that has experienced a beam failure (block 611). As an illustrative example, when the BFRS includes both CSI-RSs and WBRSs, the BRACH preamble is received on a BRACH resource associated with an m-th BFRS. In other words, the BRACH preamble is received on the BRACH resource that was associated with the m-th BFRS. As another illustrative example, when the BFRS includes only CSI-RSs or WBRSs, the BRACH preamble is received on a BRACH resource associated with an n-th BFRS. Furthermore, the BRACH preamble is received on an UL receive beam of the access node that is beam correspondent to a DL transmit beam of the access node used to transmit the m-th or n-th BFRS. The access node identifies the UE (block 613). The access node may be able to identify the UE in accordance with the BRACH preamble, for example. The access node may also be able to identify the new beam of the UE in accordance with the BRACH time and frequency location. As an example, the access node may use the techniques presented in FIG. 4 and associated discussion, wherein for example, if a BRACH resource 417 (at a certain time-frequency location) is used by the UE to transmit the beam failure recovery preamble sequence, the use of BRACH resource 417 conveys information that a BFRS at position 407 has been identified as a recovered new beam. The access node may, or may not generate an UL resource grant for the UE (block 615). The UL resource grant is for allocating resources to allow the UE to transmit extra recovery information to the access node. The access node sends a response, e.g., a BFR response, with, optionally, the UL resource grant (or information related thereto) to the UE (block 617). In the situation where the beam failure RACH response includes the UL resource grant (or information related thereto), the access node receives an UL transmission (block 619), which includes the extra recovery information from the UE. The extra recovery information may include additional information related to n, for example. The access node rebuilds a DL control channel or assists in beam management (block 621). The access node utilizes the extra recovery information provided by the UE to rebuild the DL control channel or assist in beam management. It is noted that blocks 611 and 619 may occur at the same time, and blocks 613, 615, 617, and 621 may occur at the same time, afterwards. It is further noted that blocks 611 and 619 may be merged into a single block in the case where the BFRS comprises only CSI-RSs or WBRSs.

FIG. 7 illustrates a diagram 700 highlighting an example association between resources and beams used in beam recovery. As shown in FIG. 7, a BFRS region 705 presents BFRS resources (e.g., BFRS resource 710) and access node DL transmit beams (e.g., beam 715) used to transmit BFRS, a BRACH region 707 presents BRACH resources (e.g., BRACH resource 712) and UL receive beams (e.g., beam 717) used to receive BRACH preambles and UL transmit beams (e.g., beam 722) used to transmit BRACH preambles, and a response region 709 presents response resources (e.g., response resource 714) and UL receive beams (e.g., beam 719) used to receive responses. It is noted that a precoder of beam 715 and a combiner of beam 717 may be beam correspondent, and a precoder of beam 722 and a combiner of beam 719 may be beam correspondent. Furthermore, there is a one-to-one association between BFRS resource 710 and BRACH resource 712, as well as a one-to-one association between BRACH resource 712 and response resource 714.

The beam correspondence between various beams and the one-to-one associations between the resources help the access node and the UE determine which resources and beams to use to receive and transmit. As an example, if the UE has determined that a BFRS transmitted by DL transmit beam 715 is its selected best candidate among the multiple candidate BFRSs, the UE is able to determine (from beam correspondence and the one-to-one associations, for example) that it should transmit a BRACH preamble in BRACH resource 712 while using beam 722. Furthermore, the UE is able to determine (again, from beam correspondence and the one-to-one associations) that it should monitor or receive a response in response resource 714, possibly using beam 719. Clearly, the use of beam correspondence and the one-to-one associations simplify the determination of which resources and beams to use.

FIG. 8 illustrates a flow diagram of example operations 800 occurring in a UE participating in beam recovery using a BFRS. Operations 800 may be indicative of operations occurring in a UE as the UE participates in beam recovery using a BFRS. The BFRS may include two different reference signals, e.g., a CSI-RS and a WBRS. The BFRS may, alternatively, include one reference signal, e.g., CSI-RS or WBRS only.

Operations 800 begin with the UE receiving a BRACH preamble sequence configuration from an access node (block 805). The UE optionally receives relationships or associations between BFRS resources and BRACH resources, as well as BRACH response resources from the access node (block 807). The relationships or associations between the BFRS resources and the BRACH resources (as well as the BRACH response resources) may be fixed and can assist the UE in determining which BRACH resource to use to transmit a BRACH preamble, and potentially, which BRACH response resource to receive a response to the BRACH preamble.

The relationships or associations between BFRSs and BRACH resources, as well as BRACH response resources may be presented in data form to enable simple and efficient signaling. As an illustrative example, consider a situation where the BFRS resources are denoted: 1a, 1b, 1c, and so on; the BRACH resources are denoted: 2a, 2b, 2c, and so on; and the BRACH response resources are denoted: a, b, c, and so on. In a first illustrative example, the relationships or associations may be signaled pairs, such as:

1a, 2a to convey that resources is and 2a are associated or have a relationship;

1b, 2b to convey that resources 1b and 2b are associated or have a relationship;

1c, 2c to convey that resources 1b and 2c are associated or have a relationship;

1c, 2b to convey that resources 1b and 2b are associated or have a relationship 1a, a to convey that resources 1a and a are associated or have a relationship;

1*b*, b to convey that resources 1*b* and b are associated or have a relationship; and 1*b*, c to convey that resources 1*b* and c are associated or have a relationship.

The example relationships or associations may also be signaled in tabular form listing associated resources, such as:

1*a*, 2*a* to convey that resources is and 2*a* are associated or have a relationship;

1*b*, 2*b* to convey that resources 1*b* and 2*b* are associated or have a relationship;

1*c*, 2*b*, 2*c* to convey that resources 1*b* and 2*b* and 2*c* are associated or have a relationship;

1*a*, a to convey that resources is and a are associated or have a relationship; and 1*b*, b, c to convey that resources 1*b* and b and c are associated or have a relationship.

The UE monitors the BFRS (e.g., CSI-RSs, WBRSs, or both CSI-RSs and WBRSs and determines index (indices) of best BFRS (e.g., CSI-RS beam(s), WBRS beam(s), or CSI-RS and WBRS beams) (block 809). As a result of monitoring, the UE obtains a beam index per CSI-RS only, per WBRS only, or per CSI-RS and WBRS beams. The beam index may be represented by resource index n (an integer value). In a situation where the BFRS includes only either CSI-RS or WBRS, the beam index is either the beam index of the CSI-RS or the WBRS (the reference signal present in the BFRS). While, in a situation where the BFRS includes both CSI-RS and WBRS, the beam index may be either be the beam index of the CSI-RS or the WBRS, depending on which beam (CSI-RS or WBRS) is better. Because the beam index may be the beam index of the CSI-RS or the WBRS, a report of the beam index should make it clear which reference signal the beam index is associated with. As an illustrative example, consider a situation where there are four CSI-RS beams and four WBRS beams. Then, beam indices 1 to 4 may be used for the four CSI-RS beams and beam indices 5 to 8 may be used for the four WBRS beams, for instance. Then, there would be no confusion as to which reference signal the beam index is associated with. It is noted that the UE may obtain more than one beam index. In such a situation, the indices are denoted n1, n2, and so on. As an example, in the situation where BFRS comprises CSI-RS, the n-th CSI-RS resource out of the N possible CSI-RS resources may be the best (in terms of quality, for example) from the point of view of the UE and may be used by the access node to rebuild a DL control channel or to assist in beam management.

The UE may determine remaining index (or indices) of the best BFRS beam(s) (block 811), which may include CSI-RSs only, or WBRSs only. In a situation where the BFRS includes both CSI-RSs and WBRSs, the UE was previously able to determine an index (or indices) of either CSI-RS or WBRS. The UE may now determine the remaining index (or indices) of a WBRS (if the index (or indices) of a CSI-RS was previously determined) or a CSI-RS (if the index (or indices) of a WBRS was previously determined). As a result, the UE obtains a beam index per BFRS. The beam index may be represented by BFRS resource index m (an integer value); or in other words, CSI-RS resource index m in case of the BFRS including CSI-RSs only, WBRS resource index m in case of the BFRS including WBRSs only. It is noted that the UE may obtain more than one beam index. In such a situation, the indices are denoted m1, m2, and so on. The m-th BFRS resource out of M possible WBRS resources is the best (in terms of signal quality, for example) from the point of view of the UE and may be used by the access node to rebuild the DL control channel or to assist in beam management.

The UE optionally selects a BRACH preamble (block 813). In a situation where the UE is configured with one or more BRACH preambles, the UE selects one out of the one or more BRACH preambles. In a situation where the UE is configured with a unique BRACH preamble that can be transmitted over one or more BRACH channels, the UE selects one out of the one or more BRACH channels and transmits the configured preamble. The selection of the one out of the one or more BRACH preambles enables the UE to implicitly signal information without having to explicitly signal the information. As an example, if there are four BRACH preambles in the one or more BRACH preambles, the UE is able to implicitly signal two bits of information through the transmission of one of the four BRACH preambles. As another example, if there are four BRACH channels available for the UE to send one BRACH preamble, the UE is able to implicitly signal two bits of information through transmission of the preamble on one of the four BRACH channels. In either case, the 2-bit information can be used by the UE to convey the identified new beam index m.

The UE, utilizing the relationship or association between the m-th BRACH resource and the m-th BFRS resource to determine the m-th BRACH resource, sends a BRACH preamble on the m-th BRACH resource (block 815). The m-th BRACH resource corresponds to the m-th BFRS resource index as determined by the UE as the best WBRS beam and the relationship or association between the BRACH and BFRS resources. The sending of the BRACH preamble on the m-th BRACH resource (selected due to its relationship with the m-th BFRS resource) affords the UE an excellent chance that the BRACH preamble will successfully arrive at the access node, thereby reducing the latency of the beam recovery process.

The UE receives a response, e.g., a BFR response, in a BRACH response (block 817). The response may optionally include an UL grant to allow the UE to transmit a follow up (or extra) message including a report of extra information, e.g., a subset of a beam index, beam quality information, etc. The response may be received on a physical downlink shared channel (PDSCH) or a physical downlink control channel (PDCCH) or a broadcast channel. The response may be addressed with an identifier identifying the BRACH preamble (or the access node may directly send out the BRACH preamble). The response may also include a timing alignment instruction to synchronize subsequent UL transmissions from the UE. The response may be received in a timing window, potentially with a receive combiner associated with the transmit precoder used to transmit the BRACH preamble. The timing window the UE uses to receive the response corresponds to a BRACH resource used to transmit the BRACH preamble. The UE may send extra information (e.g., a subset of a beam index, beam quality information, etc.) in accordance with the UL grant (block 819). Alternatively, the UE is able to transmit the BRACH preamble together with the extra information (e.g., a subset of a beam index, beam quality information, etc.). In this situation, the UL grant in the response is not necessary.

Figure 9:
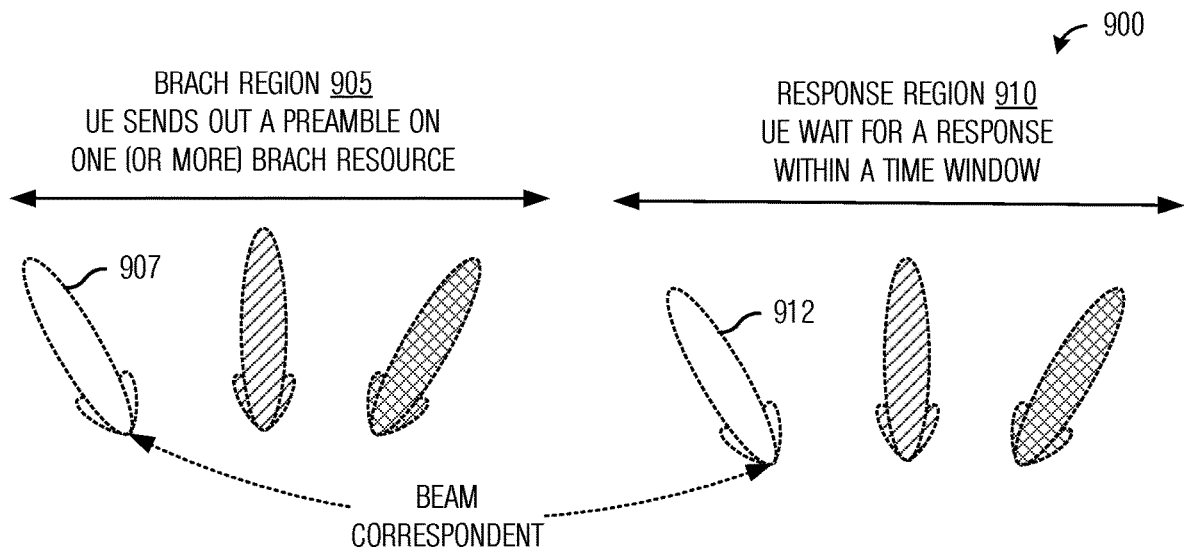
FIG. 9 illustrates a diagram highlighting UE communications in beam recovery according to example embodiments described herein.

FIG. 9 illustrates a diagram 900 highlighting UE communications in beam recovery. Diagram 900 displays a BRACH region 905 where the UE sends a BRACH preamble on one or more BRACH resources. As an example, the UE sends the BRACH preamble using an UL transmit beam 907. Diagram 900 also displays a response region 910 where the UE receives a response (such as a BFR response) from an access node. As an example, the UE receives a response using a DL receive beam 912 within a time window that is configured by the access node. Such a configuration of the time window may be specified in terms of the time window starting position, time window ending position, time window duration, and so on, for example. As another example, such a configuration of the time window may be specified in a technical standard, or signaled in a RRC message, MAC-CE message, DCI message, or a combination thereof.

Figure 10A:
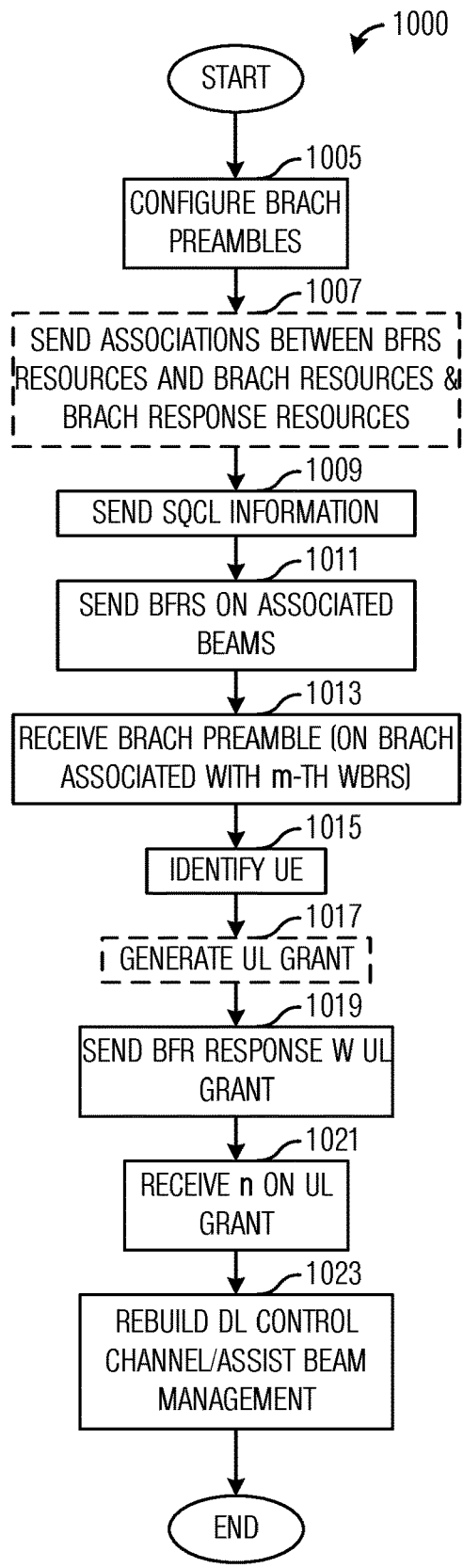
FIG. 10A illustrates a flow diagram of example operations occurring in an access node participating in beam recovery using a beam failure RS that includes one or more reference signals according to example embodiments described herein.

FIG. 10A illustrates a flow diagram of example operations 1000 occurring in an access node participating in beam recovery using a BFRS that includes one or more reference signals, e.g. CSI-RS only, SS only, or CSI-RS and SS. Operations 1000 may be indicative of operations occurring in an access node as the access node participates in beam recovery using a beam failure RS that includes one or more reference signals, e.g., CSI-RS only, or SS only, or both CSI-RS and SS.

Operations 1000 begin with the access node configuring BRACH preamble sequences (block 1005). The access node may configure a unique BRACH preamble sequence for each UE. Alternatively, multiple BRACH preamble sequences may be assigned to a single UE. Alternatively, a single BRACH preamble sequence may be assigned to multiple UEs. The access node also sends information about the BRACH preamble sequences to the UEs. The access node optionally sends relations or associations (e.g., in a RRC message, a MAC-CE message, a DCI message, or a combination thereof) between BFRS resources (e.g., CSI-RS resources only, SS resources only, or both CSI-RS and SS resources) and BRACH resources, as well as BRACH response resources, to the UEs (block 1007). The relations or associations between the BFRS resources and the BRACH resources (as well as the BRACH response resources) may assist the UE in determining which BRACH resource to use to transmit a BRACH preamble, and potentially, which BRACH response resource to receive a response to the BRACH preamble. The relations or associations between the BFRS resources and the BRACH resources may enable a UE to identify the time or frequency location of the former from the time or frequency location of the latter, or vice versa. In other words, if the UE identifies a first BFRS resource index, then the relations or associations allows the UE to determine a first BRACH resource at a first time-frequency location be used by the UE to transmit a first BRACH preamble sequence; and if the UE identifies a second BFRS resource index, then the relations or associations allows the UE to determine a second BRACH resource at a second time-frequency location be used by the UE to transmit a second BRACH preamble sequence; and so on and so forth.

The access node sends spatial-quasi-co-located (SQCL) information (or representations thereof) to the UEs (block 1009). SQCL defines a relationship between two reference signals or data signals such that the two signals may be viewed as possessing similar characteristics. The SQCL information may include associations between CSI-RS resources and SS signals. As an example, in a one to one SQCL association, each CSI-RS signal is associated with one SS signal such that the transmit precoder for the CSI-RS signal is the same as a transmit precoder for the SS signal. It is possible that multiple CSI-RS signals are associated with a single SS, and vice versa. The SQCL information may be signaled to the UE from the access node in a RRC message, a MAC-CE message, a DCI message or a combination thereof, and stored in tabular form or in a memory of the UE. The access node sends the BFRS, including the CSI-RS, WBRS, or CSI-RS and WBRS, for example, using DL transmit beams (block 1011). One potential purpose of signaling the SQCL information may be to enable to UE to find a proper WBRS signal based on the detected BFRS when the BFRS does not include a WBRS, for example. As an example, if a CSI-RS (as a component of a BFRS) signal is detected, then the WBRS that is SQCLed with this particular CSI-RS may be identified; and if a WBRS (as a component of a BFRS) is detected, then the WBRS itself (which is of course SQCLed with itself) may be identified. In other words, independent of if the detected BFRS signal is a CSI-RS, a WBRS, or both, a proper WBRS may be identified based on the SQCL information.

The access node receives a BRACH preamble from a UE that has experienced a beam failure (block 1013). The BRACH preamble is received on a BRACH resource associated with an m-th WBRS. Furthermore, the BRACH preamble may be received on an UL receive beam of the access node that is beam correspondent to a DL transmit beam of the access node used to transmit the m-th WBRS. In general, the access node monitors all BRACH resources for BRACH preambles. The access node identifies the UE (block 1015). The access node may compare received signals on the multiple BRACH resources and determine which UE requested beam recovery (by analyzing the received BRACH preamble and BRACH preamble to UE assignments, for example). In a situation where the UE is assigned more than one preamble sequence which can be transmitted on a BRACH channel, the access node analyzes which sequence is being transmitted by the identified UE and detects the intended beam index of the CSI-RS or WBRS. In a situation where the UE is assigned one preamble sequence which can be transmitted on more than one BRACH channel, the access node analyzes which channel is being used by the identified UE to transmit the preamble sequence and detects the intended beam index of the CSI-RS or WBRS. In a situation where the access node receives multiple BRACH preambles from a single UE, the access node may determine which BRACH resource provided the best quality, potentially conveying to the access node which response resource to transmit a response, such as a BFR response. The access node may be able to identify the UE in accordance with the BRACH preamble, for example. The access node may generate an UL resource grant for the UE (block 1017). The UL resource grant is for resources that allow the UE to transmit further recovery information to the access node. The further recovery information may include the extra recovery information discussed previously (such as in the discussion of FIG. 6), as well as channel quality information, such as SNR, SINR, RSRP, RSRQ, RSSI, and so on. The access node sends a response, such as a BFR response, possibly with the UL resource grant (or information related thereto) to the UE (block 1019). The response may be sent on a PDSCH or a PDCCH or a broadcast channel. The response may be addressed using an identifier identifying the detected BRACH preamble or the access node may send the detected BRACH preamble directly. The access node receives an UL transmission from the UE (block 1021). The UL transmission may, for example, include the further recovery information, such as one or more CSI-RS indices n, from the UE, or beam quality information, from the UE. The access node rebuilds a DL control channel or assists in beam management (block 1023). The access node utilizes the recovery information provided by the UE to rebuild the DL control channel or assist in beam management (UL or DL) in a subsequent period. Alternatively blocks 1017 and 1019 may be omitted, which means that blocks 1013 and 1021 may be performed in a single transmission.

Figure 10B:
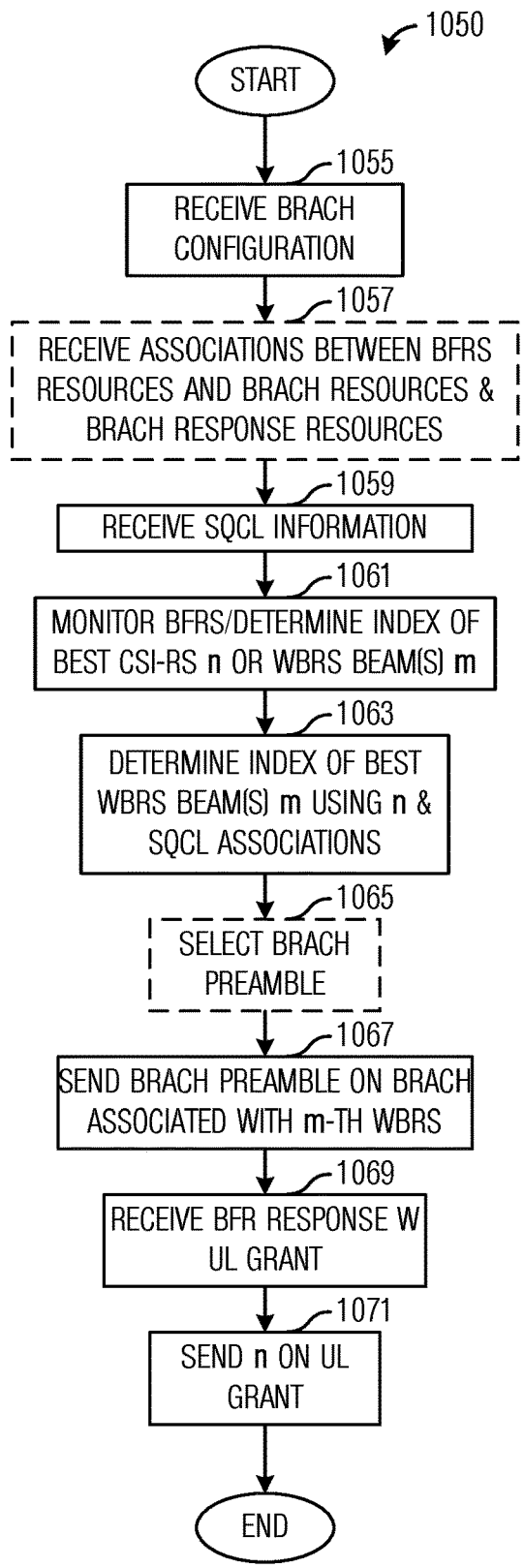
FIG. 10B illustrates a flow diagram of example operations occurring in a UE participating in beam recovery where the UE monitors one or more reference signals according to example embodiments described herein.

FIG. 10B illustrates a flow diagram of example operations 1050 occurring in a UE participating in beam recovery where the UE monitors one or more reference signals. Operations 1050 may be indicative of operations occurring in a UE as the UE participates in beam recovery where the UE monitors only one reference signal, e.g., CSI-RS only, WBRS only, or both CSI-RS and WBRS.

Operations 1050 begin with the UE receiving a BRACH preamble sequence configuration from an access node (block 1055). The UE optionally receives relations or associations between BFRS resources (CSI-RS resources only, SS resources only, both CSI-RS and SS resources) and BRACH resources, as well as BRACH response resources from the access node (block 1057). The relations or associations between the BFRS resources and the BRACH resources (as well as the BRACH response resources) may assist the UE in determining which BRACH resource to use to transmit a BRACH preamble based on the detected BFRS or the identified WBRS, and potentially, which BRACH response resource to receive a response to the BRACH preamble. The UE receives SQCL information (block 1059). The SQCL information includes associations between CSI-RS and SS signals. The SQCL information may be used by the UE to determine CSI-RS beam indices from WBRS beam indices, and determine WBRS beam indices from WBRS beam indices, for example. As an example, in a one-to-one association, each CSI-RS signal is associated with one WBRS signal. It is possible that multiple CSI-RS signals are associated with a single WBRS, and vice versa. The SQCL information may be signaled to the UE in a RRC message, a MAC-CE message, a DCI message, or a combination thereof, and stored in tabular form or in a memory of the UE.

The UE monitors the BFRS signals (CSI-RS or WBRS signals in general) and determines index (indices) of best, in terms of quality, for example, CSI-RS beam(s) or WBRS beams (block 1061). As a result, the UE obtains a beam index per CSI-RS, or a beam index per WBRS. The beam index may be represented by CSI-RS resource index n (an integer value), or WBRS resource index m. It is noted that the UE may obtain more than one beam index.

The UE determines index (indices) of the best WBRS beam(s) (block 1063). It is noted that if the detected beam is a WBRS signal with best WBRS resource index m, then the identified beam is simply the best WBRS resource index m itself. It is noted that if the detected beam is a CSI-RS signal with best CSI-RS resource index n, the UE makes use of the SQCL information to determine the index m of the best WBRS beam(s) from the CSI-RS beam index n. It is noted that the UE may obtain multiple beam indices of the best BFRS beams when the UE obtains multiple beam indices. The m-th WBRS resource out of M possible WBRS resources may be the best from the point of view of the UE (in terms of quality, for example) and may be used by the access node to rebuild the DL control channel and to assist in beam management.

The UE optionally selects a BRACH preamble (block 1065). In a situation where the UE is configured with more than one BRACH preambles, the UE selects one out of the more than one BRACH preambles. The UE, utilizing a relationship between the m-th BRACH resource and the m-th WBRS resource to determine the m-th BRACH resource, sends a BRACH preamble on the m-th BRACH resource or region (block 1067). The m-th BRACH resource corresponds to the m-th WBRS resource index as determined by the UE as the best WBRS beam and the relationship between the BRACH and WBRS resources. The sending of the BRACH preamble on the m-th BRACH resource affords the UE an increased chance that the BRACH preamble will successfully arrive at the access node (due to using a resource associated with the best quality beam or resource, for example), thereby reducing the latency of the beam recovery process.

The UE receives a response, such as a BFR response (block 1069). The response may include an UL grant to allow the UE to transmit a follow up message (on a physical uplink shared channel (PUSCH), for example) including a report of a CSI-RS beam index, for example. The response may be received on a PDSCH or a PDCCH or a broadcast channel. The response may be addressed with an identifier identifying the BRACH preamble (or the access node may directly send out the BRACH preamble). The response may also include a timing alignment instruction to synchronize subsequent UL transmissions from the UE. The response may be received in a timing window, potentially with a receive combiner associated with the transmit precoder used to transmit the BRACH preamble. The timing window the UE uses to receive the response corresponds to a BRACH resource used to transmit the BRACH preamble. The UE monitors all timing windows, with each timing window corresponding to one of the BRACH resources used to transmit the BRACH preamble for the response. The UE sends one or more CSI-RS resource indices n in accordance with the UL grant (block 1071), if the UL grant is included in the BFR response.

Figure 11:
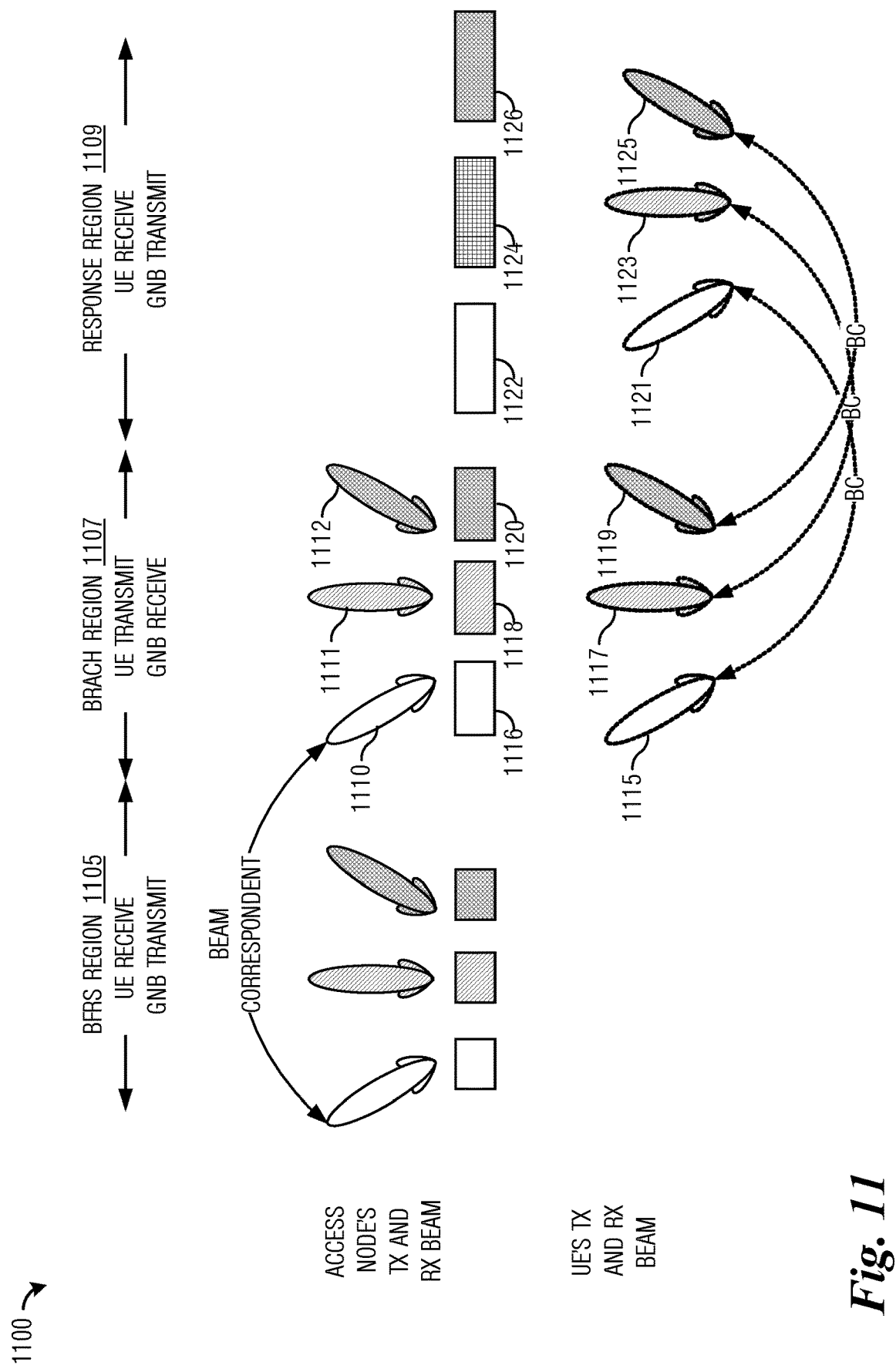
FIG. 11 illustrates a diagram highlighting an example BRACH preamble transmission and response reception on multiple resources according to example embodiments described herein.

FIG. 11 illustrates a diagram 1100 highlighting an example BRACH preamble transmission and response reception on multiple resources. As shown in FIG. 11, a BFRS region 1105 presents BFRS resources and access node DL transmit beams used to transmit BFRS, a BRACH region 1107 presents BRACH resources (e.g., BRACH resources 1116, 1118, and 1120) and UL receive beams (e.g., beams 1110, 1111, and 1112) used to receive BRACH preambles and UL transmit beams (e.g., beams 1115, 1117, and 1119) used to transmit BRACH preambles, and a response region 1109 presents response resources (e.g., response resources 1122, 1124, and 1126) and UL receive beams (e.g., beams 1121,1123, and 1125) used to receive responses, such as BFR responses. Multiple beams and resources may be used to increase the likelihood that the BRACH preambles or responses are successfully received. It is noted that the associations or relations between BRACH resources and BFRS resources are maintained in a situation when multiple beams and resources are used.

Figure 12:
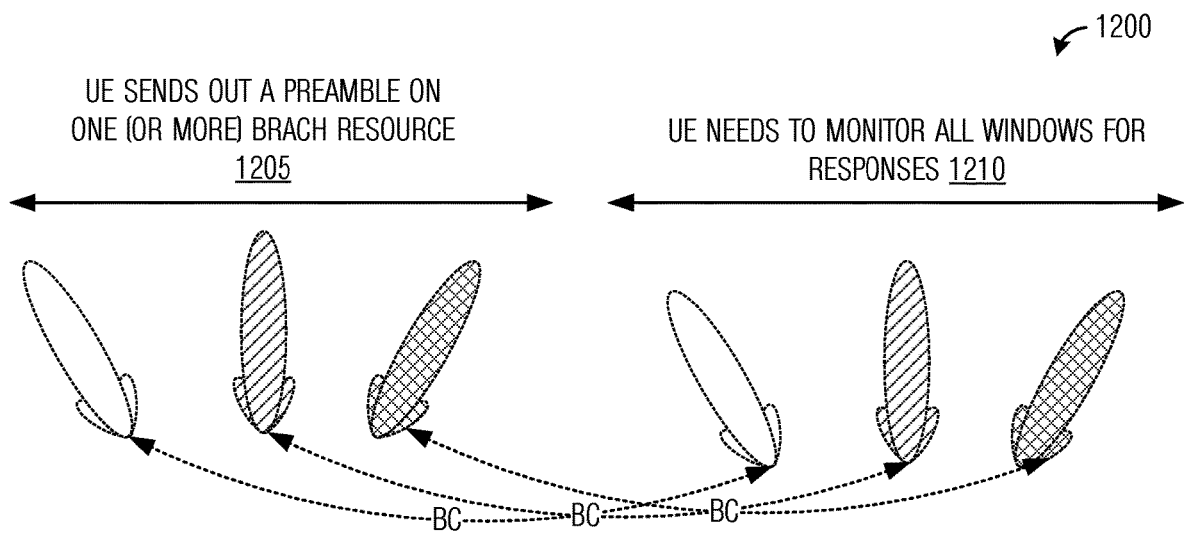
FIG. 12 illustrates a diagram highlighting the sending of a BRACH preamble and the detection of a response according to example embodiments described herein.

FIG. 12 illustrates a diagram 1200 highlighting the sending of a BRACH preamble and the detection of a response. As shown in FIG. 12, the UE sends a BRACH preamble on one or more BRACH resources 1205. However, the UE monitors timing windows associated with all of the BRACH resources to ensure that the response is received 1210.

In summary, a UE initiating a beam recovery:

Detects a BFRS resource index, may be CSI-RS resource, SS resource, or both;

Identifies a WBRS resource index m based on SQCL information between CSI-RS and SS;

Sends a BRACH preamble on a m-th BRACH resource in a BRACH region;

Monitors for responses in a response region to receive a response;

May send a message with extra recovery information, such as one or more CSI-RS indices n;

May monitor a DL control channel, the DL control channel and the one or more CSI-RS indices n may be spatially QCLed.

In summary, the access node participating in beam recovery receives or determines the following information:

Information A: identity of the UE requesting beam recovery;

Information B (n): an identified or reported CSI-RS resource or beam index (CRI) used by the access node to rebuild a DL control channel. The CRI may comprise two parts, B1—WBRS index (or indices), B2—CSI-RS index (or indices) with a group of multiple CSI-RSs that is spatially QCLed with a WBRS with WBRS index (or indices). B2 is referred to as an intra-group index.

With B1 and B2, it is possible for the access node to reconstruct B. It is noted that CSI-RS and WBRS may be two subsets of BFRS. Thus the two-part information may be signaled altogether, rather than individually, as an index of BFRS. Here, the set of BFRS signals may be simply viewed as a combination (such as union, concatenation, etc.) of CSI-RS signals and WBRS signals.

Figure 13:
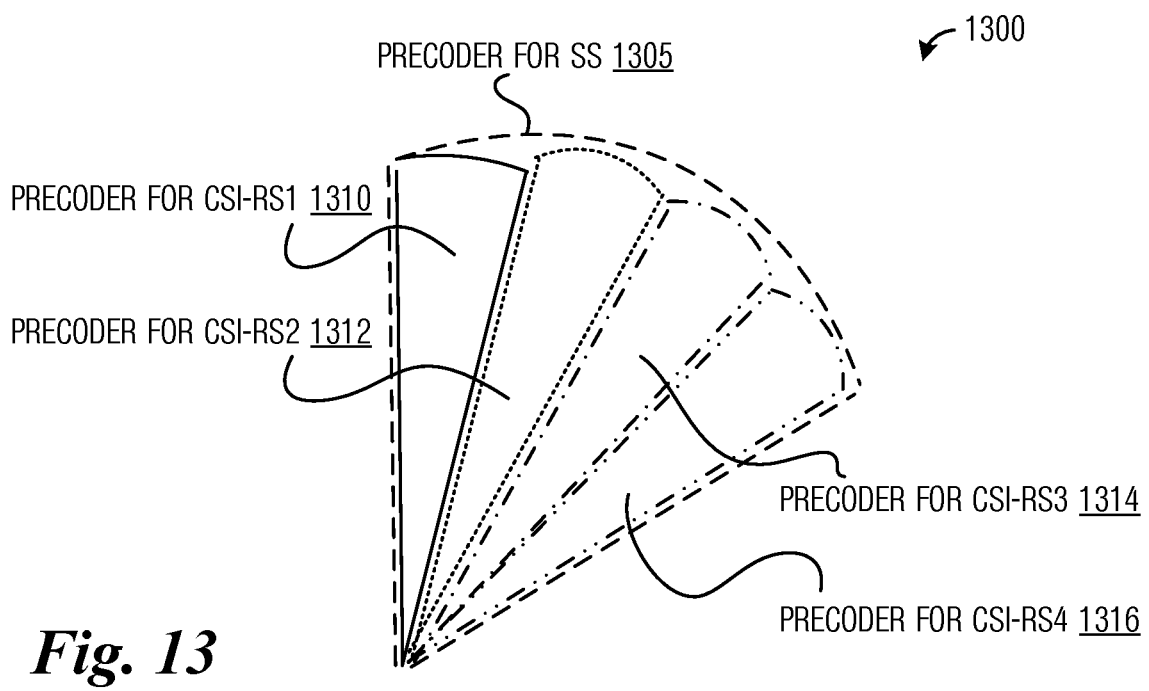
FIG. 13 illustrates a diagram of example beams for synchronization signals (SS) and CSI-RS according to example embodiments described herein.

FIG. 13 illustrates a diagram 1300 of example beams for SS and CSI-RS. As shown in FIG. 13, a precoder for an example SS has beam footprint 1305, while precoders for example CSI-RS1, CSI-RS2, CSI-RS3, and CSI-RS4 have beam footprints 1310, 1312, 1314, and 1316, respectively. For discussion purposes, let an index of a CSI-RS1 be n, an index of SS be m, and an intra-group index of CSI-RS1 in a CSI-RS group associated with SS be i. Then, if indices m and i are known (e.g., reported by the UE), it is possible to determine n. Similarly, if indices n and m are known, it is possible to determine i. Furthermore, if indices n and i are known, it is possible to determine m. It is noted that in FIG. 13, SS is intended to be an example of a WBRS.

In a first example embodiment, the access node configures a UE specific preamble sequence for each UE. A UE initiating beam recovery may send its UE specific preamble sequence, which is detected by the access node. The access node will be able to determine the identity of the UE that sent the UE specific preamble, thereby obtaining information A. The UE sends the CRI using the UL grant, thereby directly providing the CRI to the access node, thereby providing information B to the access node.

In a second example embodiment, the access node configures a UE specific preamble sequence for each UE. A UE initiating beam recovery may send its UE specific preamble sequence, which is detected by the access node. The access node will be able to determine the identity of the UE that sent the UE specific preamble, thereby obtaining information A. Furthermore, the access node is able to determine which BRACH resource conveyed the UE specific preamble, thereby obtaining information B1, which is the identified SS resource index m based on the detected CSI-RS resource index n if a CSI-RS resource index is detected, or the identified resource index m itself if a SS resource index is detected. The UE may send out the intra-group index using the UL grant, thereby providing information B2 to the access node. The access node may use information B1 and B2 to determine information B. If the intra-group index i is not sent, the access node may use information B1 (which is the identified SS resource index m) directly.

In a third example embodiment, the access node configures a group of UE specific preamble sequences for each UE. All of the preambles within the group are associated with a single UE. A UE initiating beam recovery may send a UE specific preamble sequence from its group of UE specific preamble sequences. The access node detects the UE specific preamble sequence, determines the group of UE specific preamble sequences from the UE specific preamble and determines the identity of the UE that sent the UE specific preamble, thereby obtaining information A. In one example, the access node is able to determine which BRACH resource conveyed the UE specific preamble, thereby obtaining information B1. Additionally, the access node is able to determine which preamble sequence within the group of UE specific preamble sequences the UE specific preamble is and infer the intra-group index of the UE specific preamble, thereby obtaining information B2. The access node uses information B1 and B2 to determine information B. In another embodiment, the access node is able to determine information B directly by analyzing which preamble sequence is being used by the identified UE and which BRACH resource conveyed the preamble sequence. It is noted that in this case, the access node and UE agree a priori on which combination of UE preamble sequence and BRACH resource corresponds to which beam index. This can be done in advance by the access node sending out a mapping table between each beam index and the corresponding combinations or associations of UE preamble sequence and BRACH resource, for example.

In a fourth example embodiment, the access node configures a UE specific preamble sequence for each UE. A UE initiating beam recovery may send the UE specific preamble sequence, which is detected by the access node. The access node will be able to determine the identity of the UE that sent the UE specific preamble, thereby obtaining information A. Furthermore, the access node is able to determine which BRACH resource conveyed the UE specific preamble, thereby obtaining information B1. The UE sends another sequence before or after the UE specific preamble sequence at a pre-determined location. The other sequence conveys the intra-group index and was agreed upon a priori between the UE and the access node or specified by a technical standard or operator. The access node determines which other sequence is sent, thereby obtaining information B2. The access node uses information B1 and B2 to determine information B.

In another embodiment, the access node is able to determine information B directly by analyzing which sequence is being used by the identified UE and which BRACH resource conveyed the preamble sequence. It is noted that in this case, the access node and UE agree a priori on which combination of UE preamble sequence and BRACH resource corresponds to which beam index. This can be done in advance by the access node sending out a mapping table between each beam index and the corresponding combinations or associations of UE preamble sequence and BRACH resource.

In a fifth example embodiment, the access node configures a UE specific preamble sequences for each UE and for each direction, assigns multiple BRACH sub-channels (potentially in the frequency domain) for each UE. It is noted that there are multiple BRACH opportunities in the time domain with each BRACH opportunity corresponding to a potentially different WBRS direction. A UE initiating beam recovery may send a UE specific preamble sequence on one sub-channel (in the frequency domain, for example) and one opportunity (in the time domain, for example). The access node detects the UE specific preamble sequence, and the BRACH sub-channel, and determines the identity of the UE that sent the UE specific preamble, thereby obtaining information A. It is noted that the access node may assign L sub-channels overall. It is possible that each UE is able to use any of the L sub-channels. It is also possible that each UE is able to use only part, such as L1, of the L sub-channels. Such restriction may be signaled by the access node to the UE in advance in, e.g., a RRC message. If each of the UE is able to use all L sub-channels, then the access node can analyze the BRACH sub-channels to detect part of the information B, but may not be able to detect the UE identity A. If each of the UE is able to use only part of the L sub-channels, then the access node can analyze the BRACH sub-channel to detect part of the information B, as well as to detect part of the UE identity A. In one example, the access node is able to determine which BRACH opportunity conveyed the UE specific preamble, thereby obtaining information B1. Additionally, the access node is able to determine which BRACH sub-channel is being used by the identified UE and infers the intra-group index of the UE specific preamble, thereby obtaining information B2. The access node uses information B1 and B2 to determine information B. Alternatively, the access node is able to determine information B directly by analyzing which BRACH opportunity is being used in the time domain and which BRACH sub-channel is being used in the frequency domain by the identified UE. It is noted that in this case, the access node and UE agree on which combination or association of BRACH opportunity in the time domain and BRACH sub-channel in the time domain corresponds to which beam index. This can be done in advance by the access node sending out a mapping table between each beam index and the corresponding combinations or associations of BRACH opportunity in the time domain and BRACH sub-channel in the frequency domain.

Table 1 provides a summary of the four example embodiments.

TABLE 1

Summary of example embodiments.

| | First embodiment | Second embodiment | Third embodiment | Fourth embodiment |
|---|---|---|---|---|
| Sequence, grant, or grant-based reporting versus purely sequence based reporting | Former | Former | Latter | Latter |
| Determine UE identity based on | Preamble sequence | Preamble sequence | Preamble sequence | Preamble sequence |
| Report of n | Explicit, grant based report | Not explicit | Not explicit | Not explicit |
| Report of m | Not needed | Implicit, based on BRACH position | Implicit, based on BRACH position | Implicit, based on BRACH position |
| Report of i | Not needed | Explicit, grant based report | Implicitly in preamble | Implicitly in preamble |

As discussed previously, QCL defines a relationship between two reference signals or data signals such that the two signals may be viewed as possessing similar characteristics. Example characteristics include carrier frequency, time offset, frequency offset, spatial precoding vectors, and so on. SQCL is a category of QCL with two precoded or beamformed signals that are precoded using the same or similar precoder. As an illustrative example, a first signal SIG1 (a reference signal or data signal, for example) and a second signal SIG2 (a reference signal or data signal, for example) are spatially QCLed if they are transmitted using the same precoder. In other words, $$X1 = Precoder * SIG1; X2 = Precoder * SIG2,$$

where X1 is the precoded SIG1 and X2 is the precoded SIG2 and SIG1 and SIG2 are the first signal and the second signal without precoding, respectively.

Figure 14:
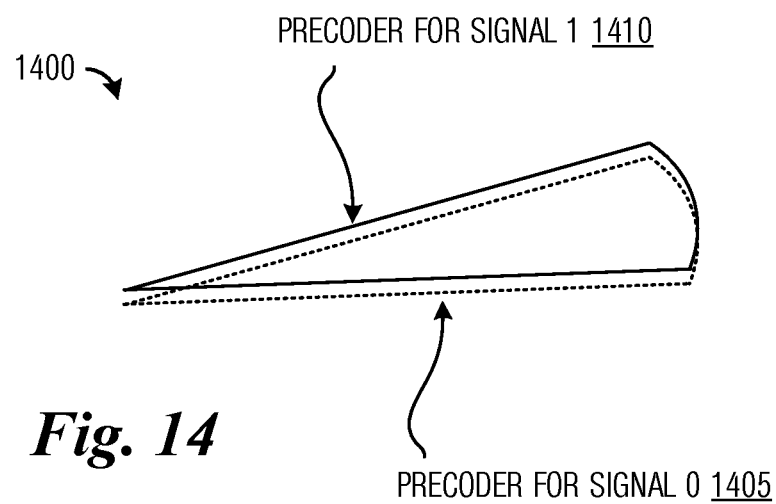
FIG. 14 illustrates a graphical representation of two precoders that are spatially quasi-co-located (QCLed) according to example embodiments described herein.

FIG. 14 illustrates a graphical representation 1400 of two precoders that are spatially QCLed. A first beam pattern 1405 represents a precoder for a first signal and a second beam pattern 1410 represents a precoder for a second signal. The beam patterns overlap because the two precoders are identical.

According to an example embodiment, techniques for identifying beams using a one-to-many mapping of beams are provided. The techniques identify a first beam using a one-to-many mapping of first beams to second beams when one of the second beams is known, and vice versa. As an illustrative example, in a communications system with one or more first beams and one or more second beams and multiple one-to-many mappings of first beams to second beams, as long as any two or more first beams do not map to the same second beam, once a second beam (e.g., CSI-RS beam) is identified, it is possible to determine the first beam (e.g., WBRS beam) that maps to the second beam using a one-to-many mapping.

Figure 15:
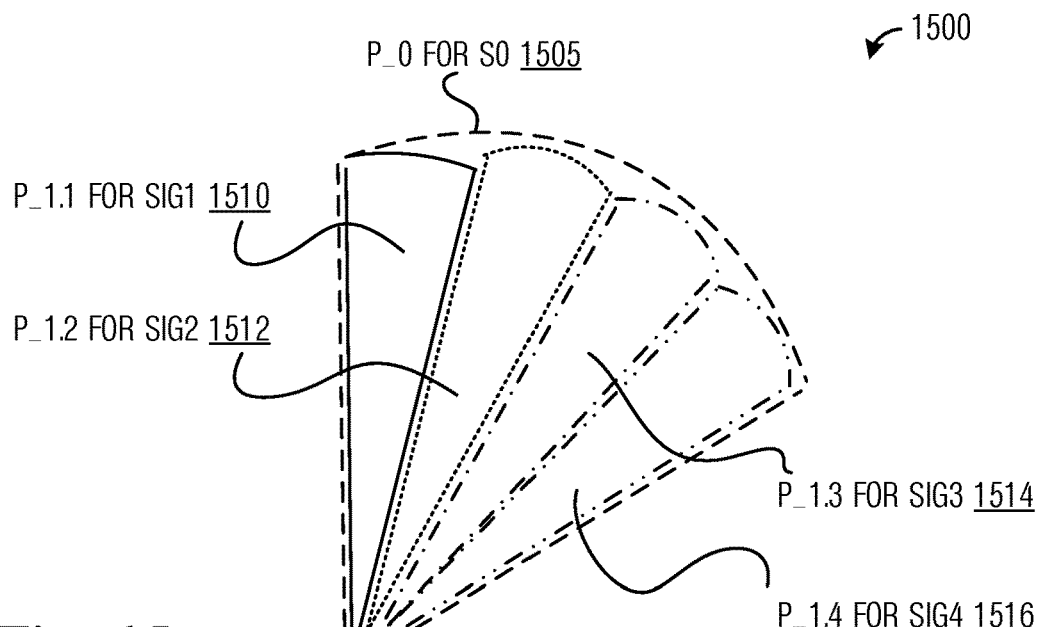
FIG. 15 illustrates a diagram of beam patterns of precoders for a first beam and one or more second beams, where the precoders have a one-to-many SQCL (OMSQ) relationship according to example embodiments described herein.

Let a first beam be a precoded signal SIG0 that is precoded with precoder P_o, and one or more second beams be a set of N precoded signals SIG1, . . . , SIGN that are precoded with precoders P_1.1, . . . , P_1.N. The first beam and the one or more second beams are said to have a one-to-many mapping if the beam patterns of the precoders P_1.1, . . . , P_1.N lie within the beam pattern of precoder P_o. Beams of a one-to-many mapping are said to have a one-to-many SQCL (OMSQ) relationship. FIG. 15 illustrates a diagram 1500 of beam patterns of precoders for a first beam and one or more second beams, where the precoders have an OMSQ relationship. As shown in FIG. 15, N is equal to four. A first beam pattern 1505 represents a precoder P_o for the first beam, while beam patterns 1510, 1512, 1514, and 1516 represent precoders P_L1, . . . , P_1.4 for each second beam in the plurality of second beams.

With respect to a relationship between precoders P_o and {P_1.1, . . . , P_1.N}, consider a virtual signal X1, which comprises a signal S that is precoded with P_1.1, . . . , P_1.N altogether at the same time (as opposed to being N signals that are separately precoded with P_1.1, . . . , P_1.N, respectively, one signal at a time), and a precoded signal X0 that comprises the signal S precoded with P_o. Virtual signal X1 comprises X_1.1, . . . , X_1.N, where X_1.1 is the signal S precoded with precoder P_1.1, and X_1.N is the signal S precoded with precoder P_1.N. If the virtual signal X1 and the precoded signal X0 are the same (within a tolerable difference between precoders P_o and {P_1.1, . . . , P_1.N} as defined by a technical standard), then precoders P_o and {P_1.1, . . . , P_1.N} have an OMSQ relationship. Similarly, virtual signal X1 and signal X0 have an OMSQ relationship. It is noted that in the example presented herein, the signal X0 (or precoder P_o) is the one and the virtual signal X1 (or precoders {P_1.1, . . . , P_1.N}) are the many of the one-to-many mapping.

It is noted that the precoders {P_1.1, . . . , P_1.N} are typically different from one another. Hence, there is no QCL relationship between the precoders {P_1.1, ..., P_1.N}. However, a typical relationship between the precoders {P_1.1, ..., P_1.N} may be that their respective beam patterns are adjacent to one another in terms of their beam footprints.

Figure 16:
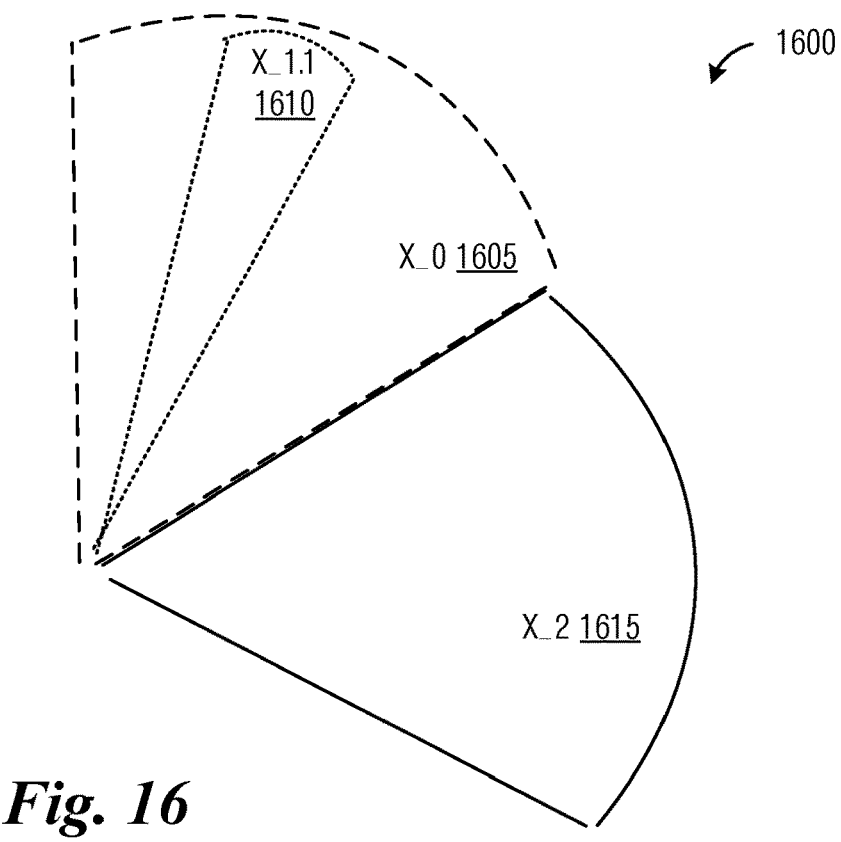
FIG. 16 illustrates a diagram of beam patterns of precoded signals, highlighting potential relationships according to example embodiments described herein.

It is noted that a relationship between precoder P_o and any one of the precoders {P_1.1, ..., P_1.N} (or signal X0 and any one of signals X_1.1, ..., X_1.N) is that the beam pattern of signal X0 spans a broader angle range than the beam pattern of any one of signals X_1.1, ..., X_1.N. Furthermore, the signal X0 and any one of signals X_1.1, ..., X_1.N are correlated. Signals that have an OMSQ relationship are also said to be correlated. FIG. 16 illustrates a diagram 160o of beam patterns of precoded signals, highlighting potential relationships. Diagram 1600 includes beam patterns for signal X_o 1605, signal X_1.1 1610, and signal X_2 1615. As shown in FIG. 16, signal X_o and signal X_1.1 are correlated, but signal X_2 (which was precoded using a different precoder) is not correlated with either signal X_o or X_1.1. In some cases, the signaling of the OMSQ relationship between signal X_o 1605 and X_1.1 1610 provides the receiver guidance in choosing a receiver (e.g., receiver combiner). For example, the OMSQ relationship suggests that the receiver used for X_o 1605 may be used to receive X_1.1 1610, and vice versa. On the other hand, the OMSQ relationship suggests that the receiver used for X_2 1615 may not be used to effectively receive X_1.1 1610.

According to an example embodiment, the OMSQ relationship is used to identify alternate signals usable in communications. As an illustrative example, if a first signal has become unavailable or unreliable, it is possible to identify an alternate signal using an OMSQ relationship between the first signal and one or more second signals. The alternate signal (one of the one or more second signals) may be used in place of the first signal.

As an illustrative first example, consider a situation where a transmitting device is sending reference signals X_o 1605, X_1.1 1610, and X_2 1615. The transmitting device may convey that signals X_o 1605 and X_1.1 1610 have an OMSQ relationship or that signals X_o 1605 and {X_1.1, ..., X_1.N} have an OMSQ relationship. A receiving device may initially use information in signal X_1.1 1610. However, signal X_1.1 1610 becomes unreliable or unavailable and the receiving device is no longer able to reliably receive signal X_1.1 1610. The receiving device may utilize the OMSQ relationship between signals X_o 1605 and X_1.1 1610 and use signal X_o 1605 as a backup for signal X_1.1 1610. It is noted that because signals X_o 1605 and X_2 1615 do not have an OMSQ relationship (or at least the transmitting device did not provide information that the two signals have an OMSQ relationship), the receiving device would not use signal X_2 1615 as a backup for signal X_o 1605.

As an illustrative second example, consider a situation where a transmitting device is sending reference signals X_o 1605, X_1.1 1610, and X_2 1615. The transmitting device may provide information conveying that signals X_o 1605 and X_1.1 1610 have an OMSQ relationship or that signals X_o 1605 and {X_1.1, ..., X_1.N} have an OMSQ relationship. The transmitting device may signal a receiving device that is currently receiving signal X_1.1 1610 that the transmitting device will begin to use a higher level signal (signal X_o 1605) instead. The transmitting device, knowing the OMSQ relationship between signals X_o 1605 and X_1.1 1610, begins to receive signal X_o 1605 instead of signal X_2 1615 because signals X_2 1615 and signal X_1.1 1610 do not have an OMSQ relationship.

It is noted that the discussion presented above focusses mainly in the angle domain. There may be a power difference (due to a difference of transmit power or precoding gain, for example) between the one signal (e.g., signal X_o 1605) and the many signals (e.g., signals {X_1.1, ..., X_1.N}) that are aggregated. The transmitting device may send additional signaling including a power difference between the one signal and the many signals (it is assumed that the transmit power is equal for each of the many signals).

Figures 17, 18:
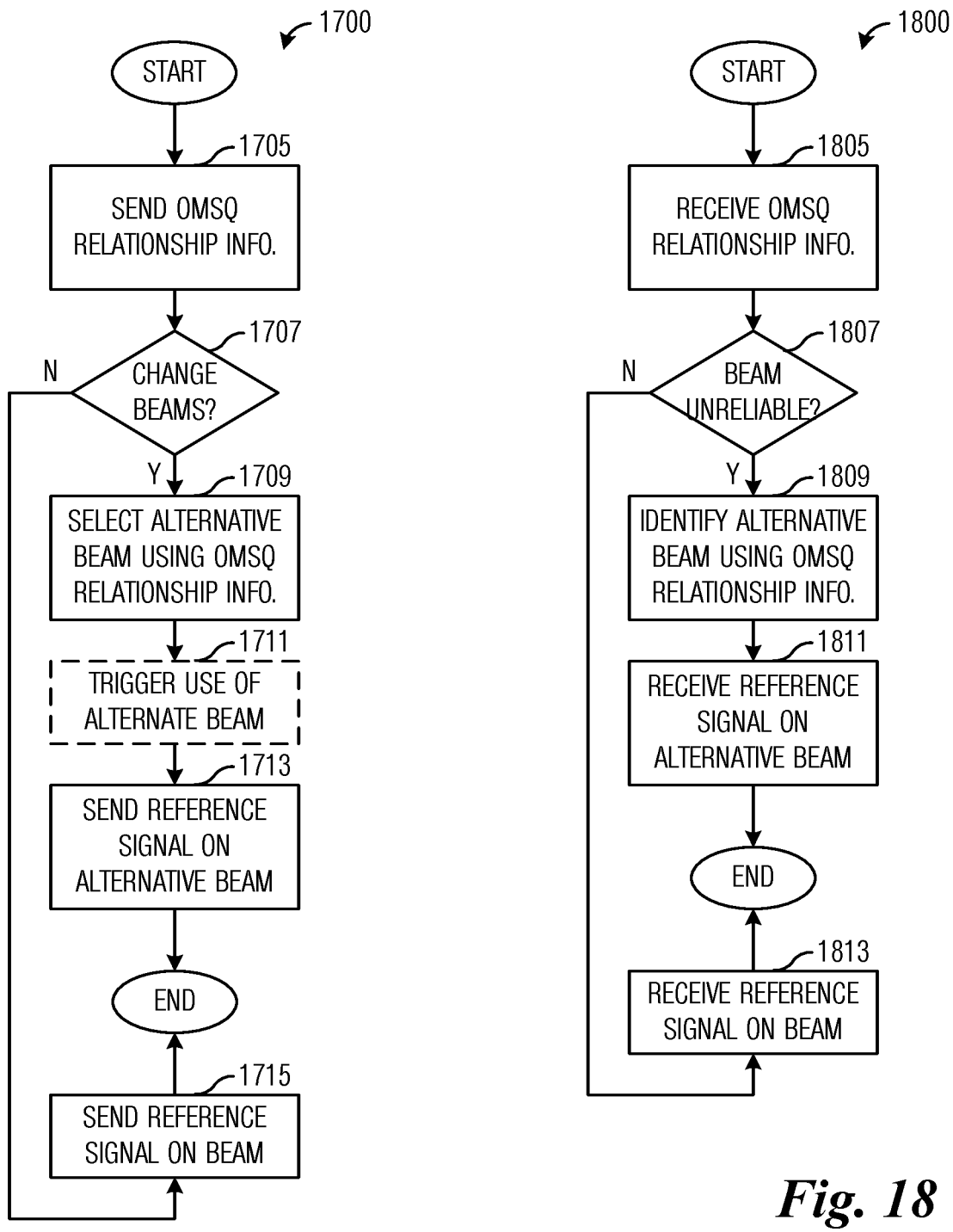
FIG. 17 illustrates a flow diagram of operations occurring in an access node utilizing OMSQ relationships to change beams according to example embodiments described herein.
FIG. 18 illustrates a flow diagram of operations occurring in a UE utilizing OMSQ relationships to change beams according to example embodiments described herein.

FIG. 17 illustrates a flow diagram of operations 1700 occurring in an access node utilizing OMSQ relationships to change beams. Operations 1700 may be indicative of operations occurring in an access node as the access node uses OMSQ relationships to change beams.

Operations 1700 begin with the access node sending OMSQ relationship information to UEs (block 1705). During normal operations, the access node performs a check to determine if a beam change is warranted (block 1707). The beam change may be warranted if one or more UEs provide feedback regarding the quality of the beams have dropped below a threshold, for example. As another example, a beam change may be warranted if the access node receives a BRACH preamble conveying information about an occurrence of a beam failure. If the beam change is not warranted, the access node continues to send signals on beams (block 1715).

However, if the beam change is warranted, the access node selects an alternate beam in accordance with the OMSQ relationship information (block 1709). The access node optionally triggers the use of the alternate beam (block 1711). The access node may send information about an index of the alternate beam, for example. The access node sends signals on the alternate beam (block 1713). The access node may also send information regarding an operation of default beam switch only, i.e., switching the transmit beam from the current transmit beam to a default backup beam (of the current transmit beam). In this case, signal X_o 1605 is the default backup version of signal X_1.1 1610, for example. This may trigger the UE to switch to a receiver for the default backup beam X_o 1605.

FIG. 18 illustrates a flow diagram of operations 1800 occurring in a UE utilizing OMSQ relationships to change beams. Operations 1800 may be indicative of operations occurring in a UE as the UE uses OMSQ relationships to change beams.

Operations 1800 begin with the UE receiving OMSQ relationship information from an access node (block 1805). During normal operations, the UE performs a check to determine if a beam that it is receiving has become unreliable (or unavailable) (block 1807). As an example, a beam may be deemed as unreliable if a signal quality associated with the beam drops below a threshold. As another example, if one or more decoding attempts of transmissions using the beam fail, the beam may be deemed as unreliable. As an example, a beam may be deemed unavailable if the UE can no longer detect signals on the beam. If the beam remains reliable, the UE continues to receive signals on the beam (block 1813).

If the beam has become unreliable (or unavailable), the UE selects an alternative beam in accordance with the OMSQ relationship information (block 1809) and receives signals on the alternative beam (block 1811). The UE may change its receive precoder to one associated with the alternative beam to begin receiving signals on the alternative beam, for example. Alternatively, if the UE receives information specifying the UE to use an alternative beam, the UE begins to receive signals on the alternative beam, independent of the reliability or unreliability of the beam.

In this disclosure, the focus has mainly been on sending a beam failure recovery request using a random access channel BRACH that is potentially different from a PRACH channel in time or frequency locations within the frequency band (category B). In co-assigned applications: docket numbers HW85458110US01 entitled "Method for Response to PUCCH-based Beam Failure Recovery Request" and HW85457640US01 entitled "System and Method for Beam Failure Recovery Request Reporting", which are hereby incorporated herein by reference, two other methods of transmitting the request a presented, one based on sending the request via scheduling request which is a special message carried over PUCCH channel (category P1), the other based on sending the non-status report (SR)-request over a PUCCH channel (category P2).

It remains unclear when different methods are supported (e.g., both category B and category P1, both category B and category P2, or all categories B, P1 and P2 are supported), how does the UE choose which method to use. For discussion purposes, suppose that both category B and category P are supported and that category P can be either category P1, or category P2, or both categories P1 and P2.

It is noted that the time and frequency locations of the category B channel (i.e., the BRACH channel resources) and the category P channel (i.e., either the PUCCH channel resources carrying SR for P1 or the PUCCH channel resources carrying non-SR for P2) should be determined or configured in advance. From the point of view of the UE, it can transmit a BRACH preamble sequence on a category B channel resource, or it can transmit a PUCCH content (SR or non-SR) on a category P channel resource. The UE cannot, and should not transmit a BRACH preamble sequence on a category P channel resource, nor should the UE transmit a PUCCH content (SR or non-SR) on a category B channel resource.

For the category B channel resource, there is the category B response resource where the UE can monitor to listen for responses for any preamble sequence transmission on the category B channel resource. For the category P channel resource, there is the category P response resource where the UE can monitor to listen for responses for any PUCCH transmission (SR or non-SR) on the category P channel resource.

It is noted that before the UE actually does send a response, such as a BFR response, on the category B channel, the UE should already know when it expects to receive a response by monitoring the category B response resource within a certain time window of size W1, starting from a time instance T1 later. Similarly, before the UE actually sends a response on the category P channel, the UE should already know when it expects to receive a response by monitoring the category P response resource within a certain time window of size W2, starting from a time instance T2 later.

There may be two possibilities in terms of whether the UE has full authority in determining which channel to use to send the response.

The UE having full authority in determining which channel to use to send the response may be configured by the access node. In one embodiment, the access node may configure in advance (using a message) telling the UE that it should either always use a category B channel, a category P1 channel, or a category P2 channel, or a prioritization of category B, P1, or P2 channels (the UE should use a category B channel first if a category B channel is given a higher priority than P1 or P2 channels).

In another embodiment, the access node may configure in a message (or specified by a technical standard) that the UE may use a category P channel (and the associated method to send requests) only if the UE is non-beam-correspondent.

In another embodiment, the access node may configure in a message (or specified by a technical standard) that the UE may use a category P channel (and the associated method to send requests) only if the UE knows that its uplink control channels and downlink control channels are not reciprocal. For example, the UE may infer that the uplink or downlink channels are not reciprocal by comparing its transmit beams of the uplink control channels and receive beams of the downlink control channels and find them to be significantly different from each other. The access node may also send a message to the UE on whether the receive beams of the uplink control channels (at access node side) and the transmit beams of the downlink control channels (at access node side) are the same or different, based upon which UE may infer whether the downlink control and uplink control channels are reciprocal or not.

In another embodiment, the access node may configure in a message (or specified by a technical standard) that the UE may use a category P channel (and the associated method to send request) if the carrier of the category P channel is different from the carrier associated with the beam failure.

In another embodiment, the access node may configure in a message (or specified by a technical standard) that the UE may use a category P channel (and the associated method to send request) if the UE has identified a new beam or not.

Alternatively, the UE may have its own say in choosing which channel to use to send the BFR response.

In one embodiment, the UE may choose which ever channel (category B channel or category P channel) depending on whichever channel resource arrives first, in the hope to recover from the beam failure as soon as possible.

In another embodiment, the UE may choose which ever channel depending on whichever response should arrive first (based on the knowledge of W1, T1, W2, T2, for example), in the hope to recover from the beam failure as soon as possible.

In another embodiment, the UE may choose whichever channel depending on whether the UE has identified a new candidate beam. For example, the UE may choose to transmit on a category B channel (and the associated method to send request) if it identifies a new candidate beam, or if it identifies no new candidate beam.

In another embodiment, the UE may choose whichever channel depending on its own knowledge of whether the uplink or downlink control channels are reciprocal. For example, the UE may choose to transmit on a category B channel (and the associated method to send request) if it infers that the downlink control and uplink control channels are not reciprocal, or if the UE is non-beam-correspondent.

If the UE has used category P channel resources to send responses and continue to monitor the category P response resources, and finds no positive response therein, then the UE should use category B channel resources to send responses.

If the UE has used category B channel resources to send responses and continue to monitor the category B response resources, and finds no positive response therein, then the UE should use category P channel resources to send beam failure requests.

If the UE has used category P channel resources to send responses and sees category B channel resources become available before the category P response resources arrive, then the UE should use category B channel resources to send responses.

If the UE has used category B channel resources to send responses and sees category P channel resources become available before the category B response resources arrive, then the UE should use category P channel resources to send responses.

If the opportunity for UE to use category B and category P channel resources arrive at substantially the same time, UE may select a resource (e.g., the category B or the category P channel resources) to transmit a response based on a preconfigured priority between category B and category P channel resources. If UE capability allows, UE may also transmit a response by using both category B and category P resources simultaneously.

Figure 19:
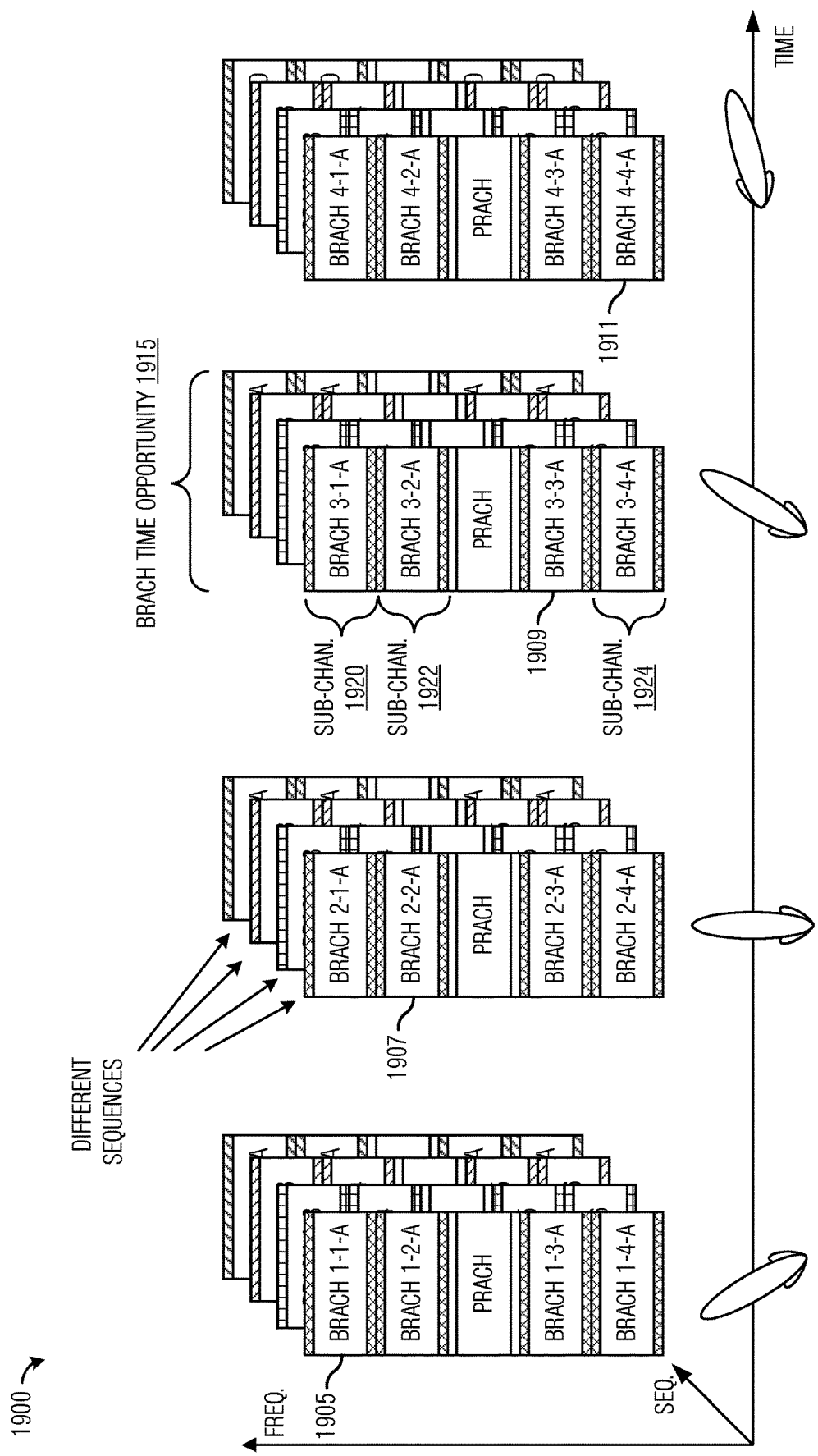
FIG. 19 illustrates first example BRACH resources according to example embodiments described herein.

FIG. 19 illustrates first example BRACH resources 1900. As shown in FIG. 19, BRACH resources 1900 consists of 64 BRACH blocks, such as BRACH blocks 1905, 1907, 1909, and 1911, arranged in the time, frequency, and sequence domain. Each BRACH block is a smallest unit usable by a UE to send a BRACH preamble to trigger beam failure recovery. Each BRACH block is unique in terms of time, frequency, and sequence. As an illustrative example, an access node allocates four BRACH time opportunities, such as BRACH time opportunity 1915. In a particular BRACH time opportunity, the access node allocates four BRACH frequency opportunities (sub-channels), such as sub-channels 1920, 1922, and 1924. For each time-frequency opportunity, the access node allocates four preamble sequences, which correspond to individual BRACH blocks (such as BRACH blocks 1905, 1907, 1909). The example configuration with four BRACH time opportunities, four BRACH frequency opportunities, and four preamble sequences is presented for discussion purposes only and is not intended to be limiting to either the scope or the spirit of the example embodiments.

It is noted that the access node may allocate to each UE more than one BRACH frequency opportunity in the frequency domain or more than one preamble sequence in the sequence domain for beam failure recovery purposes. Furthermore, although multiple UEs may share the same BRACH frequency opportunity for transmitting a preamble sequence, different UEs typically have different preamble sequences for UE identification purposes.

According to an example embodiment, an association between a beam index of a CSI-RS and a block index of a BRACH block is used to allow easy identification a block index from a beam index or vice versa. This is a special case where the BFRS consists of CSI-RS only. The association or relation between beam indices of CSI-RS and block indices of BRACH blocks enable the identification of one index when the other index is known. The association or relation may be specified by a technical standard, an operator of the communications system, or through collaboration between access node and UEs. The association or relation may be provided to UE during initial attachment to the communications system. Alternatively, the association or relation may be programmed into the UEs or after being determined through collaborative measures.

According to an example embodiment, an indirect association or relation between a beam index a CSI-RS and a block index of a BRACH block is used to allow easy identification a block index from a beam index or vice versa. The indirect association relates relative indices of the beam indices of CSI-RS to relative indices of block indices of BRACH blocks, relative to a common reference signal, such as a WBRS. The common reference signal is referred to as a relative reference signal (RRS). Such an indirect CSI-RS to BRACH block association between beam indices and block indices may be signaled by the access node by RRC signaling, MAC-CE signaling, DCI signaling, or a combination thereof, for example, or specified by a technical standard and stored in the devices.

FIG. 20A illustrates a table 2000 of relative indices of block indices of an example BRACH block configuration. Table 2000 presents the relative indices of block indices of the BRACH block configuration shown in FIG. 19. Table 2000 includes columns for BRACH index 2005, BRACH time index 2007, a BRACH secondary index 2009, BRACH frequency index 2011, and BRACH sequence index 2013. The BRACH secondary index can be viewed as a combination of BRACH frequency index and BRACH sequence index. It is noted that if there is only one sub-channel available then the BRACH frequency index is always 1. If there is only one sequence available per UE, then the BRACH sequence index is always 1. Values in BRACH index 2005 correspond to an absolute BRACH index, while values in time index 2007 correspond to BRACH time opportunities, values in BRACH secondary index 2009 correspond to beam indices of CSI-RS beams of a BRACH time opportunity, values in BRACH frequency index 2011 correspond to BRACH frequency opportunities, and values in BRACH sequence index 2012 correspond to preamble sequence indices. As an example, absolute BRACH index 25 corresponds to a second BRACH time opportunity, a ninth CSI-RS beam of the second BRACH time opportunity which happens to occupy a third BRACH frequency opportunity, and preamble sequence A. In general, each of the 64 absolute BRACH indices may be referenced with an m-th primary WBRS beam index and an i-th secondary CSI-RS beam index, where m is the WBRS index that the BRACH block is correspondent to and i is the BRACH block index within the group of BRACH blocks sharing the same m-th WBRS index.

FIG. 20B illustrates a table 2050 of relative indices of beam indices of CSI-RS. Table 2050 presents the relative indices of beam indices of the CSI-RS corresponding to BRACH block configuration shown in FIG. 19. Table 2050 includes columns for CSI-RS index 2055, mapped WBRS index 2057, and secondary index 2059. Values in CSI-RS index 2055 correspond to absolute beam indices of CSI-RS, while values in mapped WBRS index 2057 correspond to WBRS indices corresponding to the CSI-RS beam index, and values of secondary index 2059 correspond to CSI-RS beam indices of CSI-RS beams relative to the WBRS index. As an example, absolute CSI-RS index 17 corresponds to a second WBRS beam and a first CSI-RS beam relative to the second WRBS beam. In general, each of the 64 absolute BFRS (e.g., CSI-RS) indices may be referenced with an m-th primary BRACH block index and an i-th secondary BRACH block index, where m is the BFRS (CSI-RS) index that the BFRS (CSI-RS) beam corresponding to the absolute BFRS (CSI-RS) index is QCLed with and i is the BFRS (CSI-RS) index within a group of BFRSs (CSI-RSs) sharing the same m-th primary BRACH block index. If the BFRS is a WBRS, then the m-th BFRS index is simply the WBRS index m itself, and the i-th secondary index is not needed, which is a special case of the above general case.

Tables 2000 and 2050 present a single example indirect association between beam indices and block indices. Other indirect associations are possible. The access node and the UEs may agree on an indirect CSI-RS or SS to BRACH association so that the UE is able to determine a BRACH block index based on a CSI-RS index or SS index. Similarly, the indirect CSI-RS or SS to BRACH association enables the access node to determine a CSI-RS index or SS index based on a BRACH block index. The access node and UEs may also agree on indirect secondary associations so that the UE can determine a secondary BRACH block index based on a secondary CSI-RS index, and the access node can determine a secondary CSI-RS index based on a secondary BRACH block index. It is noted that each secondary BRACH block index corresponds to a combination of BRACH sub-channel index and BRACH sequence index.

According to an example embodiment, a direct association between a beam index of a BFRS (CSI-RS, SS, or CSI-RS and SS) and a block index of a BRACH block is used to allow easy identification a block index from a beam index or vice versa. The beam index of a BFRS (CSI-RS, SS, or CSI-RS and SS) may be viewed as an absolute index of the BFRS beams, while the block index of a BRACH block may be viewed as an absolute index of the BRACH blocks. Such a direct CSI-RS to BRACH block association (generally a one to one mapping) between beam indices and block indices may be signaled by the access node by RRC signaling, for example, or specified by a technical standard and stored in the devices.

FIG. 20C illustrates a table 2070 of an example direct association between beam indices and block indices. Table 2070 presents beam indices and block indices of the BRACH block configuration shown in FIG. 19. Table 2070 includes columns for BFRS index 2075 and BRACH index 2077. Values in BFRS index 2075 correspond to beam indices of BFRS beams and values in BRACH index 2077 correspond to block indices of BRACH blocks. Table 2070 presents a single example direct association between beam indices and block indices. Other direct associations are possible. Other example associations may include shifts, rotations, mathematical manipulations, and so on, of the indices.

Overall, for both direct and indirect associations, a UE may be able to determine a BRACH block to transmit a preamble sequence to trigger beam failure recovery based on a detected BFRS index. Similarly, at the access node, the access node is able to determine UE identity by analyzing the preamble sequence, as well as determine the BFRS index based on the BRACH block index where the preamble sequence is received.

Figure 21:
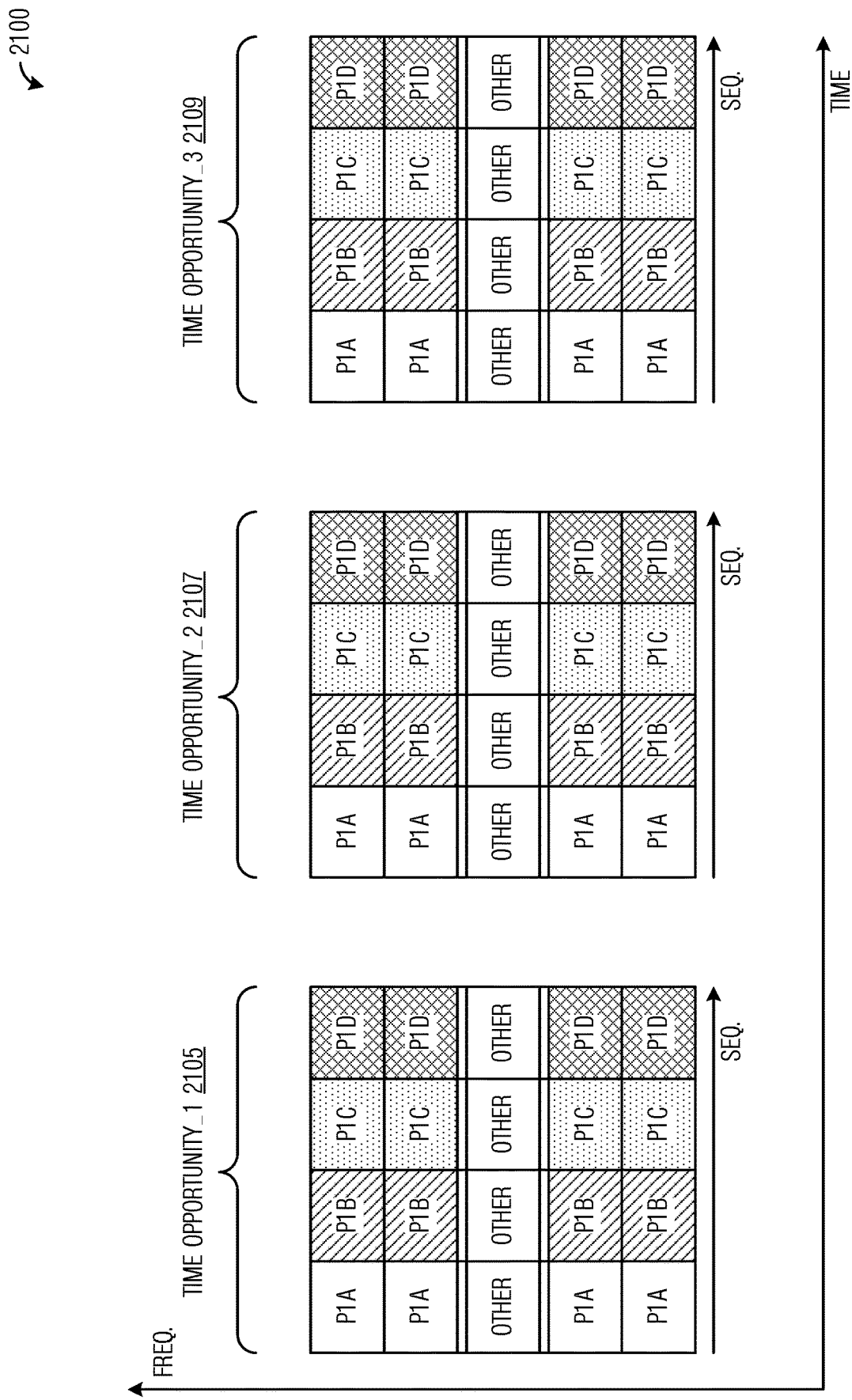
FIG. 21 illustrates second example BRACH resources according to example embodiments described herein.

FIG. 21 illustrates second example BRACH resources 2100. As shown in FIG. 21, one or more BRACH resources is group into three time opportunities, time opportunities 2105, 2107, and 2109. Each time opportunity includes BRACH resources in the frequency domain (e.g., four different sub-channels) and the code domain (e.g., four different code sequences). Although BRACH resources 2100 are organized into three time opportunities, with four sub-channels and four code sequences each, the example embodiments presented herein are operable with other BRACH resource configurations. Therefore, the configuration presented in FIG. 21 should not be construed as being limiting to the spirit or scope of the example embodiments.

As shown in FIG. 21, there are three time opportunities for each UE to send a BRACH preamble. Each time opportunity may correspond to a different spatial direction in terms of beam direction of the WBRS. For each time opportunity, the UE may choose one of four sub-channels and one of four code sequences (A, B, C, and D) to transmit the BRACH preamble. Therefore, the actual sub-channel index and actual preamble index that a UE uses to transmit conveys 4 bits of information (corresponding to 16 different choices). The 4-bits of information may be used by the UE to carry an intended beam index to the access node, for example. Therefore, there is a need for F * S * U=4 * 4 * 1=16, where F is the number of sub-channels per UE, S is the number of code sequences per UE, and U is the number of UEs, to enable one UE to transmit while conveying Log2(F*S*U)=4 bits of information.

In order to enable K UEs to transmit at the same time while each UE transmission is carrying 4-bits of information, more sub-channels may be needed in the frequency domain or more code sequences are needed in the sequence domain, or both. However, the number of sub-channels and the number of code sequences are generally limited. When the number of UEs (K) is large, it is necessary for multiple UEs to share either sub-channels or code sequences.

In the situation where multiple UEs are sharing code sequences, instead of allocating BRACH resources (such as P1A, P1B, P1C, and P1D) to a single UE, the access node may allocate a subset of the BRACH resources (e.g., P1A and P1B) to a first UE and another subset of the BRACH resources (e.g., P1C and P1D) to a second UE. Suppose then that each UE is still able to choose one of four sub-channels to transmit, then each UE can choose one of eight (e.g., S=2 (halved due to sequence based restriction (SBR)) and F=4) resources to transmit. Therefore, the transmission conveys Log2(8)=3 bits of information. It is noted that the total number of resources (S * F * U) is still the same (16).

In the situation where multiple UEs are sharing sub-channels, instead of allocating sub-channels (such as sub-channels 1, 2, 3, and 4) to a single UE, the access node may allocate a subset of sub-channels (e.g., sub-channels 1 and 2) to a first UE and another subset of sub-channels (e.g., sub-channels 3 and 4) to a second UE. Suppose then that each UE is still able to choose one of four code sequences to transmit, then each UE can choose one of eight (e.g., F=2 (halved due to frequency based restriction (FBR)) and S=4) resources to transmit. Therefore, the transmission conveys Log2(8)=3 bits of information. It is noted that the total number of resources (S * F * U) is still the same (16). It is further noted that in this situation, the sequence P1A if detected on sub-channels 1 and 2 should be detected by the access node as the sequence P1A being sent by the first UE, while if sequence P1A is detected on sub-channels 3 and 4, then the access node should determine that the sequence P1A is sent by the second UE. In other words, to determine UE identity, the access node needs to detect not only what BRACH preamble is received, but where it is received.

It is also noted that a combination of the sharing presented above is possible. In other words, the access node configures multiple UEs to share the BRACH resources where:
  Multiple UEs share the same sub-channel but differentiated by different code sequences;
  Multiple UEs share the same code sequences but differentiated by different sub-channels; or
  Multiple UEs are differentiated by different sub-channels and different code sequences (i.e., not sharing).

It is noted that in FIG. 21, the same code sequence is used across all four sub-channels of the different time opportunities (e.g., code sequence P1A is used in all four sub-channels). It is possible that different code sequences be used across the sub-channels of each time opportunity. As an example, in a first sub-channel, code sequence P1A is used, in a second sub-channel, code sequence Q1A is used, in a third sub-channel, code sequence R1A is used, and in a fourth sub-channel, code sequence S1A is used.

Figures 22A, 22B:
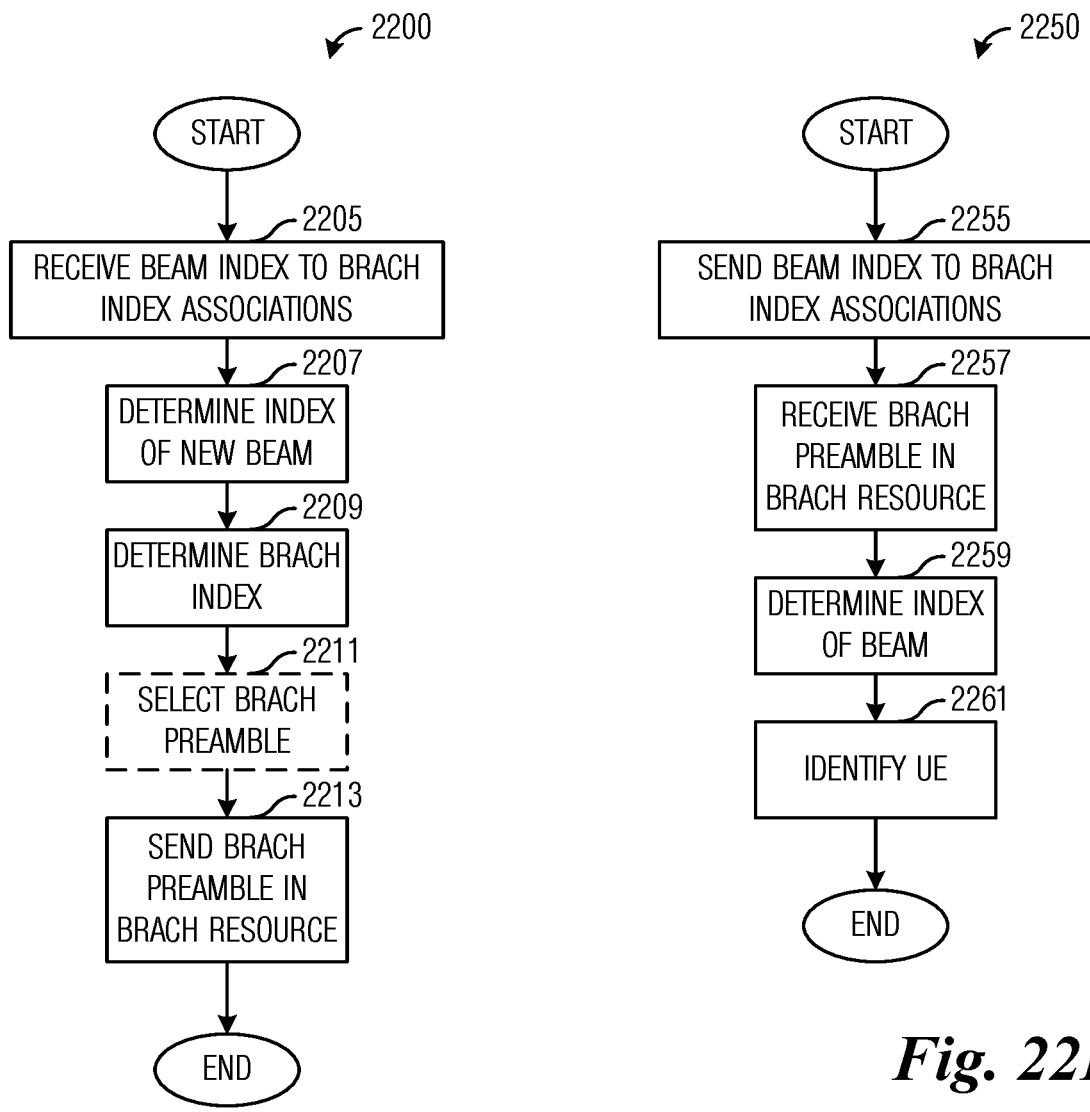
FIG. 22A illustrates a flow diagram of example operations occurring in a UE initiating beam failure recovery according to example embodiments described herein.
FIG. 22B illustrates a flow diagram of example operations occurring in an access node participating in beam failure recovery according to example embodiments described herein.

FIG. 22A illustrates a flow diagram of example operations 2200 occurring in a UE initiating beam failure recovery. Operations 2200 may be indicative of operations occurring in a UE as the UE initiates beam failure recovery.

Operations 2200 begin with the UE receiving beam index to BRACH index associations (block 2205). The beam index to BRACH index associations may be direct associations or indirect associations. The beam index to BRACH index associations may be received from an access node serving the UE. Alternatively, the beam index to BRACH index associations may be programmed into the UE. The UE detects a new beam and determines a beam index of the new beam (block 2207). The new beam may be a replacement beam for a failed beam. The UE determines a BRACH index (block 2209). The BRACH index may be determined from the beam index in accordance with the beam index to BRACH index associations. The UE may optionally select a BRACH preamble (block 2211). In a situation when the UE has been configured with one or more BRACH preambles, the UE may select a BRACH preamble from the plurality of BRACH preambles. Alternatively, the UE may be configured with a single BRACH preamble but one or more code sequences with which to encode the BRACH preamble. In such a situation, the UE may optionally select a code sequence from the plurality of code sequences. The UE sends the BRACH preamble on a BRACH resource corresponding to the BRACH index (block 2213).

FIG. 22B illustrates a flow diagram of example operations 2250 occurring in an access node participating in beam failure recovery. Operations 2250 may be indicative of operations occurring in an access node as the access node participates in beam failure recovery.

Operations 2250 begin with the access node sending beam index to BRACH index associations (block 2255). The beam index to BRACH index associations may be direct associations or indirect associations. The beam index to BRACH index associations may be received from an access node serving the UE. Alternatively, the beam index to BRACH index associations may be programmed into the UE. The access node receives a BRACH preamble in a BRACH resource (block 2257). The access node determines a beam index of a beam conveying a reference signal transmitted by the access node (block 2259). The beam index may be determined from an index of the BRACH resource in accordance with the beam index to BRACH index associations. The access node identifies the identity of the UE (block 2261). The identity of the UE is determined from the received BRACH preamble.

As related to resource allocation, the allocation may be performed at the beginning when the UE establishes an active link with the access node. As an example, each UE may be assigned a unique recovery resource. In a first situation, a potentially unique beam recovery random access channel resource preamble in a random access channel region is assigned, with the random access channel region potentially being the same or different from a random access channel region used for initial access purposes. In a second situation, a potentially unique set of REs in a region are assigned. The REs may be identified by a unique combination of code, time, or frequency resources.

If the random access channel region for beam failure recovery and the random access channel region for initial access use different or orthogonal time or frequency resources, the same random access channel resource preamble may be used. As an example, if one UE is assigned a first sequence to transmit in the random access channel region for initial access, the UE may also use the same first sequence to transmit in the random access channel region for beam failure recovery.

If the random access channel region for beam failure recovery and the random access channel region for initial access use the same random access channel resource preamble, then a different scrambling code may be used. As an example, if a UE is assigned a first sequence to transmit in the random access channel region for initial access, the UE may use the same first sequence (but scrambled with a different scrambling sequence) to transmit in the random access channel region for beam failure recovery. It is noted that the scrambling sequences for different UEs may be the same or different. It is also noted that the random access channel resource preamble sequences used in the random access channel region for beam failure recovery and the random access channel region for initial access may be the orthogonal to each other.

If the random access channel region for beam failure recovery and the random access channel region for initial access use the same or overlapping time-frequency resources, the random access channel resource preamble sequences may be orthogonal to each other.

An example beam failure recovery procedure includes:

0a. An access node configures a UE with a unique preamble sequence to use in the random access channel region for beam failure recovery;

0b. The access node broadcast in a broadcast channel some resources (e.g., beam recovery reference signals, synchronization signals, and so on) to that the UE may use to make measurements in case of a beam failure;

1. The UE monitors one or more downlink control channel; Upon determining that a beam failure or loss has occurred, the UE may initialize the beam recovery procedure;

2. The UE makes downlink measurements:
    On certain resources (e.g., beam recovery reference signals, synchronization signals, and so on) to re-detect or re-synchronize with downlink transmit beam(s) from the access node (e.g., a downlink transmit beam with sufficient quality), downlink receive beam(s) at the UE (e.g., a downlink receive beam with sufficient quality), or to improve time or frequency synchronization.
    The location of the resources may be broadcast in advance by the access node and may be periodically allocated in the time or frequency domains;

3a. The UE transmits a preamble sequence in the random access channel region for beam failure recovery. In a first situation, the UE transmits its own unique preamble sequence in the random access channel region for beam failure recovery (the random access channel region for beam failure recovery may be non-orthogonal or orthogonal to the random access channel region for initial access in the time or frequency domains). In a second situation, the UE may transmit a control or command in a grant-free manner on REs (this UE initiated grant-free transmission may use REs pre-allocated to the UE, for example). The uplink transmission may rely on time or frequency synchronization performed previously;

3b. The UE may transmit the downlink measurement results. As an example, the UE may transmit the best downlink transmit beam(s), e.g., beam indices. As an example, the UE may transmit the best downlink receive beam(s), e.g., beam indices. As an example, the UE may transmit an associated channel quality information, e.g., SINR, SNR, RSSI, RSRQ, RSRP, and so on. The UE may also transmit other information to the access node to help setup a new downlink control channel;

4. The access node receives the preamble sequence and associated downlink measurement results. The access node may use the received information to establish a new downlink control channel from the access node to the UE; and 5. The access node may send control signaling to the UE using the newly established downlink control channel.

Figure 23:
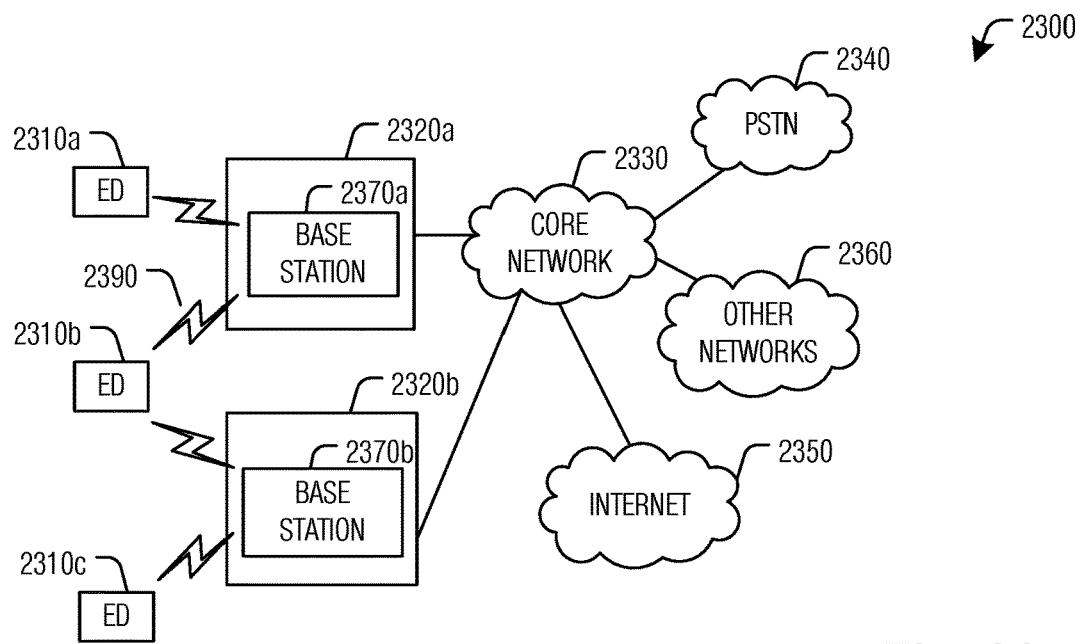
FIG. 23 illustrates an example communication system according to example embodiments described herein.

FIG. 23 illustrates an example communication system 2300. In general, the system 2300 enables multiple wireless or wired users to transmit and receive data and other content. The system 2300 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 2300 includes electronic devices (ED) 2310a-2310c, radio access networks (RANs) 2320a-2320b, a core network 2330, a public switched telephone network (PSTN) 2340, the Internet 2350, and other networks 2360. While certain numbers of these components or elements are shown in FIG. 23, any number of these components or elements may be included in the system 2300.

The EDs 2310a-2310c are configured to operate and/or communicate in the system 2300. For example, the EDs 2310a-2310c are configured to transmit and/or receive via wireless or wired communication channels. Each ED 2310a-2310c represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 2320a-2320b here include base stations 2370a-2370b, respectively. Each base station 2370a-2370b is configured to wirelessly interface with one or more of the EDs 2310a-2310c to enable access to the core network 2330, the PSTN 2340, the Internet 2350, and/or the other networks 2360. For example, the base stations 2370a-2370b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 2310a-2310c are configured to interface and communicate with the Internet 2350 and may access the core network 2330, the PSTN 2340, and/or the other networks 2360.

In the embodiment shown in FIG. 23, the base station 2370a forms part of the RAN 2320a, which may include other base stations, elements, and/or devices. Also, the base station 2370b forms part of the RAN 2320b, which may include other base stations, elements, and/or devices. Each base station 2370a-2370b operates to transmit and/or receive wireless signals within a particular geographic region or area, sometimes referred to as a "cell." In some embodiments, multiple-input multiple-output (MIMO) technology may be employed having multiple transceivers for each cell.

The base stations 2370a-2370b communicate with one or more of the EDs 2310a-2310c over one or more air interfaces 2390 using wireless communication links. The air interfaces 2390 may utilize any suitable radio access technology.

It is contemplated that the system 2300 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 2320a-2320b are in communication with the core network 2330 to provide the EDs 2310a-2310c with voice, data, application, Voice over Internet Protocol (VoIP), or other services. Understandably, the RANs 2320a-2320b and/or the core network 2330 may be in direct or indirect communication with one or more other RANs (not shown). The core network 2330 may also serve as a gateway access for other networks (such as the PSTN 2340, the Internet 2350, and the other networks 2360). In addition, some or all of the EDs 2310a-2310c may include functionality for communicating with different wireless networks over different wireless links using different wireless technologies and/or protocols. Instead of wireless communication (or in addition thereto), the EDs may communicate via wired communication channels to a service provider or switch (not shown), and to the Internet 2350.

Although FIG. 23 illustrates one example of a communication system, various changes may be made to FIG. 23. For example, the communication system 2300 could include any number of EDs, base stations, networks, or other components in any suitable configuration.

Figure 24A:
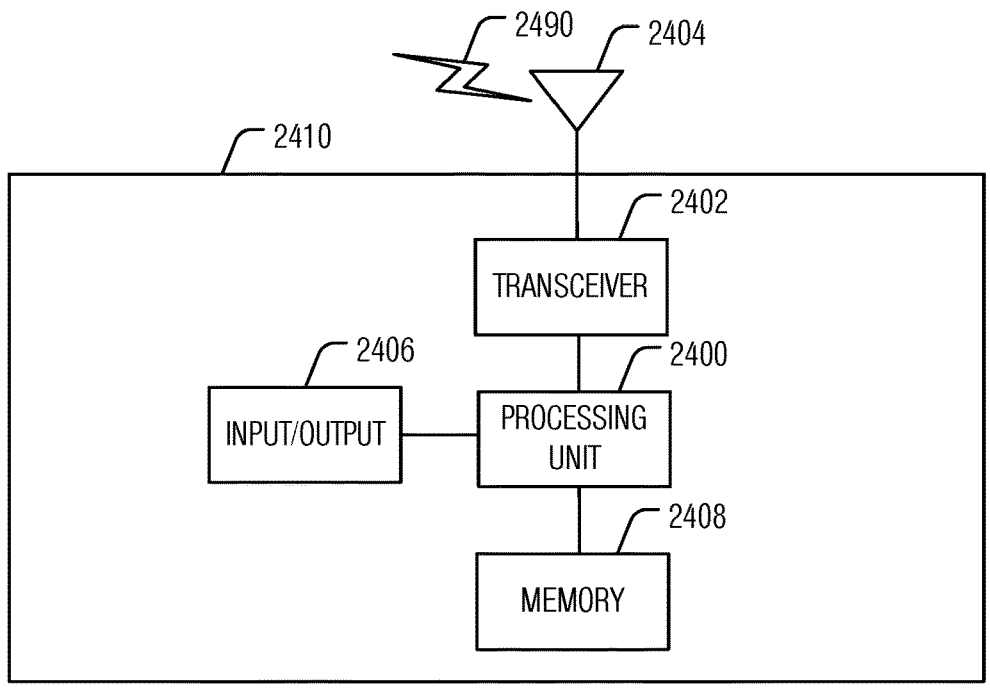
FIGS. 24A and 24B illustrate example devices that may implement the methods and teachings according to this disclosure.
Figure 24B:
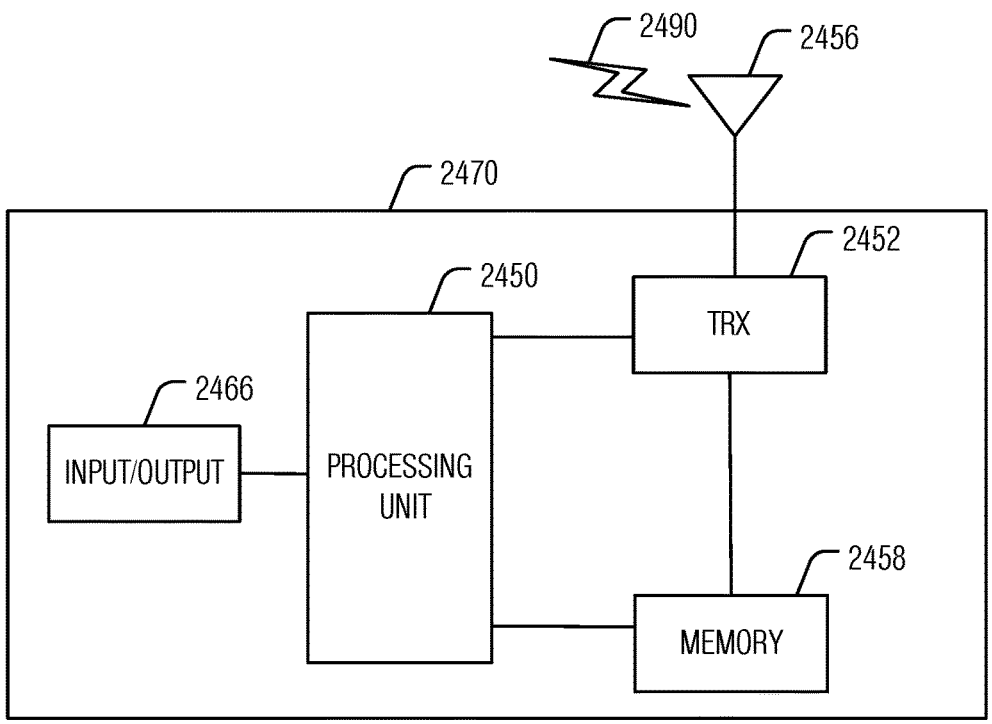

FIGS. 24A and 24B illustrate example devices that may implement the methods and teachings according to this disclosure. In particular, FIG. 24A illustrates an example ED 2410, and FIG. 24B illustrates an example base station 2470. These components could be used in the system 2300 or in any other suitable system.

As shown in FIG. 24A, the ED 2410 includes at least one processing unit 2400. The processing unit 2400 implements various processing operations of the ED 2410. For example, the processing unit 2400 could perform signal coding, data processing, power control, input/output processing, or any other functionality enabling the ED 2410 to operate in the system 2300. The processing unit 2400 also supports the methods and teachings described in more detail above. Each processing unit 2400 includes any suitable processing or computing device configured to perform one or more operations. Each processing unit 2400 could, for example, include a microprocessor, microcontroller, digital signal processor, field programmable gate array, or application specific integrated circuit.

The ED 2410 also includes at least one transceiver 2402. The transceiver 2402 is configured to modulate data or other content for transmission by at least one antenna or NIC (Network Interface Controller) 2404. The transceiver 2402 is also configured to demodulate data or other content received by the at least one antenna 2404. Each transceiver 2402 includes any suitable structure for generating signals for wireless or wired transmission and/or processing signals received wirelessly or by wire. Each antenna 2404 includes any suitable structure for transmitting and/or receiving wireless or wired signals. One or multiple transceivers 2402 could be used in the ED 2410, and one or multiple antennas 2404 could be used in the ED 2410. Although shown as a single functional unit, a transceiver 2402 could also be implemented using at least one transmitter and at least one separate receiver.

The ED 2410 further includes one or more input/output devices 2406 or interfaces (such as a wired interface to the Internet 2350). The input/output devices 2406 facilitate interaction with a user or other devices (network communications) in the network. Each input/output device 2406 includes any suitable structure for providing information to or receiving/providing information from a user, such as a speaker, microphone, keypad, keyboard, display, or touch screen, including network interface communications.

In addition, the ED 2410 includes at least one memory 2408. The memory 2408 stores instructions and data used, generated, or collected by the ED 2410. For example, the memory 2408 could store software or firmware instructions executed by the processing unit(s) 2400 and data used to reduce or eliminate interference in incoming signals. Each memory 2408 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 24B, the base station 2470 includes at least one processing unit 2450, at least one transceiver 2452, which includes functionality for a transmitter and a receiver, one or more antennas 2456, at least one memory 2458, and one or more input/output devices or interfaces 2466. A scheduler, which would be understood by one skilled in the art, is coupled to the processing unit 2450. The scheduler could be included within or operated separately from the base station 2470. The processing unit 2450 implements various processing operations of the base station 2470, such as signal coding, data processing, power control, input/output processing, or any other functionality. The processing unit 2450 can also support the methods and teachings described in more detail above. Each processing unit 2450 includes any suitable processing or computing device configured to perform one or more operations. Each processing unit 2450 could, for example, include a microprocessor, microcontroller, digital signal processor, field programmable gate array, or application specific integrated circuit.

Each transceiver 2452 includes any suitable structure for generating signals for wireless or wired transmission to one or more EDs or other devices. Each transceiver 2452 further includes any suitable structure for processing signals received wirelessly or by wire from one or more EDs or other devices. Although shown combined as a transceiver 2452, a transmitter and a receiver could be separate components. Each antenna 2456 includes any suitable structure for transmitting and/or receiving wireless or wired signals. While a common antenna 2456 is shown here as being coupled to the transceiver 2452, one or more antennas 2456 could be coupled to the transceiver(s) 2452, allowing separate antennas 2456 to be coupled to the transmitter and the receiver if equipped as separate components. Each memory 2458 includes any suitable volatile and/or non-volatile storage and retrieval device(s). Each input/output device 2466 facilitates interaction with a user or other devices (network communications) in the network. Each input/output device 2466 includes any suitable structure for providing information to or receiving/providing information from a user, including network interface communications.

Figure 25:
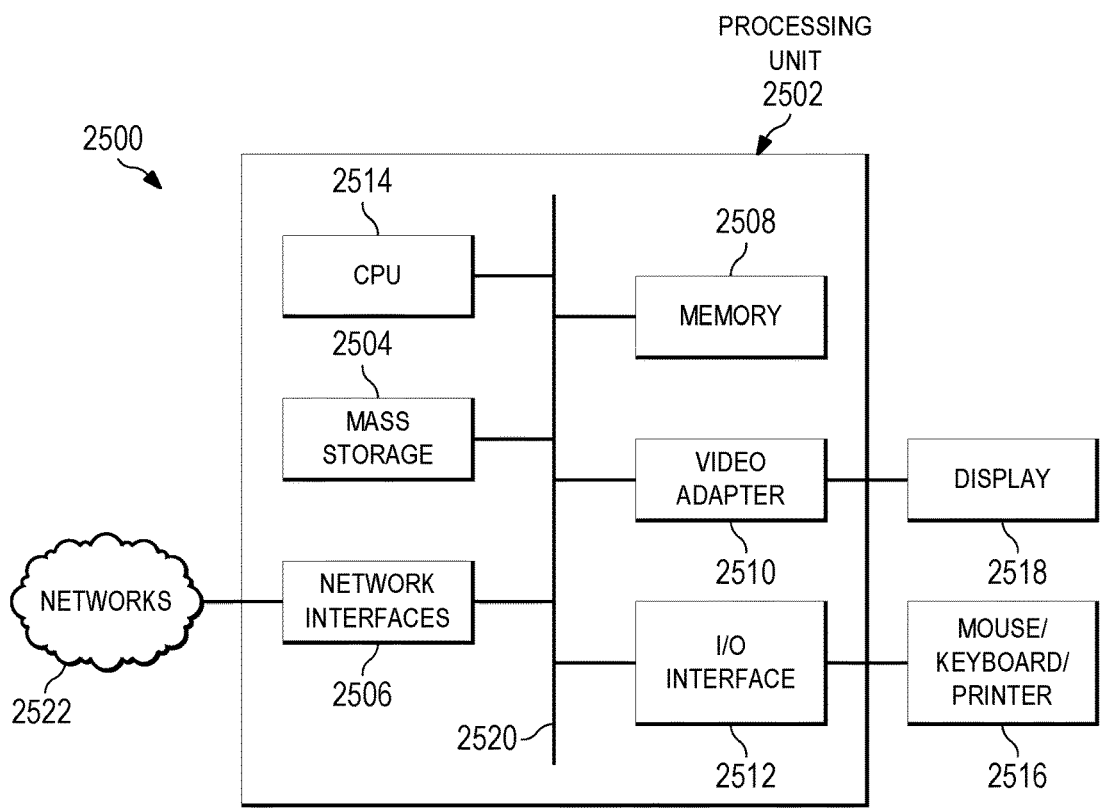
FIG. 25 is a block diagram of a computing system that may be used for implementing the devices and methods disclosed herein.

FIG. 25 is a block diagram of a computing system 2500 that may be used for implementing the devices and methods disclosed herein. For example, the computing system can be any entity of UE, access network (AN), mobility management (MM), session management (SM), user plane gateway (UPGW), and/or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 2500 includes a processing unit 2502. The processing unit includes a central processing unit (CPU) 2514, memory 2508, and may further include a mass storage device 2504, a video adapter 2510, and an I/O interface 2512 connected to a bus 2520.

The bus 2520 may be one or more of any type of several bus architectures including a memory bus or memory controller, a peripheral bus, or a video bus. The CPU 2514 may comprise any type of electronic data processor. The memory 2508 may comprise any type of non-transitory system memory such as static random access memory (SRAM), dynamic random access memory (DRAM), synchronous DRAM (SDRAM), read-only memory (ROM), or a combination thereof. In an embodiment, the memory 2508 may include ROM for use at boot-up, and DRAM for program and data storage for use while executing programs.

The mass storage 2504 may comprise any type of non-transitory storage device configured to store data, programs, and other information and to make the data, programs, and other information accessible via the bus 2520. The mass storage 2504 may comprise, for example, one or more of a solid state drive, hard disk drive, a magnetic disk drive, or an optical disk drive.

The video adapter 2510 and the I/O interface 2512 provide interfaces to couple external input and output devices to the processing unit 2502. As illustrated, examples of input and output devices include a display 2518 coupled to the video adapter 2510 and a mouse/keyboard/printer 2516 coupled to the I/O interface 2512. Other devices may be coupled to the processing unit 2502, and additional or fewer interface cards may be utilized. For example, a serial interface such as Universal Serial Bus (USB) (not shown) may be used to provide an interface for an external device.

The processing unit 2502 also includes one or more network interfaces 2506, which may comprise wired links, such as an Ethernet cable, and/or wireless links to access nodes or different networks. The network interfaces 2506 allow the processing unit 2502 to communicate with remote units via the networks. For example, the network interfaces 2506 may provide wireless communication via one or more transmitters/transmit antennas and one or more receivers/receive antennas. In an embodiment, the processing unit 2502 is coupled to a local-area network 2522 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit/module, a monitoring unit/module, an identifying unit/module, a setting up unit/module, and/or a configuring unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method comprising:
sending, by a network device, a beam failure recovery configuration message to a user equipment (UE), the beam failure recovery configuration message indicating synchronization signals for beam failure recovery, the beam failure recovery configuration message indicating reference signals for beam failure recovery, and the beam failure recovery configuration message indicating time-domain or frequency-domain locations of random access channel (RACH) resources for beam failure recovery that are associated with the synchronization signals for beam failure recovery, at least one of the reference signals for beam failure recovery not being associated with the RACH resources for beam failure recovery; and
receiving, by the network device from the UE, an indication of at least one of the synchronization signals for beam failure recovery over the RACH resources for beam failure recovery.

2. The method of claim 1, wherein each of the synchronization signals for beam failure recovery is individually associated with at least one of the RACH resources for beam failure recovery.

3. The method of claim 1, wherein the beam failure recovery configuration message further indicates a preamble sequence for the RACH resources for beam failure recovery.

4. The method of claim 1, further comprising:
sending, by the network device, a radio resource control (RRC) message to the UE indicating that at least one of the synchronization signals for beam failure recovery is quasi-co-located with one of the reference signals for beam failure recovery.

5. The method of claim 1, further comprising:
sending, by the network device in response to receiving the indication of the at least one of the synchronization signals for beam failure recovery over the RACH resources for beam failure recovery, a beam failure recovery message to the UE over a control channel, the beam failure recovery message configuring the UE to perform a beam failure recovery procedure.

6. The method of claim 5, wherein the control channel comprises a physical downlink control channel (PDCCH).

7. The method of claim 5, wherein the control channel is quasi-co- located with the at least one of the synchronization signals identified by the indication received over the RACH resources for beam failure recovery.

8. A network device comprising:
at least one processor; and
a non-transitory computer readable storage medium storing programming for execution by the at least one processor, the programming including instructions to cause the network device to:
send a beam failure recovery configuration message to a user equipment (UE), the beam failure recovery configuration message indicating synchronization signals for beam failure recovery, the beam failure recovery configuration message indicating reference signals for beam failure recovery, and the beam failure recovery configuration message indicating time-domain or frequency-domain locations of random access channel (RACH) resources for beam failure recovery that are associated with the synchronization signals for beam failure recovery, at least one of the reference signals for beam failure recovery not being associated with the RACH resources for beam failure recovery; and
receive, from the UE, an indication of at least one of the synchronization signals for beam failure recovery over the RACH resources for beam failure recovery.

9. The network device of claim 8, wherein each of the synchronization signals for beam failure recovery is individually associated with at least one of the RACH resources for beam failure recovery.

10. The network device of claim 8, wherein the beam failure recovery configuration message further indicates a preamble sequence for the RACH resources for beam failure recovery.

11. The network device of claim 8, wherein the programming further includes instructions to send a radio resource control (RRC) message to the UE indicating that at least one of the synchronization signals for beam failure recovery is quasi-co-located with one of the reference signals for beam failure recovery.

12. The network device of claim 8, wherein the programming further includes instructions to cause the network device to:
send, in response to receiving the indication of the at least one of the synchronization signals for beam failure recovery over the RACH resources for beam failure recovery, a beam failure recovery message to the UE over a control channel, the beam failure recovery message configuring the UE to perform a beam failure recovery procedure.

13. The network device of claim 12, wherein the control channel comprises a physical downlink control channel (PDCCH).

14. The network device of claim 12, wherein the control channel is quasi-co-located with the at least one of the synchronization signals identified by the indication received over the RACH resources for beam failure recovery.

15. A method comprising:
sending, by a network device, a beam failure recovery configuration message to a user equipment (UE), the beam failure recovery configuration message indicating synchronization signals for beam failure recovery, the beam failure recovery configuration message indicating reference signals for beam failure recovery, and the beam failure recovery configuration message indicating time-domain or frequency-domain locations of random access channel (RACH) resources for beam failure recovery that are associated with the synchronization signals for beam failure recovery, all of the reference signals for beam failure recovery not associated with the RACH resources for beam failure recovery; and
receiving, by the network device from the UE, an indication of at least one of the synchronization signals for beam failure recovery over the RACH resources for beam failure recovery.

16. The method of claim 15, wherein each of the synchronization signals for beam failure recovery is individually associated with at least one of the RACH resources for beam failure recovery.

17. The method of claim 15, wherein the beam failure recovery configuration message further indicates a preamble sequence for the RACH resources for beam failure recovery.

18. The method of claim 15, further comprising:
sending, by the network device, a radio resource control (RRC) message to the UE indicating that at least one of the synchronization signals for beam failure recovery is quasi-co- located with one of the reference signals for beam failure recovery.

19. The method of claim 15, further comprising:
sending, by the network device in response to receiving the indication of the at least one of the synchronization signals for beam failure recovery over the RACH resources for beam failure recovery, a beam failure recovery message to the UE over a control channel, the beam failure recovery message configuring the UE to perform a beam failure recovery procedure.

20. The method of claim 19, wherein the control channel comprises a physical downlink control channel (PDCCH).

21. The method of claim 19, wherein the control channel is quasi-co- located with the at least one of the synchronization signals identified by the indication received over the RACH resources for beam failure recovery.

22. A network device comprising:
at least one processor; and
a non-transitory computer readable storage medium storing programming for execution by the at least one processor, the programming including instructions to cause the network device to:
send beam failure recovery configuration message to a user equipment (UE), the beam failure recovery configuration message indicating synchronization signals for beam failure recovery, the beam failure recovery configuration message indicating reference signals for beam failure recovery, and the beam failure recovery configuration message indicating time-domain or frequency-domain locations of random access channel (RACH) resources for beam failure recovery that are associated with the synchronization signals for beam failure recovery, all of the reference signals for beam failure recovery not associated with the RACH resources for beam failure recovery; and
receive an indication of at least one of the synchronization signals for beam failure recovery over the RACH resources for beam failure recovery.

23. The network device of claim 22, wherein each of the synchronization signals for beam failure recovery is individually associated with at least one of the RACH resources for beam failure recovery.

24. The network device of claim 22, wherein the beam failure recovery configuration message further indicates a preamble sequence for the RACH resources for beam failure recovery.

25. The network device of claim 22, wherein the programming further includes instructions to cause the network device to:
send a radio resource control (RRC) message to the UE indicating that at least one of the synchronization signals for beam failure recovery is quasi-co-located with one of the reference signals for beam failure recovery.

26. The network device of claim 22, wherein the programming further includes instructions to cause the network device to:
send, in response to receiving the indication of the at least one of the synchronization signals for beam failure recovery over the RACH resources for beam failure recovery, a beam failure recovery message to the UE over a control channel, the beam failure recovery message configuring the UE to perform a beam failure recovery procedure.

27. The network device of claim 26, wherein the control channel comprises a physical downlink control channel (PDCCH).

28. The network device of claim 26, wherein the control channel is quasi-co-located with the at least one of the synchronization signals identified by the indication received over the RACH resources for beam failure recovery.

* * * * *

UNITED STATES PATENT AND TRADEMARK OFFICE
CERTIFICATE OF CORRECTION

PATENT NO. : 11,683,215 B2
APPLICATION NO. : 16/820283
DATED : June 20, 2023
INVENTOR(S) : Xia et al.

It is certified that error appears in the above-identified patent and that said Letters Patent is hereby corrected as shown below:

In the Specification

In Column 14, Line 27, delete "no" and insert -- 110 --, therefor.

In Column 17, Line 26, delete "35o" and insert -- 350 --, therefor.

In Column 17, Line 29, delete "35o" and insert -- 350 --, therefor.

In Column 22, Line 47, delete "is" and insert -- 1a --, therefor.

In Column 22, Line 53, delete "1b" and insert -- 1c --, therefor.

In Column 23, Line 1, delete "1b" and insert -- 1c --, therefor.

In Column 24, Line 58, delete "is" and insert -- 1a --, therefor.

In Column 24, Line 62, delete "1b" and insert -- 1c --, therefor.

In Column 24, Line 64, delete "1b" and insert -- 1c --, therefor.

In Column 25, Line 8, delete "is" and insert -- 1a --, therefor.

In Column 25, Line 13, delete "1b" and insert -- 1c --, therefor.

In Column 25, Line 15, delete "is" and insert -- 1a --, therefor.

In Column 34, Line 32, delete "P_o," and insert -- $P\_0.$ --, therefor.

In Column 34, Line 38, delete "P_o." and insert -- $P\_0.$ --, therefor.

Signed and Sealed this
Fifth Day of September, 2023

Katherine Kelly Vidal
*Director of the United States Patent and Trademark Office*

In Column 34, Line 44, delete "P_o" and insert -- P_0 --, therefor.

In Column 34, Line 45, delete "P_L1," and insert -- P_1.1, --, therefor.

In Column 34, Line 47, delete "P_o" and insert -- P_0 --, therefor.

In Column 34, Line 53, delete "P_o." and insert -- P_0. --, therefor.

In Column 34, Line 58, delete "P_o" and insert -- P_0 --, therefor.

In Column 34, Line 59, delete "P_o" and insert -- P_0 --, therefor.

In Column 34, Line 63, delete "P_o)" and insert -- P_0) --, therefor.

In Column 35, Line 6, delete "P_o" and insert -- P_0 --, therefor.

In Column 35, Line 15, delete "160o" and insert -- 1600 --, therefor.

In Column 35, Line 17, delete "X_o" and insert -- X_0 --, therefor.

In Column 35, Line 18, delete "X_o" and insert -- X_0 --, therefor.

In Column 35, Line 21, delete "X_o" and insert -- X_0 --, therefor.

In Column 35, Line 22, delete "X_o" and insert -- X_0 --, therefor.

In Column 35, Line 25, delete "X_o" and insert -- X_0 --, therefor.

In Column 35, Line 39, delete "X_o" and insert -- X_0 --, therefor.

In Column 35, Line 41, delete "X_o" and insert -- X_0 --, therefor.

In Column 35, Line 42, delete "X_o" and insert -- X_0 --, therefor.

In Column 35, Line 48, delete "X_o" and insert -- X_0 --, therefor.

In Column 35, Line 49, delete "X_o" and insert -- X_0 --, therefor.

In Column 35, Line 50, delete "X_o" and insert -- X_0 --, therefor.

In Column 35, Line 55, delete "X_o" and insert -- X_0 --, therefor.

In Column 35, Line 57, delete "X_o" and insert -- X_0 --, therefor.

In Column 35, Line 59, delete "X_o" and insert -- X_0 --, therefor.

CERTIFICATE OF CORRECTION (continued)
U.S. Pat. No. 11,683,215 B2

In Column 35, Line 61, delete "X_o" and insert -- $X\_0$ --, therefor.

In Column 35, Line 65, delete "X_o" and insert -- $X\_0$ --, therefor.

In Column 35, Line 66, delete "X_o" and insert -- $X\_0$ --, therefor.

In Column 35, Line 67, delete "X_o" and insert -- $X\_0$ --, therefor.

In Column 36, Line 6, delete "X_o" and insert -- $X\_0$ --, therefor.

In Column 36, Line 40, delete "X_o" and insert -- $X\_0$ --, therefor.

In Column 36, Line 43, delete "X_o" and insert -- $X\_0$ --, therefor.

In Column 46, Line 9, delete "233o" and insert -- 2330 --, therefor.

In the Claims

In Column 49, in Claim 7, Line 45, delete "quasi-co- located" and insert -- quasi-co-located --, therefor.

In Column 50, in Claim 18, Line 66, delete "quasi-co- located" and insert -- quasi-co-located --, therefor.

In Column 51, in Claim 21, Line 12, delete "quasi-co- located" and insert -- quasi-co-located --, therefor.